Figure 1:
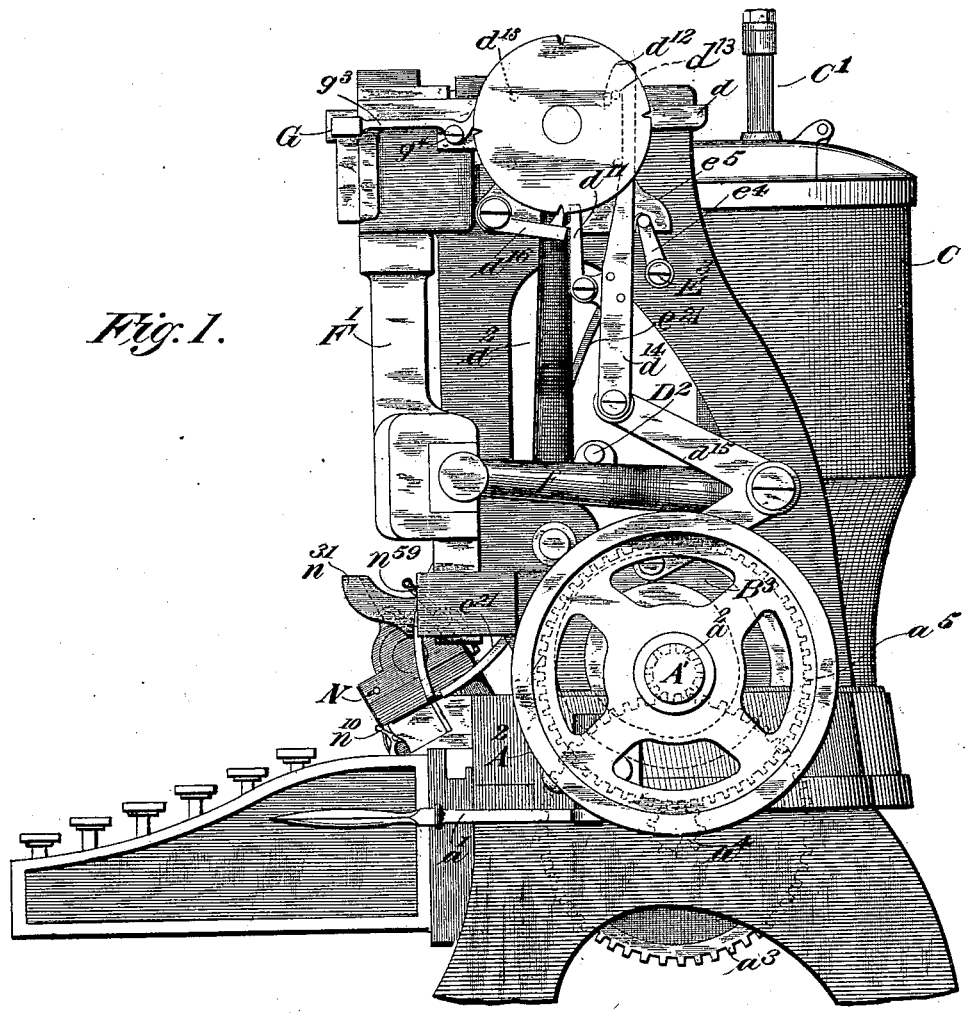

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 1.

Witnesses

Inventor
Lucien A. Brott
by
Attorney.

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 2.

Witnesses
Inventor
Lucien A. Brott
by
Walter T. Rogers, Attorney.

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 3.
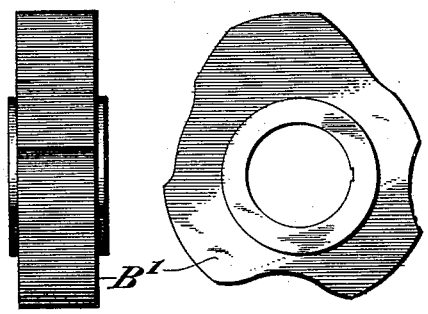
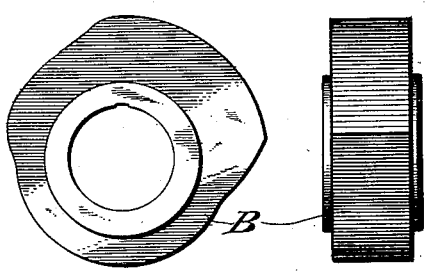
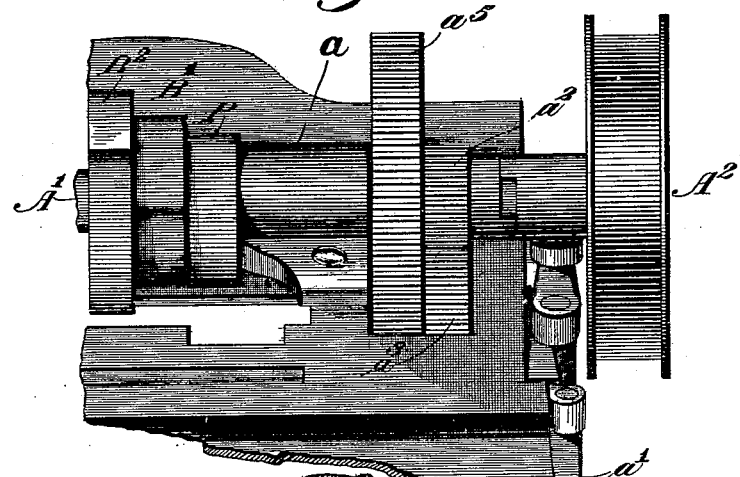
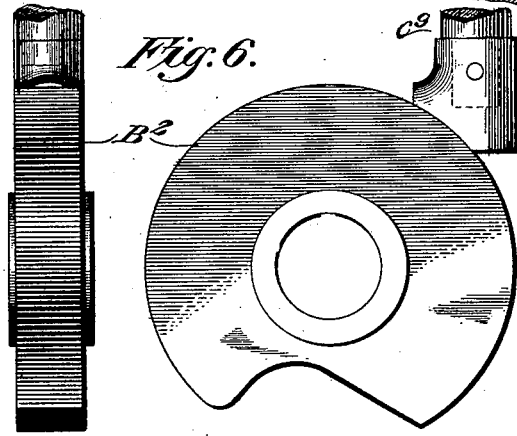
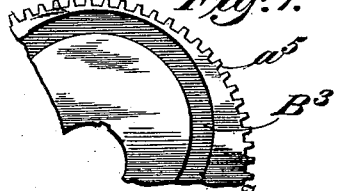
Inventor
Lucien A. Brott
by
Walker & Rogers, Attorney
Witnesses No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 4.
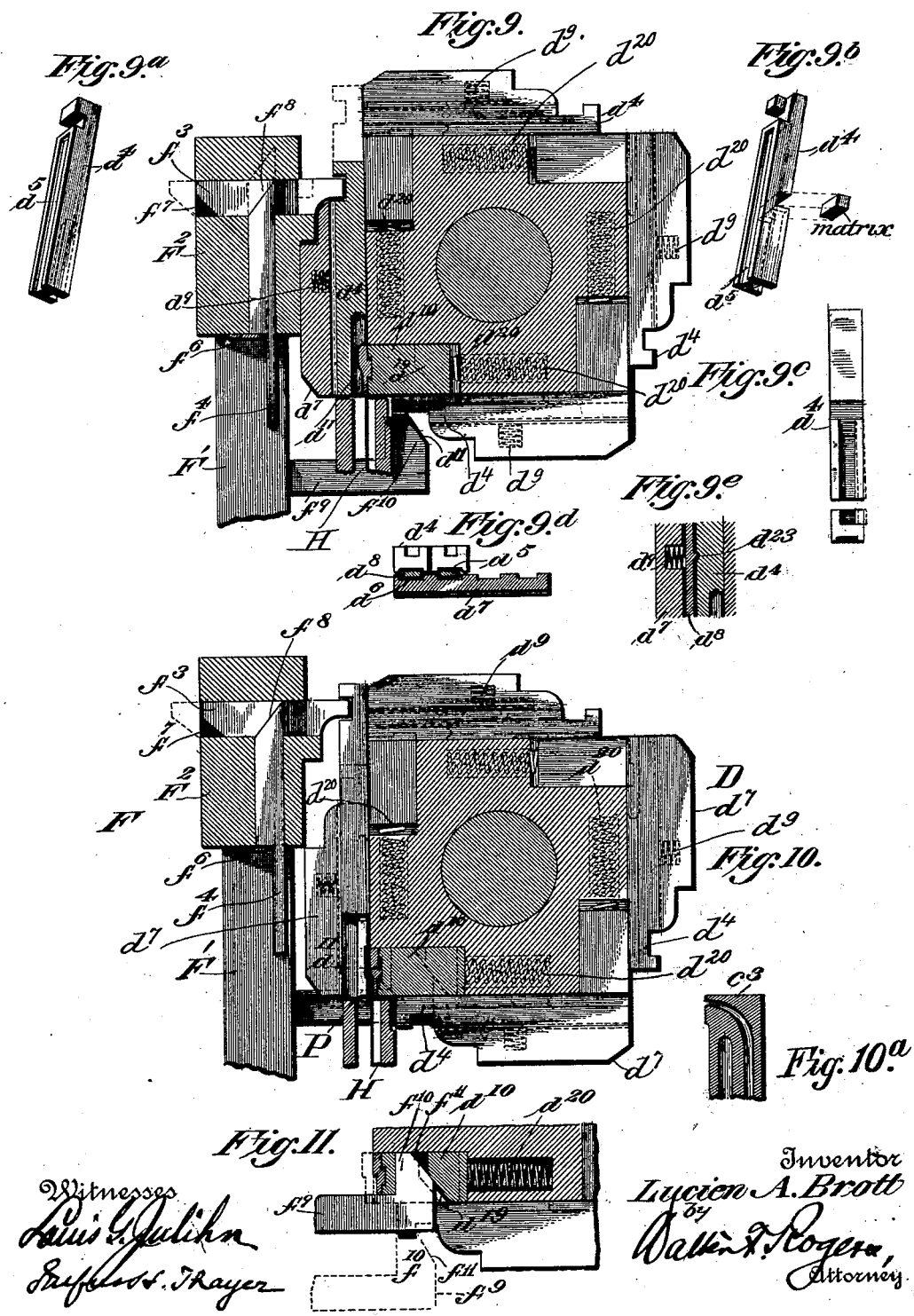

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 5.
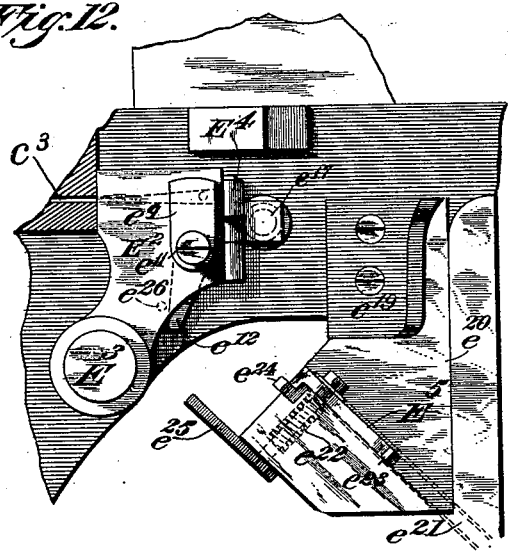
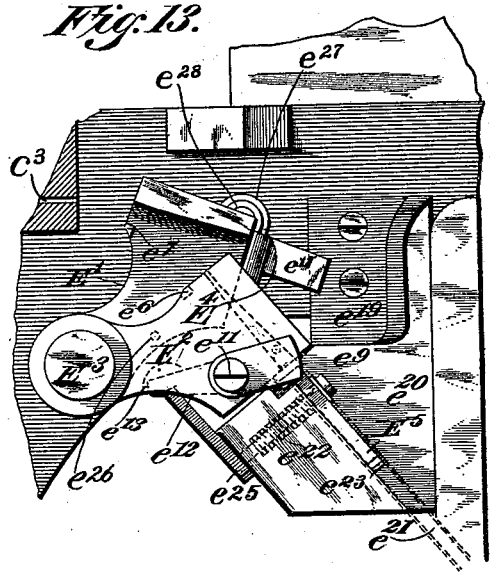
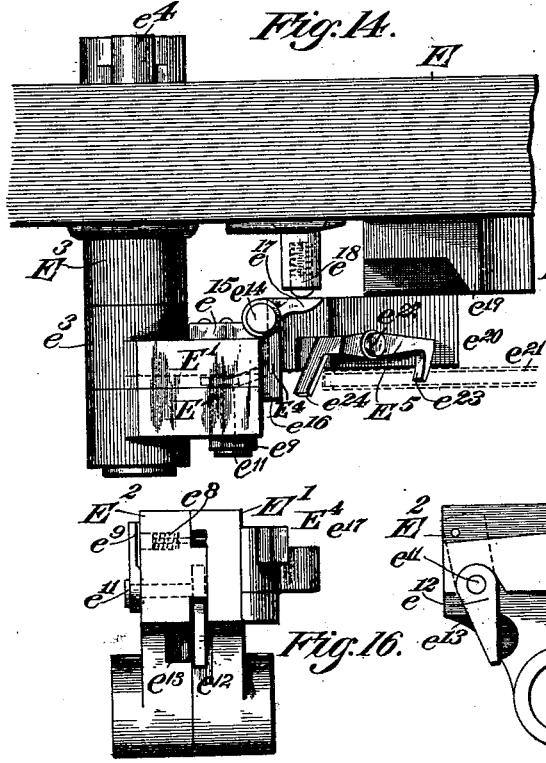
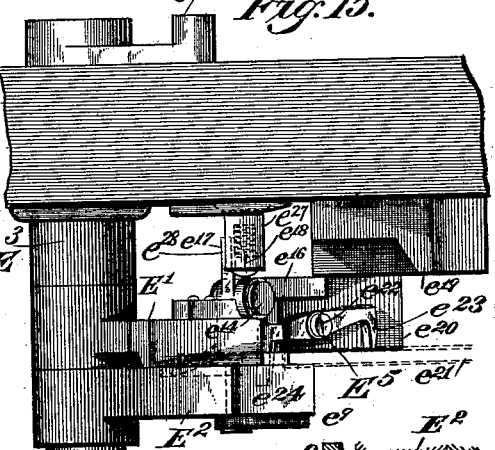
Witnesses
Inventor
Lucien A. Brott
by Walter F. Rogers, Attorney No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 6.
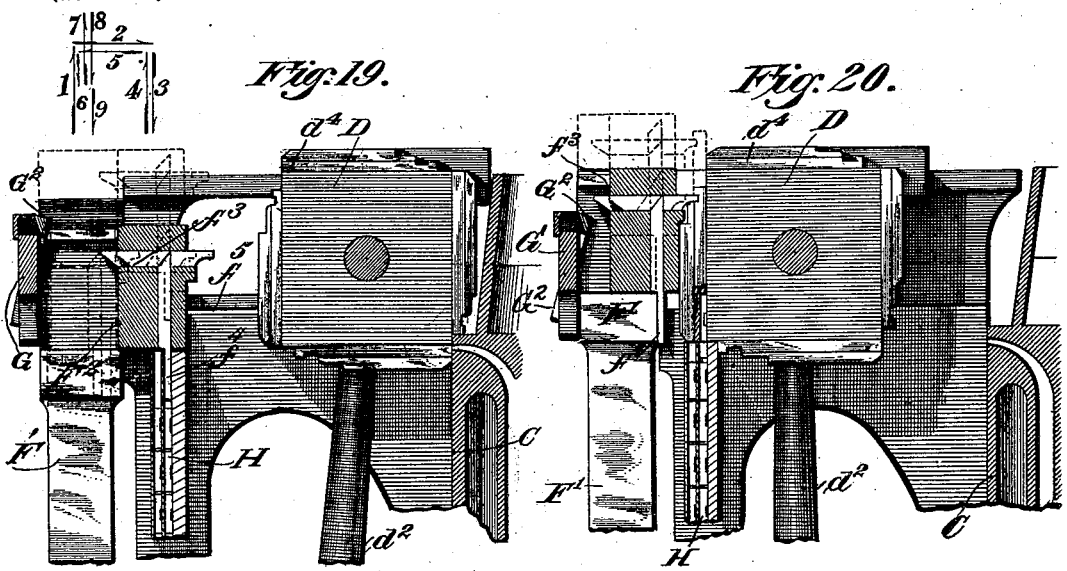

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 7.
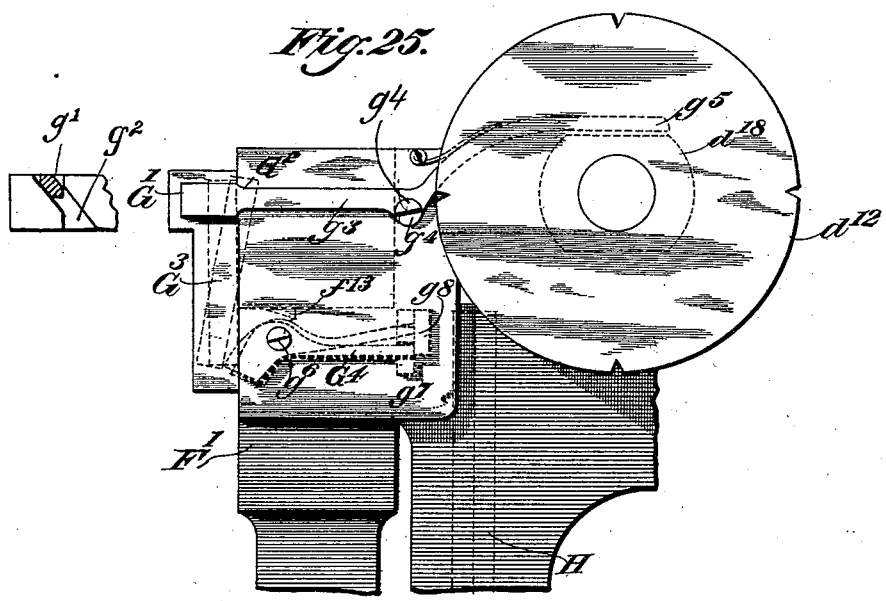
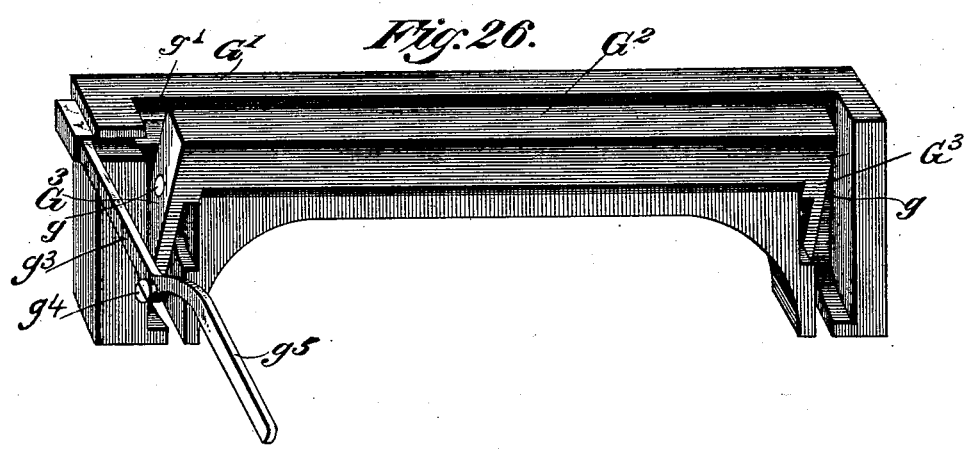

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 8.
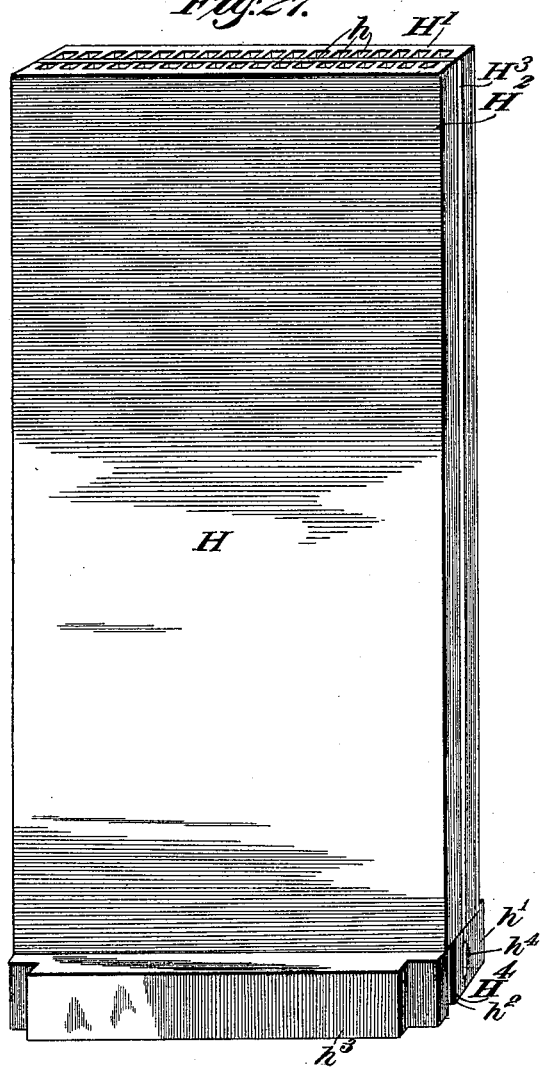
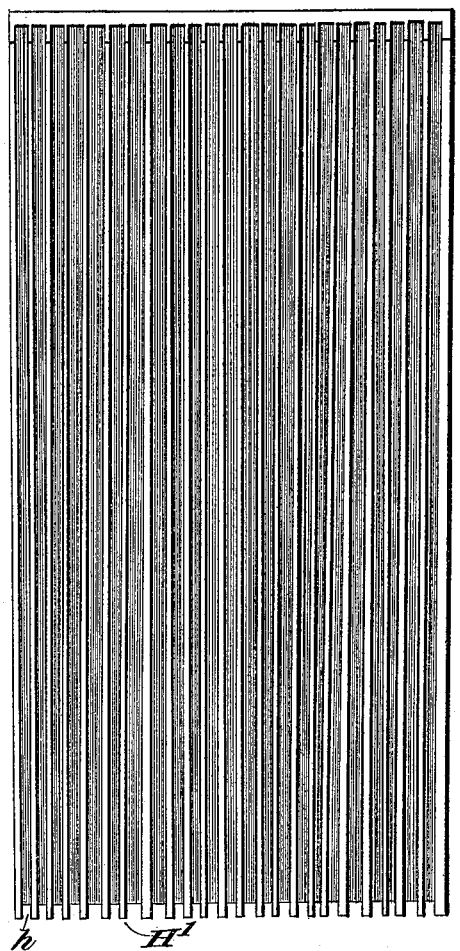
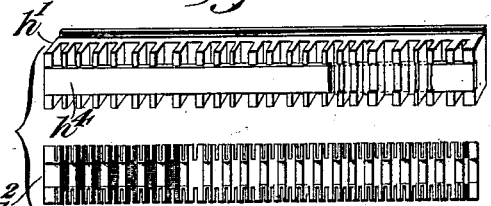
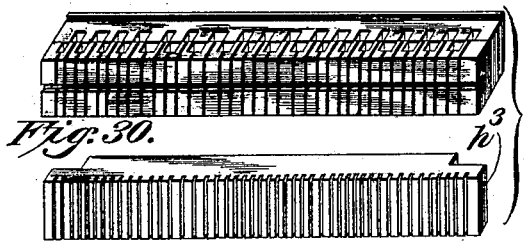

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 9.
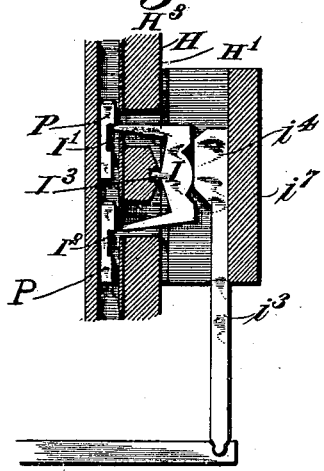
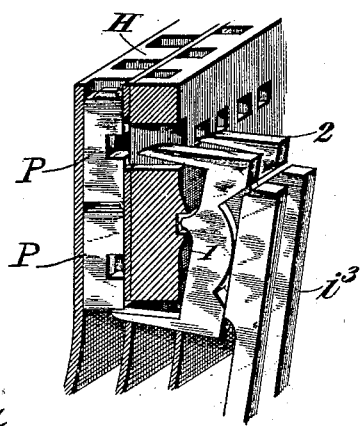
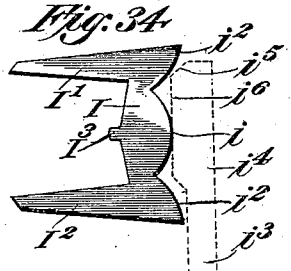
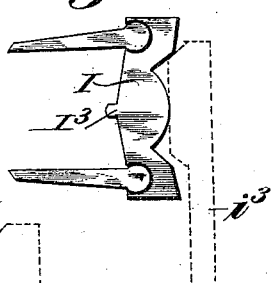
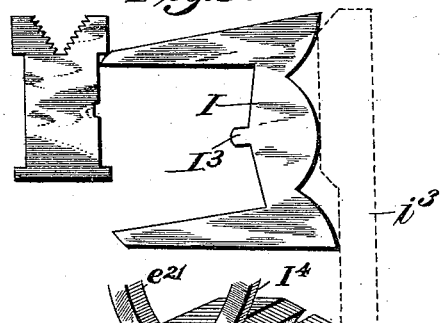
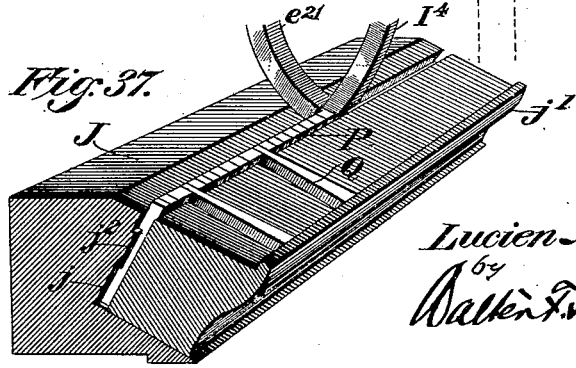
Inventor
Lucien A. Brott
by
Walter F. Rogers,
Attorney.
Witnesses

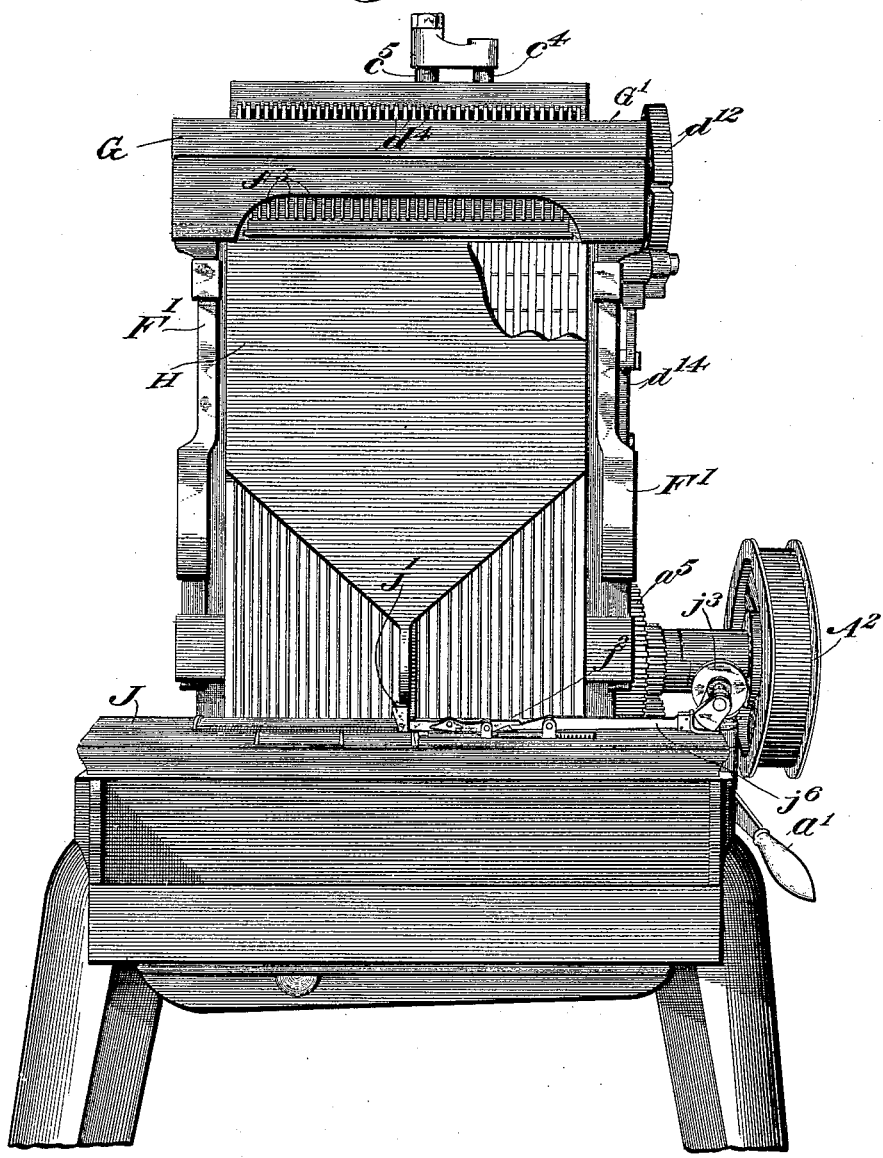

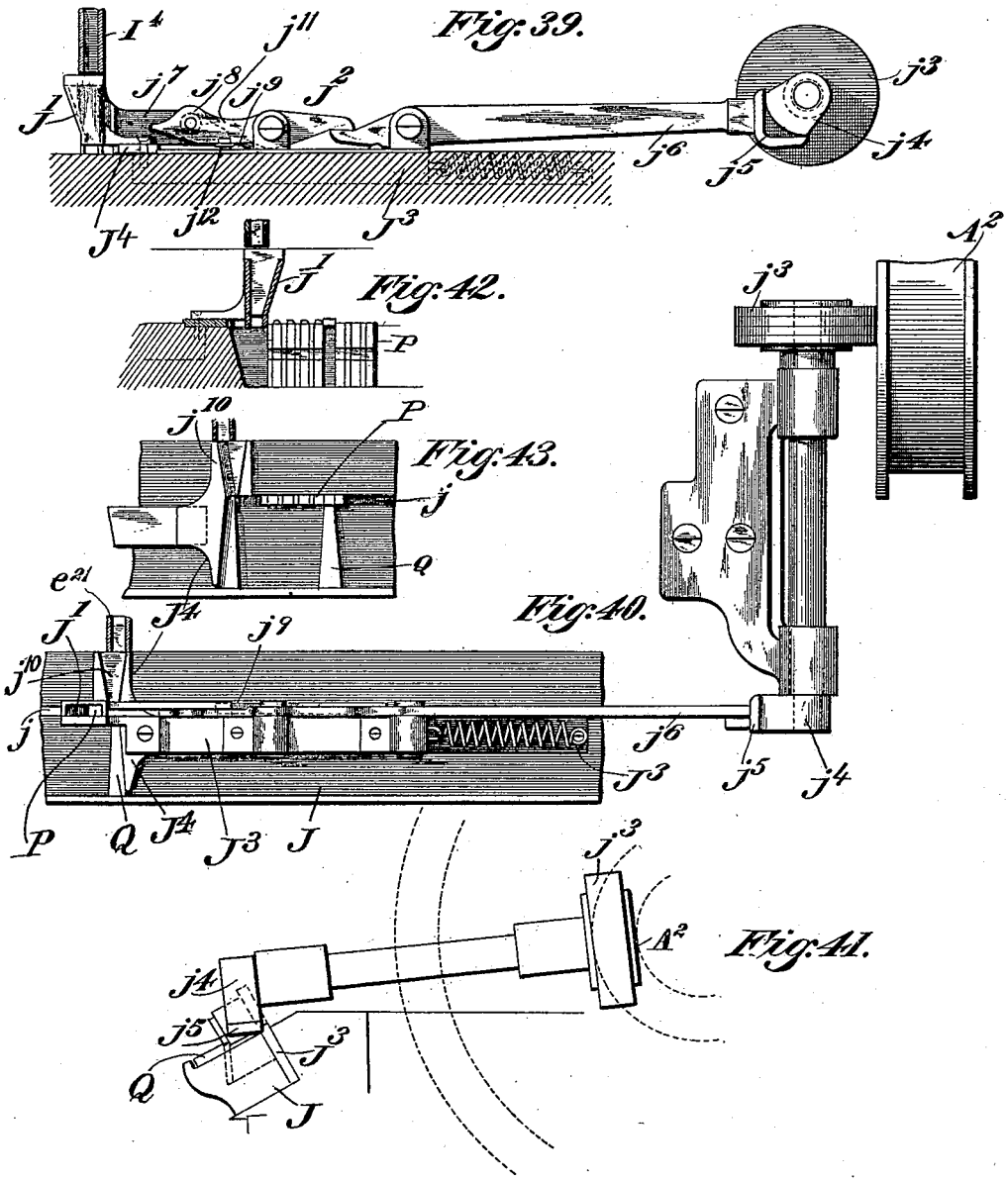

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 13.
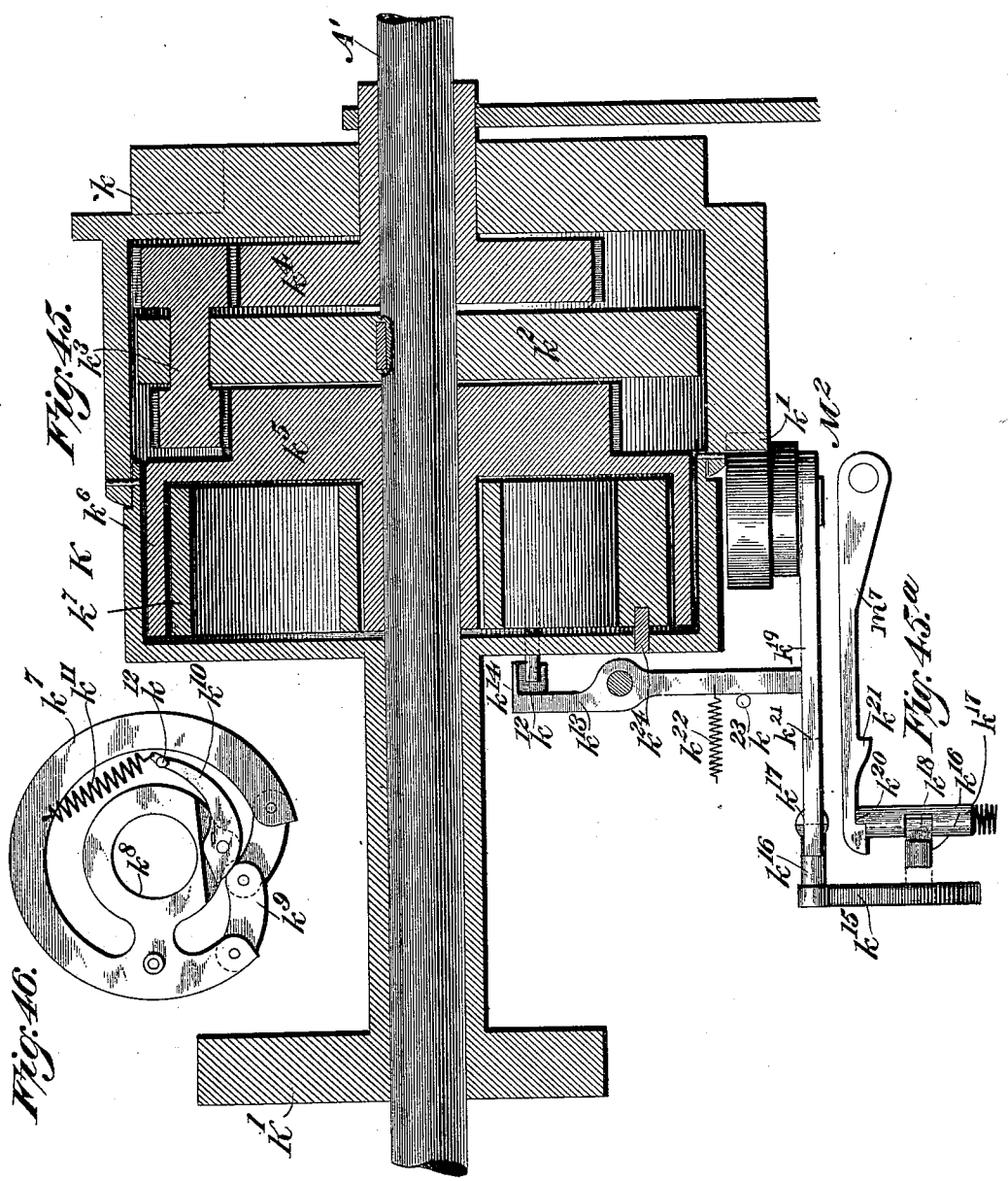

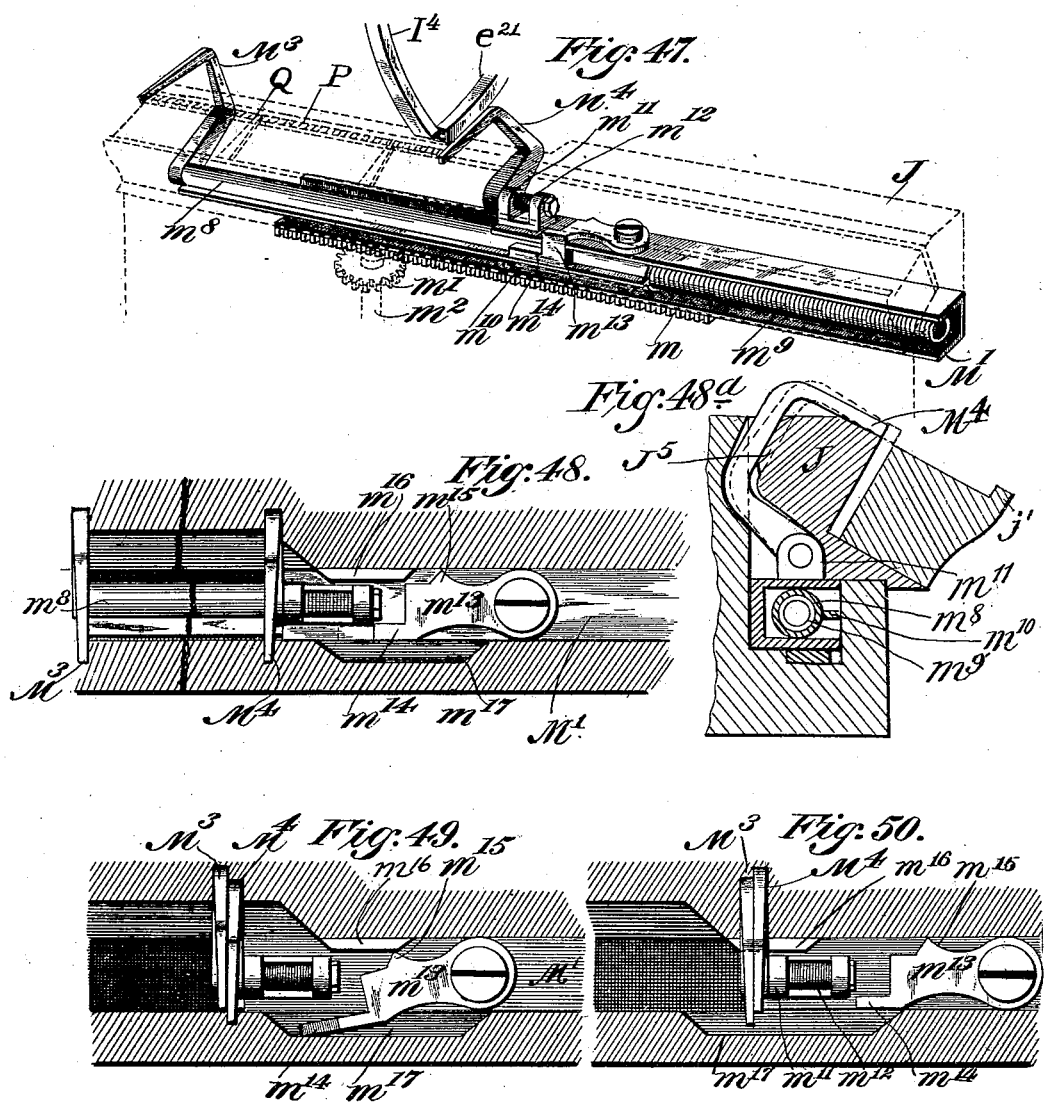

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 15.
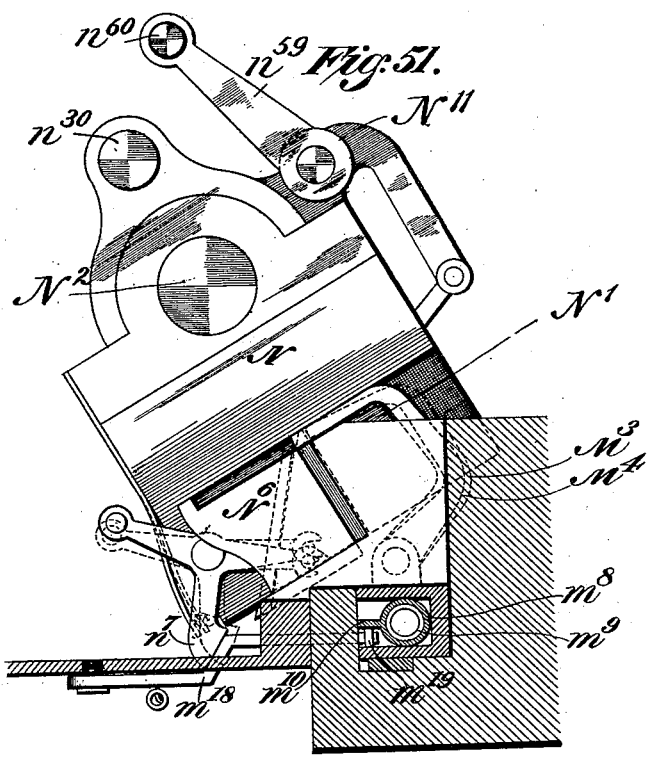
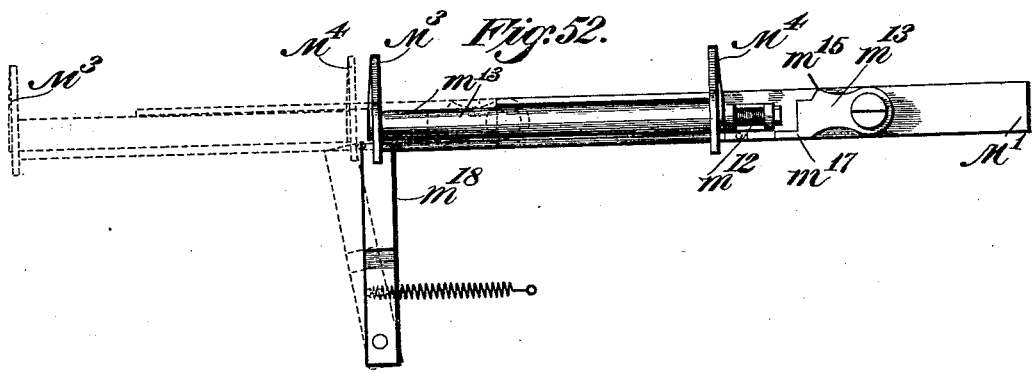

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 16.

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 17.
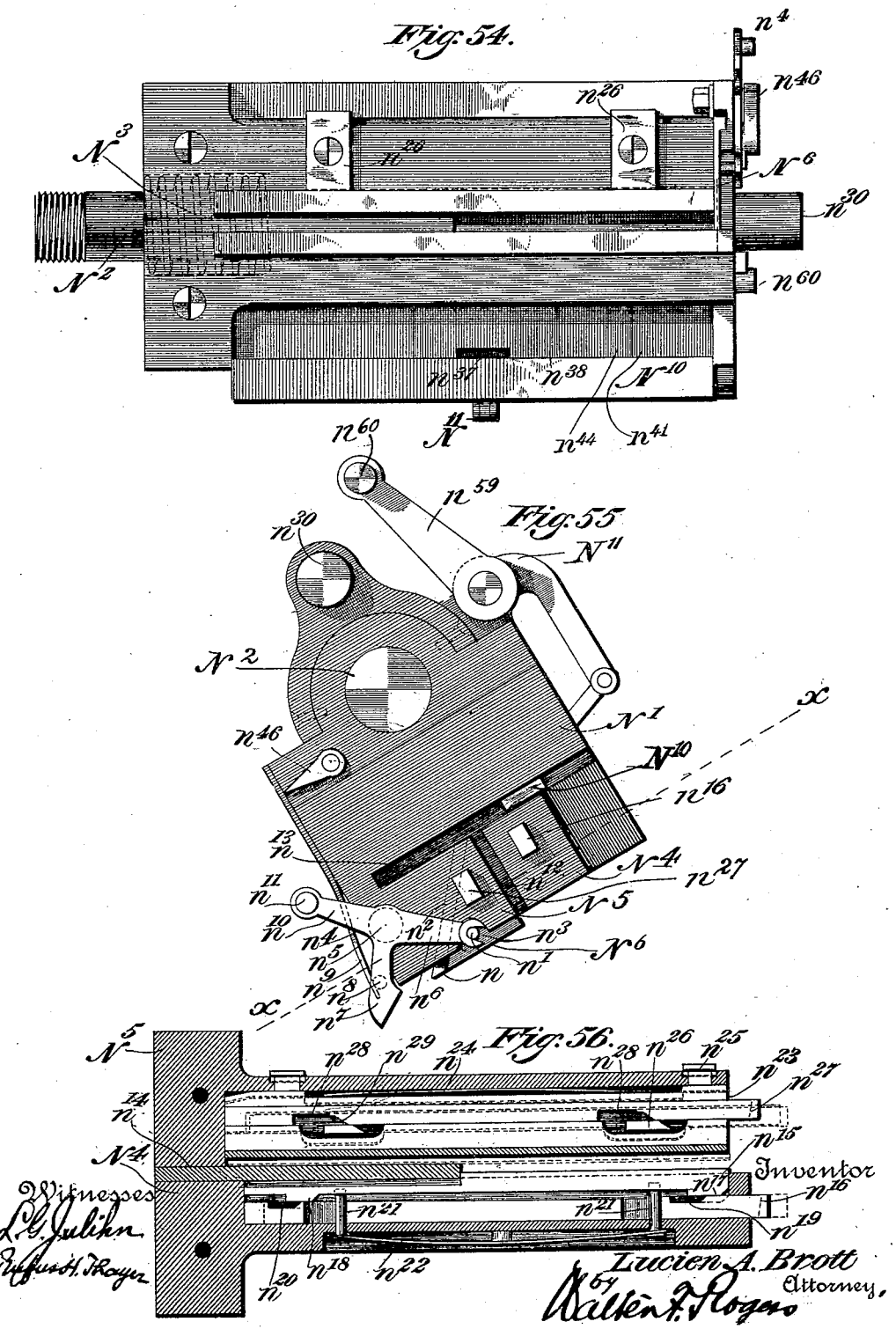

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 18.
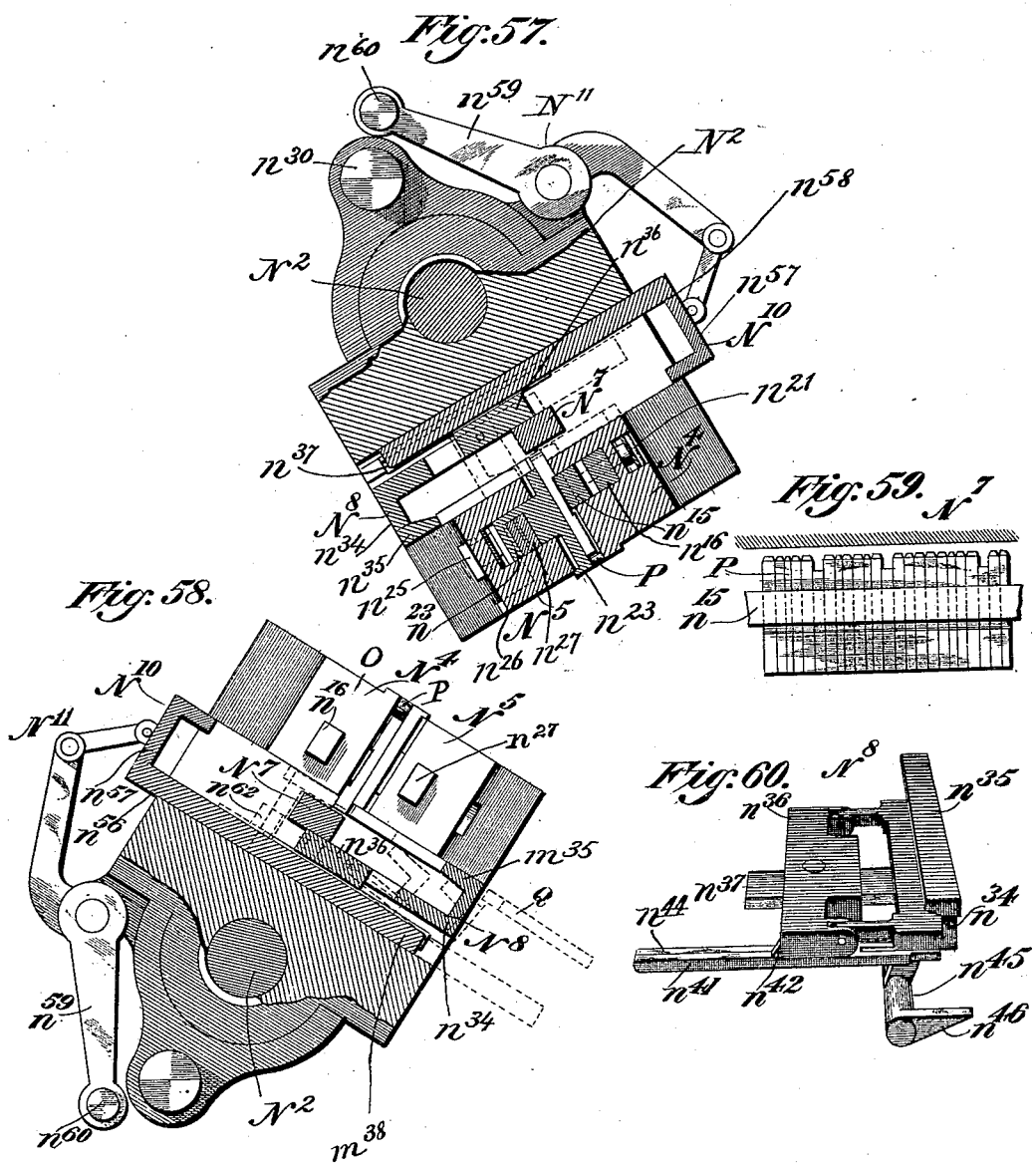

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 19.
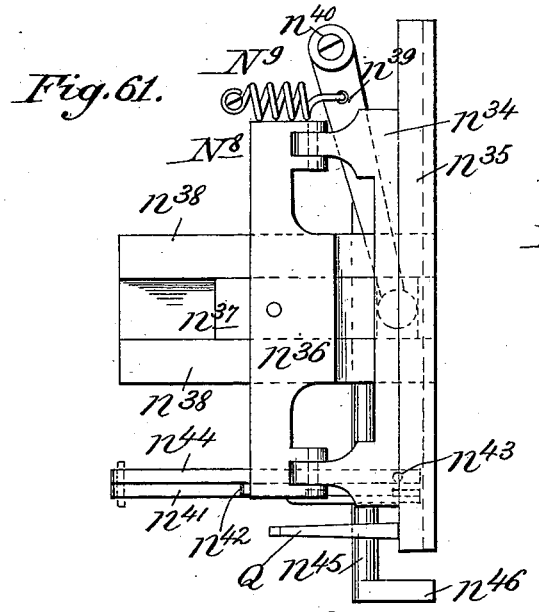
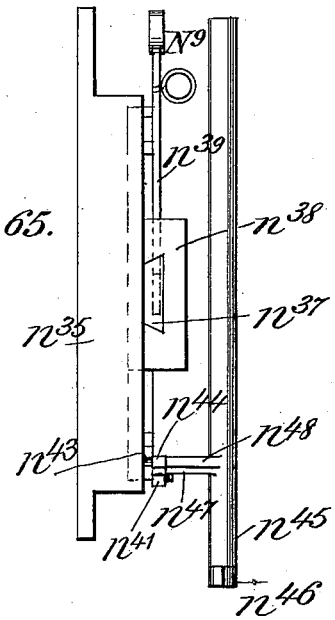
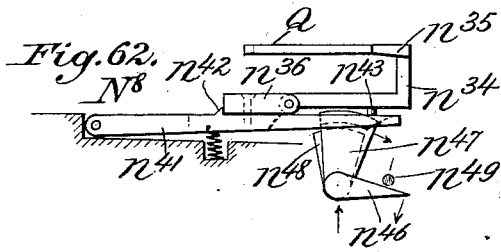
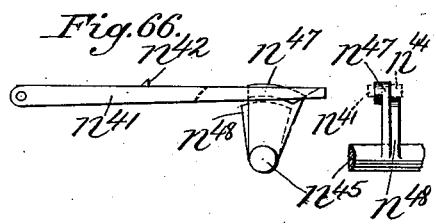
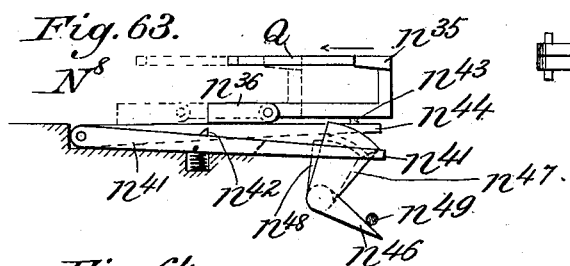
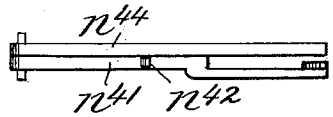
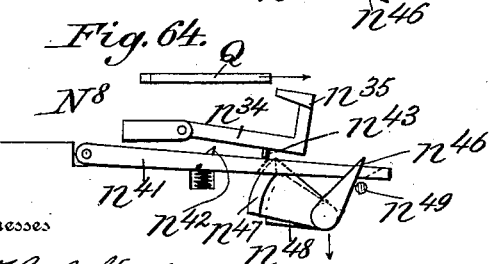

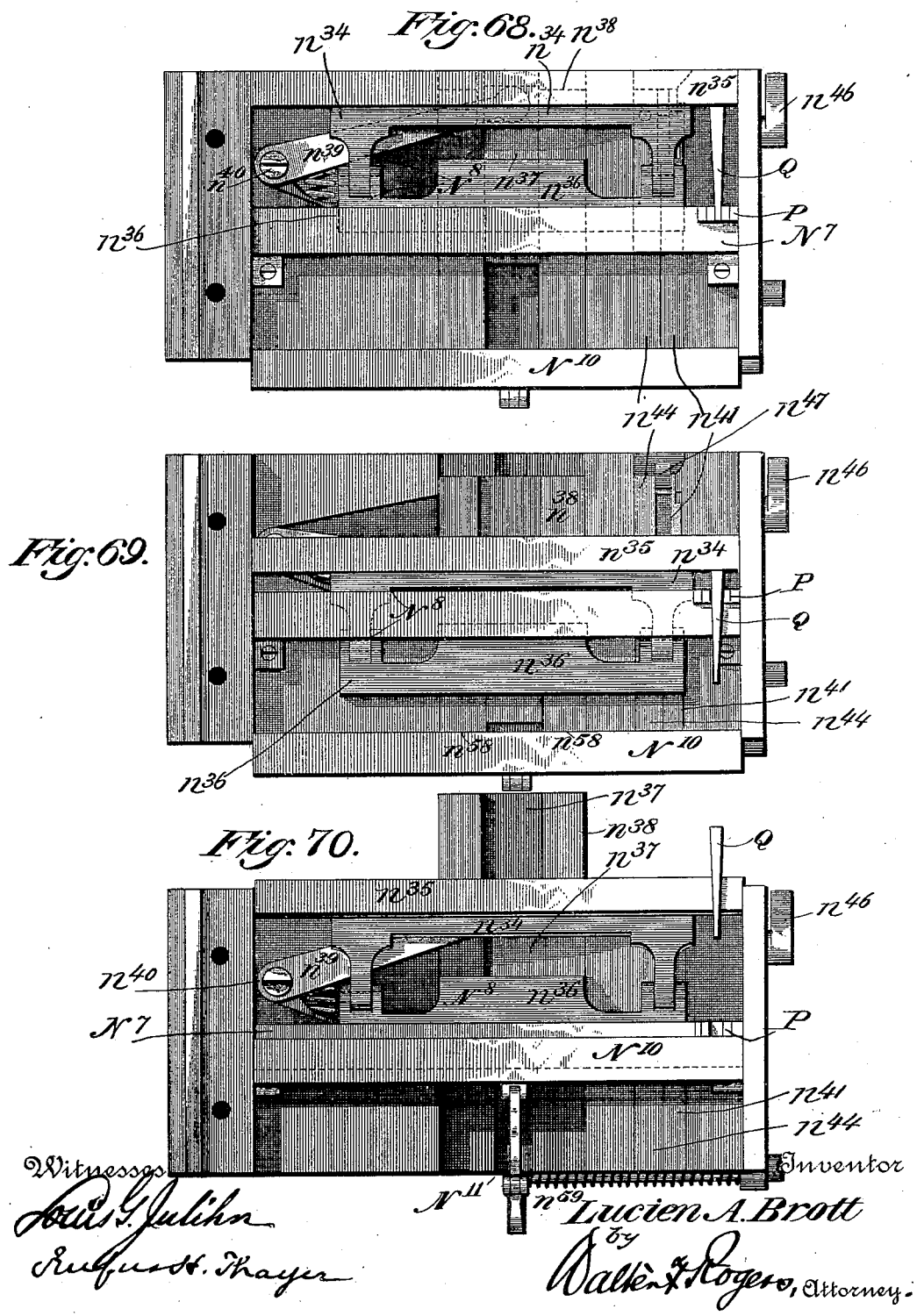

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 21.

Witnesses
Inventor
L. A. Brott

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 22.
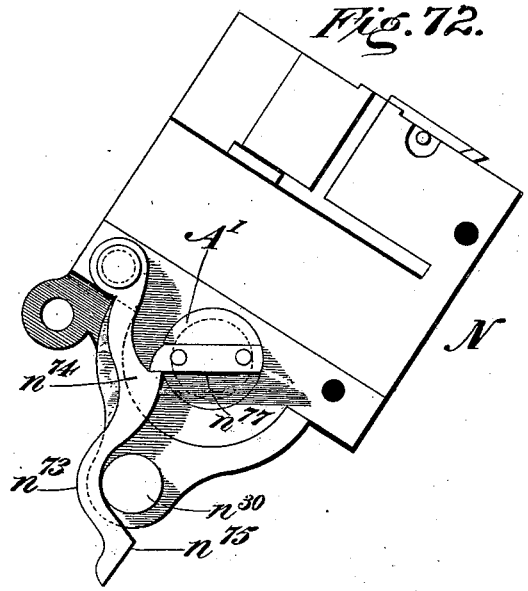
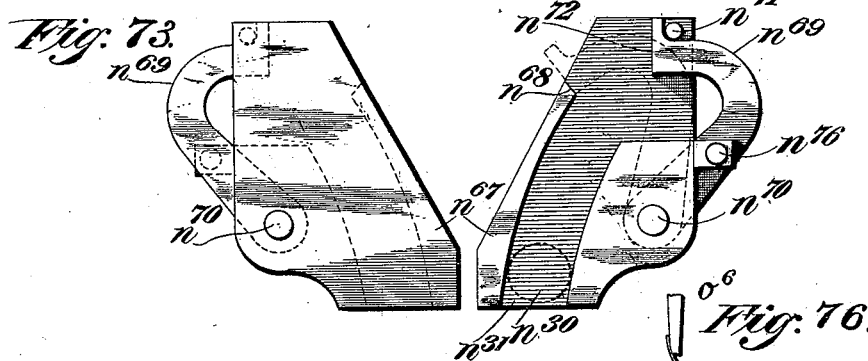
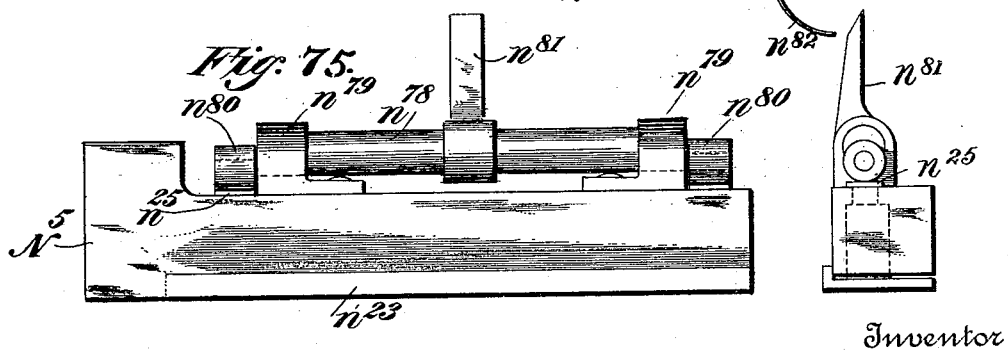
Witnesses
Inventor
Lucien A. Brott
Attorney No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 23.

No. 694,306. Patented Feb. 25, 1902.
L. A. BROTT.
MACHINE FOR THE PRODUCTION OF TYPES AND TYPE BARS.
(Application filed July 25, 1896.)
(No Model.) 24 Sheets—Sheet 24.
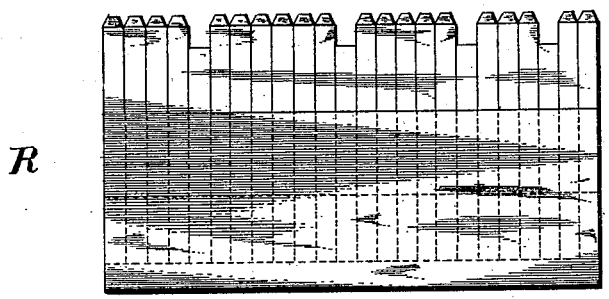
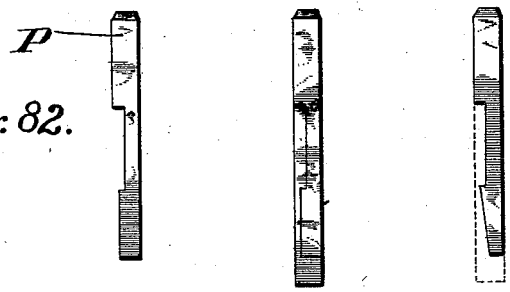
Witnesses
Inventor
Lucien A. Brott
by Walter J. Rogers, Attorney

UNITED STATES PATENT OFFICE.

LUCIEN A. BROTT, OF BROOKLYN, NEW YORK, ASSIGNOR, BY MESNE ASSIGNMENTS, TO THE COMPOSITE TYPE BAR COMPANY, OF JERSEY CITY, NEW JERSEY, A CORPORATION OF NEW JERSEY.

MACHINE FOR THE PRODUCTION OF TYPES AND TYPE-BARS.

SPECIFICATION forming part of Letters Patent No. 694,306, dated February 25, 1902.

Application filed July 25, 1896. Serial No. 600,492. (No model.)

*To all whom it may concern:*

Be it known that I, LUCIEN A. BROTT, a citizen of the United States, residing at Brooklyn, in the county of Kings and State of New York, have invented certain new and useful Improvements in Machines for the Production of Types and Type-Bars; and I do hereby declare the following to be a full, clear, and exact description of the invention, such as will enable others skilled in the art to which it appertains to make and use the same.

My invention pertains to the typographic art; and it particularly relates to that class of machines in which single types are cast in molds and assembled for printing; but it also and especially involves as the object of my invention the transformation of a line of such assembled units into a type-bar distinctive in general appearance and different in construction and type effect from any line of type or bar hitherto produced by any machine known to me.

The invention comprises mechanism to cast the units of a line of differing characters and to assemble these units into a line, then to permanently space the line and at the same time bind together the units to produce a type-bar of any desired length bearing characters of the most perfect formation and type effect and applicable to book, magazine, newspapers, or any other class of printing. Briefly, I combine in a single compact organized machine type-setting and line-transforming means or type-casting, type-storing, type-assembling, and bar-forming means.

My machine differs in principle from other machines, and it operates upon new lines in the manner and order of obtaining the cast type, regulating the supply thereof, assembling the units into a line, and regulating the formation, character, and transfer of the line, and includes also new ideas of justification and alinement and a new means for binding together the units of a line by casting additional metal between and upon them, thus in effect at once producing and applying to the line all the required permanent spaces and transforming the line into a type-bar.

The machine which I have perfected includes the parts and mechanisms which by careful study and experiment I have found to be adapted to carrying out my system. While it will be obvious to any one skilled in the art who reads the description that many modifications of the parts may be adapted to perform the necessary functions, I have purposed describing the best means hitherto devised for so doing.

In my machine I cast simultaneously in sets of molds a series of types bearing different characters by means which are easily susceptible of the most accurate arrangement with reference to the different widths of the several types, and I provide separate receptacles for the several types in the form of a compact magazine organized to accord exactly with the casting devices and to deliver the types with precision. No ejectors are used, and as a consequence I am enabled to completely surround each matrix by its mold, the matrix being made in and a part of the mold or firmly fixed in the mold, so that it need not be separated from the mold and is not exposed and comes in contact with nothing but the molten metal.

In my machine the types are released from the molds and permitted to fall by gravity into the proper channels of the magazine. They are brought over a magazine, the molds are drawn away from them, leaving them hanging by a recess upon a catch or "shank-block," which being moved out of contact with the types permits them to fall. No mechanism is required for operating ejectors or for placing the types in the magazine, thus greatly simplifying the machine.

I provide a mechanism for determining and regulating the feed of type to the channels of the magazine so that no type shall be supplied to a full channel and so that the supply shall always be governed by the demand. My device for accomplishing this consists, essentially, of a set of selecting-pins or "feelers" corresponding in number to the channels of a row of the magazine, which when the mechanism for releasing the types in the mold-carrier moves over to meet the mold-carrier returning from its journey to the melting-pot charged with cast type are projected into the several channels of a row. If a channel be full of type, the feeler that enters that cell will be lifted and in its upward movement will contact with and carry back the mold-operating finger, so that it may not act to release the type from the mold. The type then remains in and occupies the mold and prevents any further casting of that particular character until there be a demand for it, whereupon and without any care or attention on the part of the operator the supply is furnished automatically.

The magazine which receives the type and the escapement device which is operated from the keyboard may be of the usual constructions; but I prefer my inventions hereinafter described, by means of which I store in a compact space all the necessary types, a channel for each character or kind, and discharge them as required with a minimum of mechanism.

The magazine and the escapement are arranged to receive and sustain the types upright and to release a single type at a time with certainty. In my preferred system the recessed types stand end to end or in columns in the channels, each column carrying a distinct type, the shoulders of the types fitting the channels and the reduced ends clearing the inner reach of the fingers of the escapement-detents.

The escapement-detent is in one piece, and one movement releases a particular type and at the same time prevents the remainder from escaping, and the connection with the key-lever is the simplest possible, a free or detached bar requiring no exact or measured movement to attain the desired result.

The composing or assembling mechanism receives the types upright, and I am enabled by my system to keep the types substantially upright throughout the storing and composing, thereby economizing space and time and simplifying the machine.

The composed types lie in an inclined type-channel, so that the line may be read as formed.

As the line is composed it is fed forward step by step by a type-packer of my invention, being sustained and guided in the type-channel by a bar which engages recesses in the shanks of the types. When the line is complete, it is carried out of the composing-block by a transferring mechanism under the control of the operator.

The line is composed with justifiers lying across the line ready to be forced in. The preferred justifiers are of wedge shape except at the apexes, which have rectangular parallel faces. The rectangular apexes lie between the words, forming temporary spaces. The mechanism for transferring the line from the composing-block to the part (the "bar-block") which is to transform the line into a bar is organized to act quickly and surely and to forward the line and instantly return to engage the succeeding line.

In the bar-block the line is justified, alined, clamped, and presented to a mouth of the metal-pot. The metal is then cast about the shanks of the types, running up to the justifiers, into the recesses, and forming a base on the bottom of the line, so that the type-bar is strengthened and made "type high."

The bar-block is removed from the mouth of the melting-pot, the justifiers are removed and discharged, and the type-bars are discharged to a bar-galley, where they are maintained in order for use and open to constant inspection.

The types I cast are incomplete—that is, short, recessed, and preferably reduced. They are peculiarly fitted to form elements of the composite type-bar I produce, and they are also especially fitted to enable me to readily store and handle them in large numbers and to readily control them in assembling.

The type-casting, type-storing, composing, and bar-forming elements, while having functions, are all arranged with reference to the complete organized machine and the final product.

It will be observed that in carrying my system into effect I dispense with troublesome and costly movable matrices and with the mechanism necessary to handle and distribute them, thus at once avoiding a primary cause of expense and complication. Having but one and a fixed matrix for each individual type character, it is obvious that it may be made perfect and of the most durable material, so that the characters cast thereupon will be more distinct, of sharper angles, and better formation than when movable matrices are used or when linotypes are formed by indentation. In case of a character in frequent requisition it may be of advantage to have its matrix multiplied; but in the most extreme case the number is limited and the proportion is practically the same as in other machines in use, for the number of interchangeable matrices of the same character must be likewise multiplied in machines using them. The careful work done upon the face of the type is expended only upon that part of the type which is in all typographic machines required to be as perfect as the circumstances permit.

The peculiar opportunities presented by my system for producing accurate type-faces provide at the same time for a subsequent accurate alinement, for I reverse the bar-block, bring down the substantially perfect faces of the types as assembled and justified upon a level surface, securing thereby a correct alinement of any length of line. While the types are so alined and after they are clamped in place, I cast metal about their shanks and produce a composite type-bar bearing carefully and separately formed characters in accurate alinement.

My manner of using the types enables me to pay small attention to the finish of the shanks of the types, and, as stated, I purposely cast them less than the regular type height they have in the finished line or bar, so that the final casting about the line may add a solid base to them and make the type-bar strong.

The new principles and the specific details of the type casting and storing elements and the composing elements or, considering them conjointly, of the type-setting division of my machine, while being improvements in the type-setting art, have constant reference to the distinguishing essential principle of my organized machine, the conversion or transformation of the line into a type-bar which shall have all the printing characteristics of a line of individual characters and yet be free from the difficulties of handling inherent in a line.

In short, while seizing the advantages pertaining to type-casting and type-setting machines, I secure all the long familiar advantages of a spaced line or a type-bar by my mechanism for uniting the types by spaces cast between the words. I accomplish automatic justification and at the same time produce a type-bar, and with these qualities at the same time my machine has all the advantages of the best machines in use in its capacity for continuous, automatic, and rapid work, with the additional advantages of being small, compact, cheap, and doing perfect work without requiring skilled care and attention and without becoming inoperative.

In the accompanying drawings, Figures 1-44 illustrate the casting, storing, and composing elements, Figs. 37-44 being more particularly illustrative of the composing elements, Figs. 45-73 the bar-forming elements, and Figs. 74-78 the products of the methods and apparatus.

Figure 2:
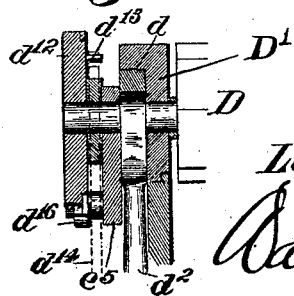
Figure 3:
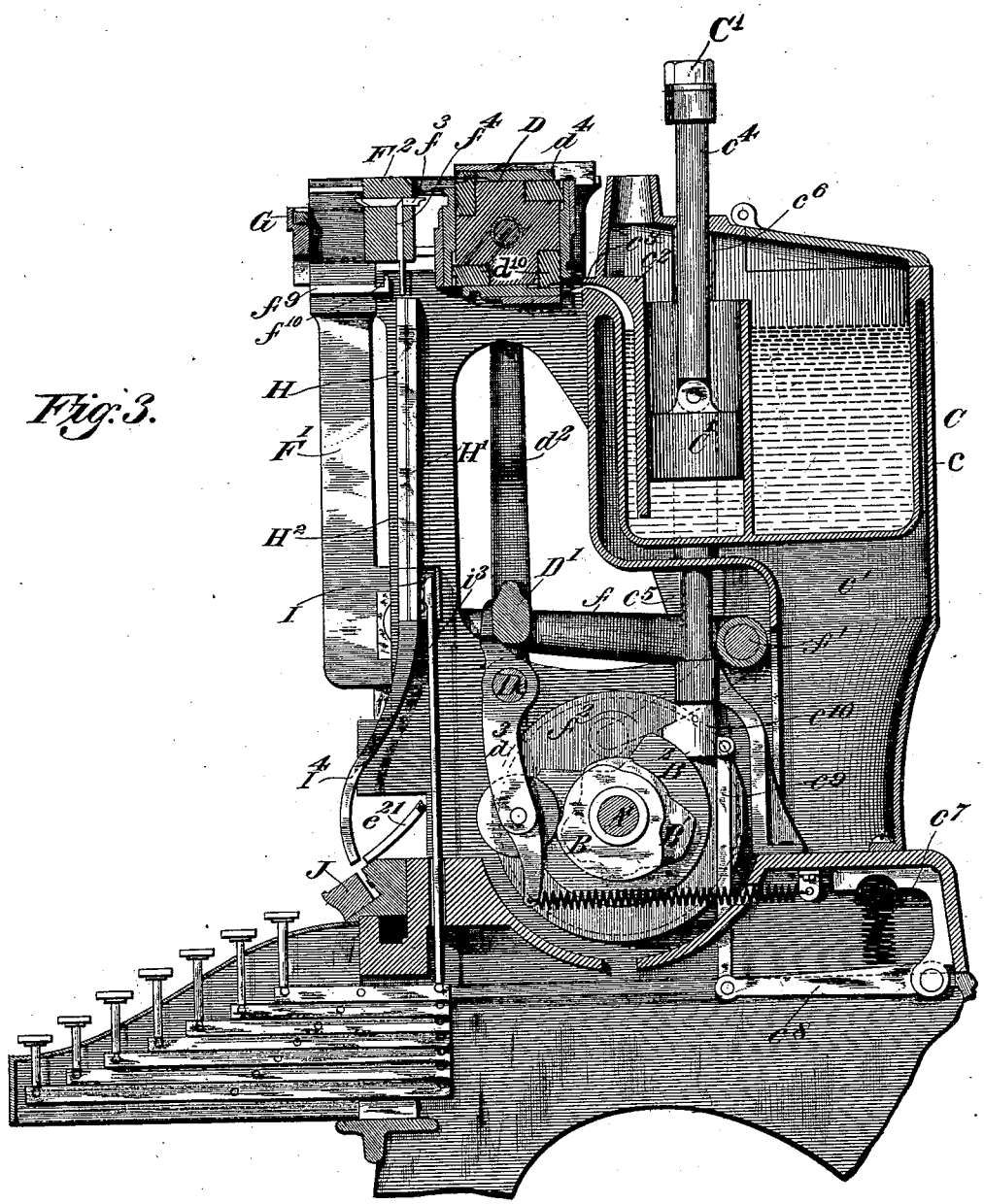
Figure 44:
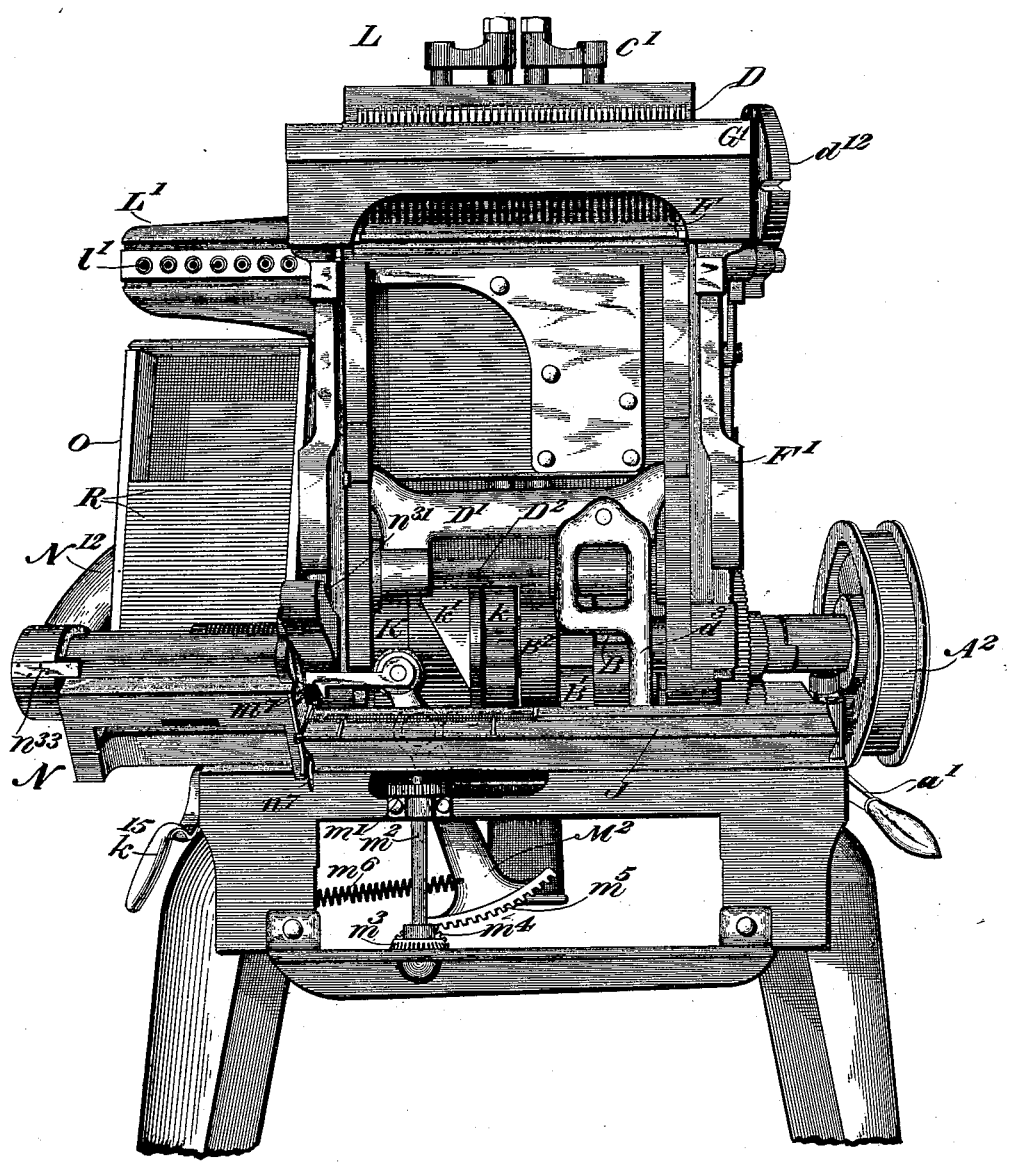
Figure 53:
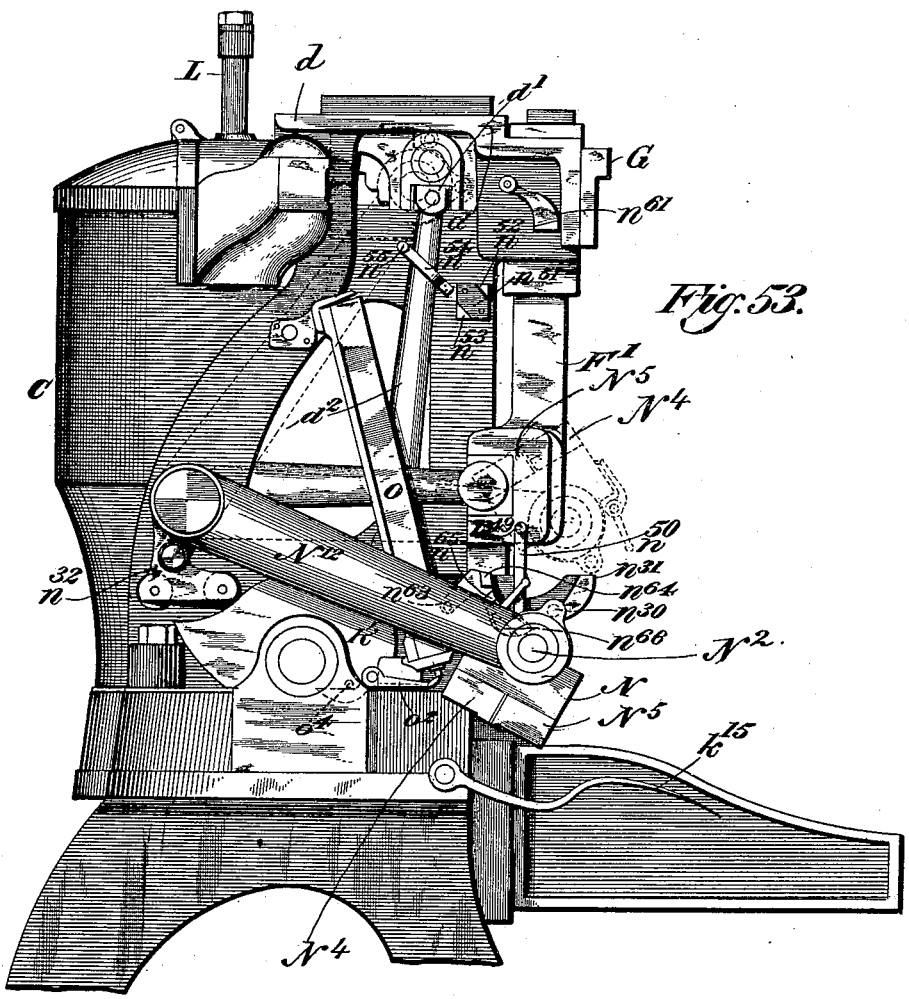
Figure 71:
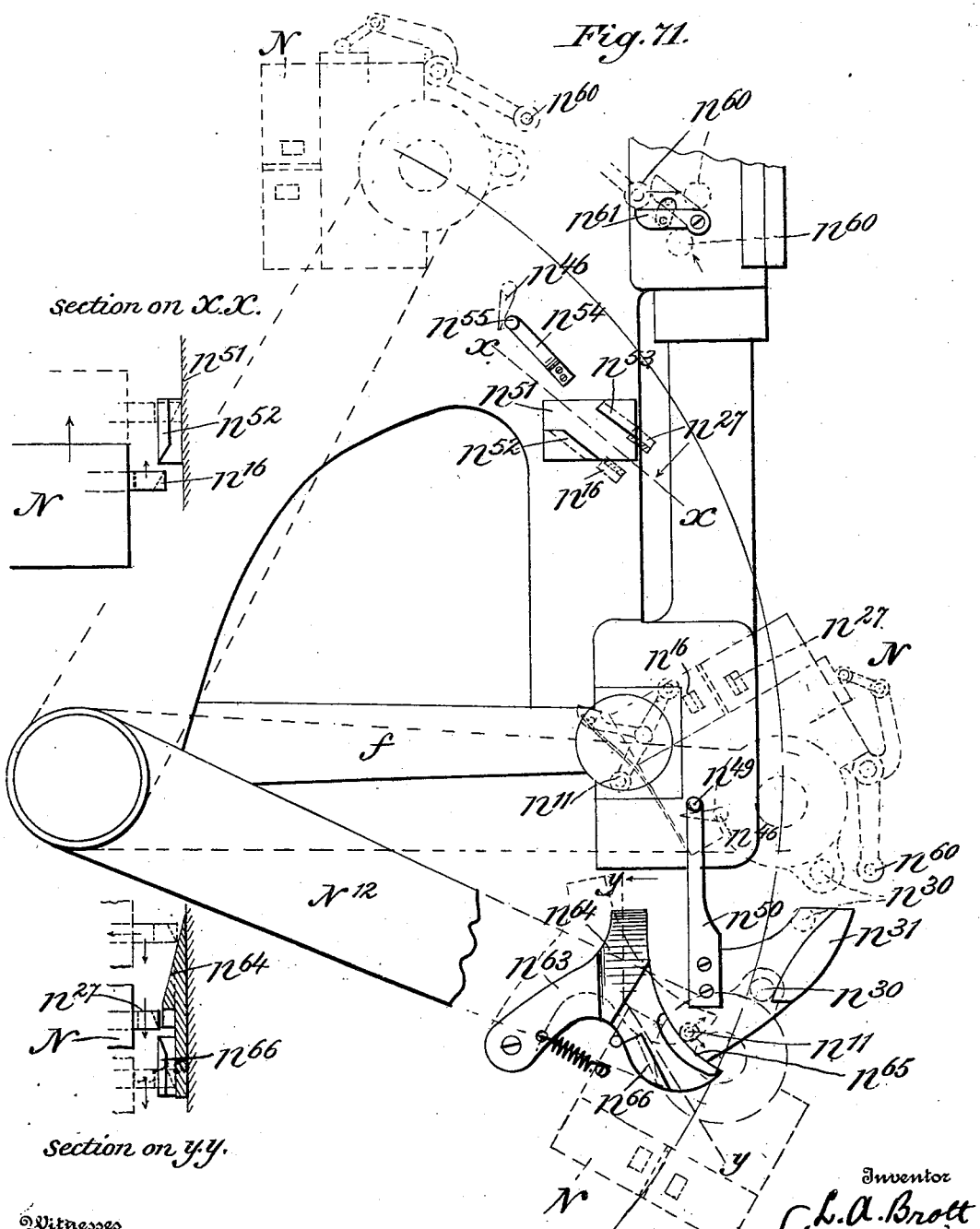
Figure 77:
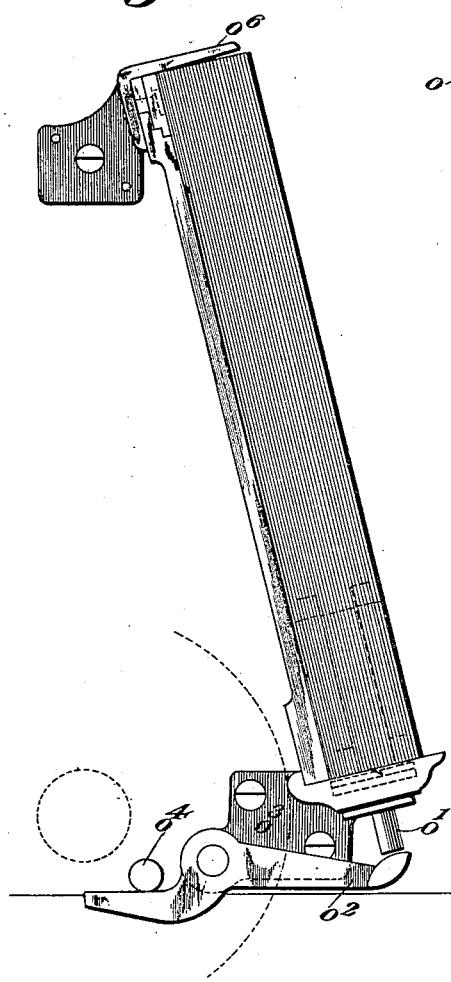
Figure 78:
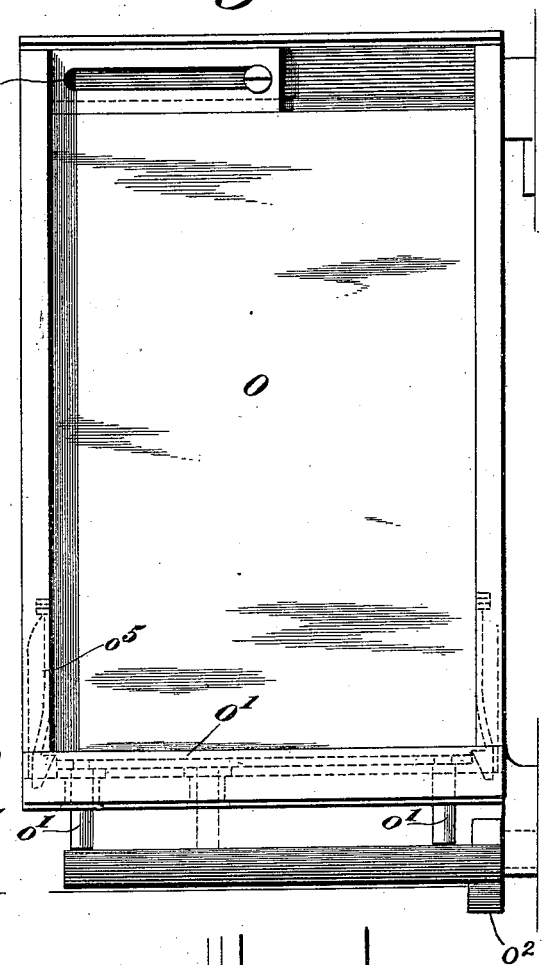
Figure 79:
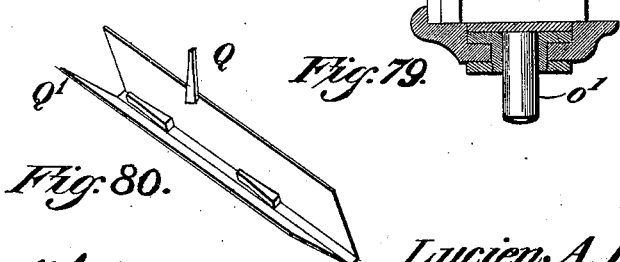
Figure 80:

Fig. 1 is an elevation of the gearing side of the machine. Fig. 2 is a detail showing the means for rotating the mold-carrier and the relations of the mold-carrier and the bracket for actuating the auxiliary justifier-mold. Fig. 3 is a longitudinal section with especial reference to the casting and storing elements. Fig. 4 is a plan perspective of the driving and cam mechanism of the casting and storing elements; and the detail Figs. 5, 6, 7, 8 are respectively of the cam for reciprocating the mold-carrier, the cam for operating the type-casting pump, the camway for rotating the mold-carrier, and the cam for vertically reciprocating the type-releaser. Figs. 9 and 10 are sections of the mold-carrier and type-releaser, being accompanied by Fig. 9$^a$, showing a solid mold; Fig. 9$^b$, a modified mold with a lug instead of a notch in the end and with a removable matrix-head; Fig. 9$^c$, my preferred mold, having a yielding side; Fig. 9$^d$, the guides for the molds; Fig. 9$^e$, one mode of preventing the molds from being jarred out of position; Fig. 10$^a$, a relative position of the mouth of the melting-pot, and Fig. 11 showing a detail of the catch-bar which finally sustains and the latch which finally releases the types. Fig. 12-15 illustrate the auxiliary justifier-mold in action, and Figs. 16-18 are accompanying details. Figs. 19-22 illustrate the relations of the mold-carrier and the type-releaser, while the accompanying Figs. 23 and 24 illustrate the opposite cut-away ends of the mold-carrier. Fig. 25 illustrates the stop mechanism and its relation to the mold-carrier and type-releaser, while Fig. 26 is a detail showing the operating parts of the stop mechanism in perspective. Figs. 27-30 illustrate the magazine, the last two figures being details of the block which receives the magazine and through which the escapement-detents work, this being also illustrated in substance and in principle in Fig. 32. Figs. 31 and 32 represent the escapement in action, being accompanied by details and modifications in Figs. 33-36. In Figs. 31 and 32 the magazine H is shown in modified forms. While the relations of the channel is the same, the views do not illustrate the specific block H$^4$ of Figs. 27, 29, and 30. Fig. 37 is a perspective of the composing-frame. Fig. 38 is a front elevation of the casting, storing, and composing elements—that is, the type-setting division of the machine with the keyboard removed. Figs. 39 and 40 are respectively side and plan views of the type-packer, being accompanied by the diagrammatic view, Fig. 41, and the details, Figs. 42 and 43. Fig. 44 is a front elevation of my machine with the keyboard and magazine removed and the bed broken away to show connection of the line-transfer carriage and transfer-lever. Fig. 45 is a section of the cam mechanism of the bar-forming elements, accompanied by a detail 45$^a$ of the operating lever and latch; and Fig. 46 is a detail of the split-ring or toggle-clutch lying in the drum of the cam mechanism. Fig. 47 illustrates the line-transfer carriage applied, being accompanied by detail Figs. 48-50, illustrating the guard in control and the cam action upon the return of the line-transfer carriage, while Fig. 51 illustrates the relations of the transfer-carriage and the bar-block, being accompanied by a detail, Fig. 52, illustrating the travel of the line and the action upon the end gate. Fig. 53 is a side elevation of the machine from the bar-block side. Figs. 54 and 55 are respectively a plan view and an end elevation of the bar-block. Fig. 56 is a section of the jaws of the block through the line $x\ x$ of Fig. 55. Figs. 57 and 58 are sections looking back into the bar-block. Fig. 59 illustrates the line of type as it enters the block hanging upon the sustaining-bar and ready to be reversed upon the alining-bar. Fig. 60 is a detail of the justifier-bar, and Figs. 61-70 are details of the devices for retaining and operating the justifier-bar and illustrate the relation and progressive actions of the elements lying below the jaws for forcing in and discharging the justifiers and returning the parts. Fig. 71 is an outline or diagrammatic view illustrating the action of the bar-block in its movements to and from the melting-pot and the position of the lugs, tappets, and similar parts. Figs. 72-74 are details of the devices I use instead of a spring and stop to impart a positive rotation to the block and to lock it in place, while Figs. 75 and 76 are details representing the device I use instead of a spring to clamp the justifier-line in the bar-block. Figs. 77 and 78 are respectively front and side elevations of the bar-galley, and Fig. 79 is a detail of its adjustable operating-pin. Fig. 80 is a detail showing a hopper which may be applied to the machine to conduct the discharged justifiers back to the magazine in case they should be of hard metal or it should be expedient to use them again without re-forming. Fig. 81 illustrates the composite type-bar made by this machine and indicates the relations of the types and metal backing therein. Figs. 82, 83, and 84 illustrate my preferred type, the type with its backing of metal, and a modified form of type. Fig. 85 illustrates the preferred justifier used in this machine and which may be cast in the machine.

The drawings are arranged as nearly as possible in the order of the operation of the several parts and the description follows a like order, as suggested by the accompanying index, the reference-letters being applied in the drawings and the description to separately designate divisions of the machine, the upper-case letters and the powers thereof designating the essential elements and the corresponding lower-case letters the details of the several elements.

I. Type Casting and Storing Elements.

1. Driving and cam mechanism ...... A B
2. Melting-pot and pump ............ C
3. Mold-carrier and molds .......... D
4. Auxiliary justifier-mold ......... E
5. Mold-operator .................... F
6. Stop mechanism ................... G
7. Magazine ......................... H
8. Relations and operation of the type casting and storing elements.

II. Composing Elements.

9. Escapement ....................... I
10. Assembling or composing mechanism ........................... J

III. Bar-Forming Elements.

11. Cam mechanism ................... K
12. Melting-pot and pump ............ L
13. Line-transferring mechanism ..... M
14. Alining, justifying, and metal-backing mechanism ................ N
15. Bar-galley ...................... O
16. Operation.
17. Modifications and equivalents.

IV. Products of the Machine.

18. Types ........................... P
19. Justifiers ...................... Q
20. Composite type-bar .............. R The several features are to be first described with particular reference to details of construction, with brief indications of function.

The elements for casting and storing are so intimately related that the full presentation of the purposes and operations of each is reserved for the division "8. Relations and operations of the type casting and storing elements."

The "Composing elements" need no detailed account of their operation, that being obvious after a description of construction. The description of the several features of the "Bar-forming elements" in a like manner carries with it the operation; but the importance of this feature of the case calls for a recapitulation in the form of a connected narrative under "16. Operation." In the last division, "Products of the methods and apparatus," the description of "Types" and "Justifiers" is in part a repetition of what has preceded; but the fact that these products may have a wide application independent of any mechanical means for producing them, and on the other hand their intimate relation to the "Composite type-bar," demands a separate and connected description.

1. *Driving and cam mechanism A B*, Figs. 5–8, 1, 3, 38.—The power of the machine is transmitted and the automatic movements effected through the shaft A', extending across the machine. The casting and storing of the type proceed automatically, without reference to the assembling of the units into a line, while the movements of the mechanism for transforming the line into a type-bar proceed automatically, at intervals preferably determined by the operation of a hand-lever. It is purposed under this heading to locate the parts and state generally their functions, leaving the specific effect of the actions for the succeeding description of the parts affected. The shaft bears at one end, (the right end, as illustrated,) a pulley $A^2$, having a clutched sleeve, which may by the operation of the lever $a'$ be thrown out of engagement with the shaft A'. Lying just within the frame of the machine are the gears $a^2$ $a^3$ $a^4$ $a^5$, which modify and transmit to the driving-shaft the power applied to the pulley. The pulley $A^2$ embraces loosely the shaft A' and carries half of the clutch which takes into the other half formed by a short sleeve projecting inward from the pinion $a^2$, the parts being normally held in engagement by means of a spring (not shown) held in the face of the pulley $A^2$ and tying that pulley to the shaft A'. The pinion $a^2$ drives the gear-wheel $a^3$, which turns upon a shaft (not shown) in the bed of the machine. A pinion $a^4$ is carried by this shaft and is operated by the revolution of the gear-wheel $a^3$ to impart the final rotary motion to the gear-wheel $a^5$, keyed to the shaft A'. The power is thus transmitted to the shaft A', being reduced in the proportion of ten or twelve to one. The gear-wheel $a^5$ has in its outer face the camway $B^3$ for rotating the mold-carrier. Beyond the bearing $a$ are the three cams B B' $B^2$, the functions of which, as described in detail hereinafter, are respectively to impart a horizontal movement to the mold-carrier, to the melting-pot, to vertically reciprocate the device for releasing the cast type from the mold-carrier and for regulating the supply of type to the magazine, and to permit the operation of the pump for forcing molten metal into the type-cavities of the molds. This completes the driving and cam mechanism necessary for the automatic operation of the type casting and storing elements.

2. *Melting-pot and pump C*, Figs. 3 and 1.—The melting-pot C is stationary, and while it may be secured to the frame in any obvious manner it is preferably supported and enveloped by the jacket $c$, thus securing the greatest economy in the application of the heat and the best results in attaining an even viscosity of the molten metal. The heat is applied by means of burning gas or other suitable fuel adjacent to the point $c'$. The pot has a mouth $c^2$, with a series of nipples $c^3$, corresponding in number with the number of molds of any surface of the mold-carrier D, and carries a pump $C'$ to force the molten metal to the type-molds $d^4$. The piston-rod $c^4$ of the pump $C'$ is connected by a yoke to the operating-rod $c^5$ and is preferably inclosed by the jacket $c^6$ within the pot. The operating-rod $c^5$ of the pump $C'$ has a constant downward pull exerted upon it by the spring $c^7$ operating upon an arm $c^8$ of a link through the arm $c^9$, the effect of which when free to act upon the pump is to force down the piston; but the rod $c^5$ rests in a shoe $c^{10}$, attached to the rod $c^9$, and until the shoe drops into the depression of the cam $B^2$, upon which it bears, the spring cannot act upon the piston.

3. *Mold-carrier and molds D*, Figs. 9-11, 1-3, 44-53, 19-24.—The mold-carrier D is journaled in slides D', which move along ways $d$. On each side, extending from the slides, is a block $d'$, in which is swiveled an arm $d^2$. These arms are carried by a bracket D', journaled on a shaft $D^2$ and rocked by an arm $d^3$, having a wide head secured to the bracket D' and being in operative connection with the cam B upon the main shaft A'. It is apparent that the mold-carrier may be rotated, and the parts just described enable it to also be moved automatically to the metal-pot, and at the proper intervals a spring attached to the end of the extension $d^3$ returns the carrier to the magazine H. The mold-carrier is polygonal and may have any practicable number of sides or faces. In this instance it is shown as having four faces, each carrying a set of molds $d^4$, so gaged with relation to the carrier that the mold may slide up the length of a type and back again into its normal position on the carrier. Each mold $d^4$ has a recess or groove $d^5$, and there is a corresponding groove $d^6$ in a plate $d^7$, secured to or a part of the mold-carrier, and between these grooves fits a feather $d^8$, which serves to guide the mold in its movement along the plate $d^7$ upon the face of the mold-carrier. The mold has a type-cavity for receiving and casting the type, and a provision, as a notch or lug, to be engaged by the finger of the "mold-operator," hereinafter described, the mold being held in frictional contact with the body of the mold-carrier by springs, one of which is shown at $d^9$. The molds are preferably made in two pieces, as shown in Fig. 9$^c$, so that a cast type may not be too closely held by the mold, the free side of the mold yielding, as shown by dotted lines, when removed from a wide type. To make one side free, it is sufficient to cut it flush with the bottom of the type-cavity, as is indicated in the extension detail in Fig. 9$^c$, nearly up to the matrix.

On each face of the mold-carrier and extending entirely across it is a catch-bar $d^{10}$, in this instance being placed at the corners of the mold-carrier, so that a bar lies directly facing the type-cavities of a series of molds and bears upon its side against the inner face of the next succeeding series of molds. Each catch-bar has its face extending into the type-cavities of the molds and imparts a predetermined form to the shanks of the types and locates the recesses therein when casting. I have shown these faces at $d^{11}$ in Figs. 9 and 10, and while it is obvious that a face could be cut upon the bar I have shown my preferred mode of applying a face to the bar—that is, by grooving the front of the bar and forcing into the groove a tenon on the back of the face, so that a dovetail or similar joint is made. It is obvious that the face of the bar may have any desired conformation, the one I have shown in the figure named modifying the type, so that it is peculiarly adapted to serve as a unit in a line to be transformed into a bar by adding cast metal thereto. Each face $d^{11}$ is thicker at the top than at the bottom and constitutes in effect a matrix for the shank of the type. The result of applying this face is that in casting the thicker projecting part forms a recess in the shank of the type, while the thin projecting part causes the end of the shank of the type to be reduced as compared with the width of the top of the type which is cast above the face. Each bar $d^{10}$ has upon each end a projection $d^{19}$, having a slight angular cut or is cut away, leaving a vantage against which may operate the projecting arms of the mold-operator, as hereinafter described, to drive back the bar against the pressure of the spring $d^{20}$. I term the bar $d^{10}$, briefly, the "shank-block."

On the end of the shaft of the mold-carrier is mounted an index-disk $d^{12}$, Figs. 1 and 2, having pins $d^{13}$, which are engaged by the hooked arm $d^{14}$, operated by the elbow-lever $d^{15}$ and the camway $B^3$ upon the gear-wheel $a^5$, whereby the mold-carrier is given a quarter-turn at predetermined intervals. The disk has also four notches in its periphery, which are in turn engaged by a spring-pressed detent $d^{16}$, pivoted to the frame of the machine or to a bracket attached to the frame, to hold the mold-carrier stationary at certain intervals. The downward movement of the arm $d^{14}$ operates an auxiliary arm $d^{17}$, which removes the detent $d^{16}$ from its notch and rides past it without effect upon the return movement of the two arms. The hub $d^{18}$ of the disk is cut away or flattened at two points, as shown, Fig. 25, so that the hub may operate as a cam for the arm $g^3$ of the stop mechanism, as hereinafter described.

It is obvious that the size of the type-cavities in the several molds must vary to produce the different sizes of types, that there must be a like difference in the width of the molds, and that to accommodate these requirements the nipples and the molds must be accurately arranged in the correct relations. This is a matter of calculation to fit any scheme of printing, and it is not necessary to elaborate the proportions herein, it being observed that the central relation of the mold-carrier should be retained when casting, so that the carrier always comes to the pot in the same way, the nipples registering with the center or side of the cavity according to the width of mold.

The mold-carrier discharges into a magazine H, described hereinafter. It will be observed that there are in this example of my invention two series of channels in the magazines, while there are four series of molds in the mold-carrier D. The four series of molds must therefore discharge into the two series of channels, and at each movement of the mold-carrier to the magazine one of the rows of channels must be selected to receive the types. The molds and the channels are arranged on a corresponding scale, each mold embracing two opposed channels. The center of any mold must always be brought to the center of the channel into which it is to discharge. Hence the mold-carrier has, in addition to its horizontal and rotary movements, a capacity of lateral adjustment to bring the molds into registry with a selected row of channels of the magazine and to maintain the central registry with the melting-pot. This movement is imparted at each movement to and fro of the mold-carrier by means of the guides $d^{21}$, which are strips of metal set in the side of the ways $d$ near the magazine and are cut obliquely facing the carrier, so that in turn one of the cut-away edges $d^{22}$, formed on diametrically opposite corners of the carrier, may clear the guides. (See Figs. 22–24.) As the mold-carrier approaches the magazine on one side of the machine a cut-away portion comes up to the opposed guide $d^{21}$, and is not effected thereby, while on the other side of the machine a full portion of the mold-carrier rides upon the incline face of the opposed guide $d^{21}$, with the result that when that side of the mold-carrier lies against the wide part of the guide the carrier has been given a lateral adjustment and the cut-away edge of the carrier fits over the opposed guide. As has been described, the mold-carrier on its return to the melting-pot makes a quarter-turn, so that the mold-carrier goes to the melting-pot with its full sides opposed to the guides $d^{23}$, placed on the ways $d$ near the melting-pot. It is apparent that the guides $d^{21}$ and $d^{23}$, which may be of similar form, occupy a clearance between the ways $d$ and the mold-carrier. It is also apparent that each guide $d^{21}$ must be as wide as the clearance, but the guides $d^{23}$ divide the clearance. Hence when the mold-carrier comes toward the melting-pot in its previous position to one side, obtained at the magazine by the action of one of the guides $d^{21}$, the full edge of the mold-carrier rides up a guide on one side until at both ends the full surface registers with the full parts of the guides $d^{23}$, the mold-carrier then lying between the guides, centrally disposed in the machine, and always in the same relation to the melting-pot and ready to receive the metal. Thus at the magazine end the mold-carrier is given a positive movement alternating to the right and left, and at the melting-pot the carrier is centered by the guides. In Fig. 9$^e$ I have shown one mode of preventing the molds from jarring out of position, a bead $d^{23}$, upon the guide taking into a depression in the mold.

*4. Auxiliary justifier-mold E*, Figs. 12–18, 1, 2.—The justifiers may be cast and stored together with the types; but inasmuch as the justifiers are in constant use and a greater supply of them is needed than of any one character-type I may cast them by a separate mechanism, acting synchronously with the mold-carrier described under the preceding heading. This arrangement gives a larger number of molds for the character-bearing types within a given space, and inasmuch as the justifiers are to be discharged at right angles to the line of types relieves the principal magazine of a complication by providing a separate justifier-magazine. The auxiliary mold is composed of two opposing parts E' E$^2$, the first having a projection $e'$ and the second a recess $e^2$, so arranged that when the parts are brought face to face the projection $e'$ fits into the recess $e^2$, but does not fill it, leaving a cavity which in this instance I have shown as of the shape of my justifier—that is, wedge-shaped, with a rectangular portion at the apex. The part E$^2$ is fixed to a short shaft E$^3$, while the part E' is fixed to a sleeve $e^3$, which turns upon the shaft. The shaft has its bearing in the frame of the machine, and has upon its outer end a rocking arm $e^4$, which is operated by a bracket $e^5$, carried by the slide of the mold-carrier D. A pin upon the end of the arm $e^4$ plays into a cut in the bracket to operate the mold, the cut preferably carrying in the face a small spring that presses the pin to insure an accurate connection. The pin plays upon the bottom face of the bracket nearer the melting-pot between operations, and the arrangement is such that whatever the movement forward of the mold-carrier the pin will be held out of engagement. A small recess $e^6$ in the part E$^2$ receives a corresponding projection $e^7$ on the part E' on the upward movement to the pot C, so that the part E' is carried up with the part $E^2$. The part $E^2$ carries in a recess at the rear a spring-drawn pin $e^8$, projecting into the cavity of the mold, its head lying in the path of the arm $e^9$, which has two faces in different planes and an intermediate projection $e^{10}$. The arm $e^9$ is secured to a shaft $e^{11}$, carrying the tappet $e^{12}$, lying in a recess in the inner side of the part $E^2$. This part has also a recess $e^{13}$ in its shank for purposes hereinafter set forth. The rear of the casting-cavity is closed by the end gate $E^4$, which turns upon the pintle $e^{14}$ of the hinge $e^{15}$, attached to the part E'. The end gate is composed, essentially, of two arms at right angles to each other, one arm, $e^{16}$, closing the rear of the cavity, and the other arm, $e^{17}$, playing upon a spring-pressed pin $e^{18}$, carried in a stud $e^{27}$, attached to the frame of the machine. It is obvious that when the part E' is carried by the part $E^2$ up to the pot C by the connection between the recess $e^6$ and the projection $e^7$ it will take with it the gate $E^4$, and that as the arm $e^{17}$ meets the pin $e^{18}$ it will press the arm $e^{16}$ against the rear of the molding-cavity, and it is also obvious that when after the casting the part E' returns it will carry with it the gate $E^4$, which as soon as it passes the pin $e^{18}$ will turn by the action of gravity, carrying the arm $e^{16}$ away from the rear of the cavity. When the cast is made, the friction between the parts is sufficient to enable the part $E^2$ to carry back the part E' until an angle-piece $e^{28}$ on the back of the part E' strikes the stud $e^{27}$. The bracket $e^{19}$, attached to the frame of the machine, carries the block $e^{20}$, in which lies the top of the justifier channel or magazine $e^{21}$. Attached to the spring-pressed shaft $e^{22}$ is the regulating device $E^5$, which has one hooked arm $e^{23}$, normally lying across the channel $e^{21}$, in the line of travel of the justifiers, and an opposite bent arm $e^{24}$, projecting into the path of the part $E^2$, so that when it is struck the regulating device is rocked and the hooked arm $e^{23}$ is removed from the path of the justifier. On the bottom of the shaft $e^{22}$ is an arm $e^{25}$, which before the part $E^2$ strikes the regulator $E^5$ forces back the tappet $e^{12}$, swinging the arm $e^9$ across the head of the pin $e^8$ and loosening the cast unit from the side of the mold. On the movement of the mold to the pot and just before the mold reaches the pot the arm $e^{12}$ strikes a pin $e^{26}$, which turns the shaft $e^{11}$ and replaces the arm $e^9$. If the channel be filled by any discharge, the last justifier will prevent the return of the hooked arm $e^{23}$. When the hooked arm $e^{23}$ is in this position, the arm $e^{25}$ will be correspondingly turned in the opposite direction, so that it is not in line with the tappet $e^{12}$. When the mold again comes down to the channel, the arm $e^{25}$ will pass by the tappet $e^{12}$ and into the recess $e^{13}$ without effect, and therefore the new cast will not be loosened, but will be held in the mold by friction and the pin $e^8$, the arm $e^{24}$ of the regulator $e^5$ being of course out of the path of the mold. The mold will then return to the pot and back to the magazine without effect until the column of justifiers is lowered, whereupon the parts come into action at once to supply new justifiers. As indicated in Fig. 1 and by the reference-letter $c^3$ on those views, the molds receive their charge from the melting-pot C by the same means employed to supply the metal for casting types.

5. *Mold-operator F*, Figs. 9-11, 19-22, 1, 3, 38, 44.—My machine first determines which receptacles shall be supplied with types and then moves selected molds away from the cast types, leaving each depending by the shoulder formed by its recess upon the corresponding face of the bar $d^{10}$ of the mold-carrier D, and then moves back the bar $d^{10}$, so that the type may be freed and fall into the appropriate channels of a magazine. The mechanism for accomplishing this I call the "mold-operator," to indicate by a convenient term its function and to easily designate the several parts as a feature of the machine, though it might, perhaps, be more generally termed the "type-releaser," and, on the other hand, more accurately termed a "mold-remover and type-supply regulator," since it first engages and throws out of operation the fingers which would otherwise release types not desired, and then removes the parts of the selected molds from contact with the types to be delivered. This mold-operator is illustrated particularly in Figs. 9-11 and as placed in the machine by Figs. 19-22, 25, 1, 3, 38, and 44. The upright bars F' carry at the top a frame in which the block $F^2$ has a horizontal movement to and from the magazine, being drawn over and pushed back by the mold-carrier in its movements, as hereinafter described. The bars F' slide in the frame of the machine and each bears a block at the bottom, in which is swiveled a shaft which forms the bearing and connection of levers $f$, which are fulcrumed at $f'$ and are operated by the arm $f^2$ by means of the cam B' upon the shaft A' to give automatic vertical movements to the bars F'. By the combination of the vertical movements of the bars F' and the horizontal reciprocations of the block $F^2$ the mold-operator is given the cycle of relative adjustments indicated in Figs. 19 and 20.

For purposes hereinafter detailed the mold-operator as a whole first moves up; secondly, the block $F^2$ slides over toward the magazine to a limit set by stops; thirdly, the mold-operator falls by gravity, the cam-pressure being released; fourthly, the cam again active the mold-operator rises and rests; fifthly, the block $F^2$ is slid back against the stop mechanism on the front of the machine by the returning mold-carrier; sixthly, the mold-operator drops to register with the molds; seventhly, the mold-operator again rises; eighthly, the mold-operator drops to the position it had at the end of the sixth movement, and, ninthly, the mold-operator drops to the normal position it had at the beginning of the first movement. The vertical movements are illustrated by full and dotted lines in Figs. 19 and 20, and all the movements are indicated by arrangement of arrows accompanying these views.

The block $F^2$ of the type-releaser is connected by frictional slides $f^5$ to the mold-carrier, so that the mold-carrier in its horizontal movement in the ways $d$ may draw with it the block $F^2$ to the limit set by stops $g^7$ or $g^8$ upon the frame and the stop $f^{13}$ on the block, the hooked ends of the slides playing in enlarged openings $f^{12}$ in the frame of the mold-carrier to permit a lost motion for purposes hereinafter set forth.

The block $F^2$ of the mold-operating or type-releasing device has a transverse channel and a vertical channel, in the first of which lie a series of fingers $f^3$, adapted to enter and engage the molds $d^4$, while the vertical channel contains a series of selecting pins or feelers $f^4$, held therein normally by a projecting plate $f^6$ and adapted to enter the mouths of the magazine for the purpose of ascertaining the amount of type therein and operating, as hereinafter described, to regulate the supply of type to the magazine by governing the casting mechanism. The fingers $f^3$ are preferably formed at the inner end, as shown, to fit into the recesses in the upper end of the molds and at the same time conform to the shape of the plate $d^7$ of the mold-carrier, and a projection from the body of the mold-operator fills a recess of the plate $d^7$, so that the parts may all fit accurately when in contact. The fingers are also cut, preferably as shown at $f^7$, at an angle at the forward end for the ready replacing of the fingers by riding upon the inclined bar $G^2$ of the stop mechanism described in the following division of the specification, and each finger has upon its body about midway at $f^8$ an angular projection, (or the finger may be cut away from the inner end to form such a projection,) against which the inclined upper end of the pins or feelers $f^4$ act. The feelers are shown with a reduced lower portion, so that they may readily enter the magazine; but this in common with the specific features of the fingers $f^3$ just described is subject to many obvious modifications of kind and degree, the essential points being that the fingers and feelers are operatively related, so that the former may be governed by the latter.

Attached to each bar $F'$, opposite the lower catch-bar $d^{10}$ of the mold-carrier, is an arm $f^9$, having at its inner end an upward projection $f^{10}$, with a slight angular cut $f^{11}$, adapted to register with the slight opposing angular cut of the projection $d^{19}$ of the catch-bar $d^{10}$, so that during the upward movement of the mold-operator after the cut-away portions have met and passed the catch-bar may be driven back against the pressure of the springs $d^{20}$ to release the types held by the face $d^{11}$ of the catch-bar, whereupon the types will drop by gravity into the magazine.

6. *Stop mechanism G*, Figs. 25, 26, 1, 3.—Attached to and reaching across the front of the machine is the body $G'$ of a stop mechanism, which forms an abutment and a positive stop for the mold-operator body and through it for the mold-carrier. The body is channeled to receive a bar $G^2$, having on each end an arm $G^3$, thereby forming a rocking bar pivoted at the points $g$. At one end and in the side of the body $G'$ is a cut, through which enters an arm $g'$, which is attached to one end of the bar $G^2$ and lies in a recess in the body $G'$ when the bar $G^2$ is rocked back against the body $G'$. The end of this arm plays in a way $g^2$ in the end of a spring-pressed lever $g^3$, fulcrumed upon the body of the machine at $g^4$ and having an end $g^5$, adapted to extend over the hub $d^{18}$ of the disk $d^{12}$, the hub forming a cam for the operation of the lever $g^3$.

In the extension detail of Fig. 25 I have indicated the relations of the slot $g^2$ in the end of the lever $g^3$ and the reduced or modified end of the arm $g'$. The slot is oblique and at the top and bottom has an enlargement, one of the oblique sides of the slot turning into a vertical line at the top, while the other oblique line turns into a like vertical line at the bottom, of the slot. It is apparent that the rotation of the cam $d^{18}$ will cause the lever $g^3$ to alternately rise and fall, thus swinging the end of the lever in an arc, drawing the oblique slot over the end of the arm $g'$. I preferably reduce the end of the arm $g'$ at the top and bottom, as shown, so that at the end of the movement in each direction one side of the end of the arm may lie against an oblique side of the slot, while a reduced side of the end of the arm may lie against a vertical line terminating the other oblique side of the slot. The motion of the lever $g^3$ thus indicated is the resultant of the movement of the lever $g^3$ and forward or backward movement of the arm $g'$, and the vertical lines at the ends of the slot furnish firm supports or bearings for the end of the arm when in its extreme positions. Pivoted at $g^6$ upon the inner side of each arm $F'$ and just below the body $F^2$ of the mold-operator is a lever $G^4$, having a large end depending in the path of the arms $G^3$ of the rocking bar $G^2$ and a reduced portion carrying a stop $g^7$, which plays beside a stationary stop $g^8$, also attached to the inner side of the arms $F'$, the stationary stop serving to stop the mold-operator at a point where the feelers $f^4$ will coincide with the inner series of channels of the magazine, while the stop $g^7$ when raised stops the feelers over the outer series of channels, as hereinafter described. (See heading "8. Relations and operations of the type casting and storing elements," and see also preceding heading "5. Mold-operator.") When the levers $G^3$ are swung in at the bottom by the action of the cam $d^{18}$, each of the levers $G^4$ is turned upon its pivot, carrying up the stops $g^7$ into the path of the stops $f^{13}$ on the bottom of the mold-operator body. On the reverse action of the levers $G^3$ the levers $G^4$ are released and the stops $g^7$ fall out of the way of the stops $f^{13}$.

It is obvious that the stops may be arranged to suit any number of series of channels in a magazine.

When the mold-operator is in its normal forward position—that is, ready to register with the molds—the body of the stop mechanism in one cycle and the projecting bar $G^2$ in the next cycle receives the back of the block $F^2$. It will be observed that all the parts are then locked together.

When the mold-operator falls, the fingers may be driven in either by the top of the body or by the edge of the projecting bar.

7. *The magazine H*, Figs. 27–30, 32.—It is obvious that many magazines adapted to receive type may be employed in my machine; but I prefer to use the magazine herein described. It is the purpose of this magazine to store the types which are being cast continuously and independently of the operation of the keyboard or the production of the composite type-bar. In the example herein illustrated, H represents the magazine; $h$, channels or compartments; $H'$ and $H^2$, grooved plates, the grooves forming three walls of the channels for the type, and $H^3$ a dividing-plate or separating-sheet. Three sides of the type-channels in this example, it will be observed, are formed by the smooth sides of the grooves of the plates, the separating-sheet forming the fourth side for each series. The width of the magazine and the number and size of type-channels may of course be varied according to the machine to which it is to be applied and the number or kind of characters or letters to be stored, and the separating-sheet may be removed and the back of one plate placed against the face of the other plate, a plate covering the face of the first plate. The illustrated and preferred form has two series of channels. The relations between the rows of channels in a multiple magazine and the series of types cast by my mold-carrier have been described under the heading "3. Mold-carrier and molds." With a four-sided mold-carrier I may employ two rows of channels, and as there must be a separate channel for each type there would be in this plan twice as many channels in each row as there are molds on each face of the mold-carrier. The mouths of the channels may be arranged in regular opposition, and, in fact, should be in the construction illustrated in the drawings so arranged, though, as will be shown, the discharge ends of the channels of one row are each opposite an intervening wall of the other row. At the bottom of the magazine is the block $H^4$, which carries the escapement I, operating, as hereinafter described, under the heading "9. Escapement." The efficient application of my escapement practically requires an alternating arrangement of the channels at the discharge end rather than the regular opposition possible at the top of the magazine. Part of the escapement-detents reach only to the outer row of channels; but the others must pass through the block to reach the inner row and in doing this must avoid the outer channel, and the discharging-mouths therefore alternate. At the bottom the channels are of widths proportioned to the types to be discharged, a narrow mouth, for example, answering for the letter "i" and a wide mouth being required for the letter "m." In such an arrangement it is obviously advantageous to have a wide wall oppose a wide mouth, and vice versa. At the top of the magazine in the construction herein illustrated, the intervening walls being thin, I divide the space equally, so that each channel may receive any type, wide or narrow. It is obvious that the channels are not exactly perpendicular. Each channel takes its course according to the letter it is intended to discharge and may reach the end with the same width it had at the top or narrowed and may pass straight or obliquely, according to the position of the corresponding channel in the block $H^4$. The uses to which the discharge end is put are further detailed under the heading "9. Escapement." The block $H^4$ is composed, essentially, of the parts $h'$, $h^2$, and $h^3$. The inner part or back $h'$ has channels which register with the inner series of channels of the magazine. The outer part $h^2$ is also channeled to register with the outer series of channels of the magazine, and in this part the partitions between the channels are pierced at the top and bottom to permit the passage of the fingers of the escapement-detents to the inner row of channels. Across the face of each part $h'$ $h^2$ is a slight depression in which fits a plate $h^4$, which corresponds in function to the separating-plate $H^3$ of the magazine. Fig. 30 shows the parts $h'$ $h^2$ assembled, the part $h^2$ having on its back a series of vertical channels and a central longitudinal channel. The channeled plate $h^3$ fits up against the channeled back of the part $h^2$, and the pivots $i^8$ of the escapement-detents fit and rock in the longitudinal channel, while the operating-bars $i^3$ are guided by the intervening vertical channels. The position of the escapement with relation to the block is shown in the enlarged detail, Fig. 32, in which no attempt is made to accurately illustrate the precise construction of the block $H^4$, the principle being applied to a slightly-modified form. The channels $h$ of the magazine must of course lead to their respective corresponding channels in the block $H^4$, and the effect upon each plate $H'$ $H^2$ is that of being irregularly grooved. As in other magazines when the types are released they fall upon an inclined way and slide down to a discharging-channel.

My magazine permits a column of type to be held ready for immediate discharge in rapid succession and in a position to be used, the types being imposed upon one another and held by an escapement-detent, hereinafter described.

8. *Relations and operations of the type casting and storing elements.*—It has been noted that the mold-carrier has a horizontal movement to and from the metal-pot, a rotary movement upon its bearings, and a lateral adjusting movement; that it coincidently operates the auxiliary mold; that it draws with it in its movement to the pot by frictional arms the mold-operating type-releasing device until the mold-operator strikes a stop, which regulates the position of the selecting pins or feelers over the proper row of channels, and that it returns the mold-operator by the same means; that the mold-operator has a vertical movement in addition to its horizontal movement; that the stop mechanism is governed by the movement of the mold-carrier through the cam-hub of the disk upon its bearing, and that the stop mechanism not only forms a fixed stop against which the mold-operator abuts upon its return, thereby in turn positively arresting the returning movement of the mold-carrier, so that the type-cavities of the mold coincide with the proper channels of the magazine, but also automatically returns the fingers of the mold-operator to their normal position at the end of each operation and operates the stop, which at the proper intervals limits the inward movement of the mold-operator.

The mold-carrier, the auxiliary mold, the mold-operator, the stop mechanism, and the magazine, together with their operating parts and certain supplemental features, are the elements of the machine which continuously and automatically cast and store the units of a printing system, the types, quads, and justifiers, and it is purposed now to state more fully the relation and operation of these elements.

The mold-carrier D may be supposed to have been casting for some time and to have just started upon its movement away from the magazine and toward the melting-pot, the fingers $f^3$ of the mold-operator being out of engagement with the ends of the molds $d^4$ and the mold-operator block $F^2$ lying against the body G of the stop mechanism, the frame of the mold-operator being at rest in its lowest position, the feelers $f^4$ all at rest with their bottoms below the plane of the top of the magazine. This movement of the mold-carrier has been secured by coupling the pulley $A^3$ to the shaft $A'$ by means of the shifting-lever. As the shaft turns the cam B operates the extension $d^3$ of the arms $d^2$, throwing the arms and sliding the mold-carrier along the ways $d$ toward the melting-pot C. At the same time the cam $B'$ through the arm $f^2$ of the lever $f$ and the bars $F'$ lifts the mold-operator, so that the feelers $f^4$ may clear the top of the magazine. In this initial stage the elbow-lever $d^{15}$, operated by the camway $B^3$, draws down the hooked arm $d^{14}$, releases the detent $d^{16}$ by the auxiliary arm $d^{17}$, and gives the mold-carrier a quarter-turn, the detent catching in the next notch and holding the carrier against any further rotation, the hooked arm riding back upon the release of its elbow-lever from the cam and catching over the succeeding pin $d^{13}$, the auxiliary arm $d^{17}$ riding at the same time over the end of the detent, so that all the parts are ready for the next quarter-turn. This rotation has caused the cam-hub $d^{18}$ of the disk $d^{12}$ to raise the end $g^5$ of the lever $g^3$ and has thereby thrown in the top of the rocking bar $G^2$ and has removed the pressure of this bar from the lever $G^4$, so that the stop $g^7$ drops with the reduced end of the lever $G^4$ and is removed from the path of the stop $f^{13}$ on the bottom of the block $F^2$ of the mold-operator. The mold-carrier, moving on toward the melting-pot, carries with it by means of the frictional slides $f^5$ the block $F^2$ of the mold-operator until the stop $f^{13}$ on the bottom of the block abuts against the stop $g^8$. In this position the feelers $f^4$ are immediately over the inner series of channels of the magazine H. The continued rotation of the shaft $A'$ has brought the arm $f^2$ of the lever $f$ into a depression of the cam $B'$, and the heavy mold-operator losing the support of the cam immediately drops, bringing the bottom of the body of the mold-operator nearly flush with the top of the magazine. The feelers $f^4$ enter the channels of the magazine. In the channels not filled with type the feelers enter without effect; but if any channel be filled the feeler $f^4$, entering the channel, will be forced upward and will engage the angular projection $f^8$ of the corresponding finger $f^3$ and force back the finger, so that it may not engage the recess in the end of the opposite type-mold, and the mold may carry with it the type previously cast as long as the corresponding channel of the magazine is full, thereby preventing the casting of superfluous type and automatically regulating the supply of type to every channel. The end of the arm $f^2$ having passed the depression which operated through the lever $f$ to permit the mold-operator to fall, the arm $f^2$ strikes an elevation upon the cam which operates to lift the mold-operator a short distance until it occupies what may be called its "normal forward position"—that is, with the fingers $f^3$ on a level with the ends of the confronting type-molds. The mold-carrier has proceeded and reached the further end of the ways $d$, and the type-cavities of the mold are in register with the nipples $c^3$ of the mouth $c^2$ of the melting-pot C, the mold-carrier having been centered, or exactly registered, by the lateral adjustment imparted by the guides $d^{21}$. (Shown in this example as those near the melting-pot in Fig. 22.) As the mold-carrier is brought up against the nipples of the pot the shoe $c^{10}$ on the arms $c^5$ plays into the depression of the cam $B^2$, releases the upward pressure, and permits the spring $c^7$ to draw down the rod, operating the piston of pump $C'$ and forcing up the metal through the mouth and nipples of the pot into the type-cavities of the molds. The release of pressure against the spring $c^7$ is of short duration, and the piston of the pump is then immediately lifted, the unused metal flowing back into the pot. The arm extension $d^3$ has now passed the elevation of cam B upon the shaft, and the effect of the spring is to reverse the operation of the arm $d^2$ and carry back the mold-carrier away from the melting-pot. The movement of the mold-carrier against the melting-pot has through the bracket $e^5$ rocked the shaft $E^3$ and carried up the auxiliary justifier-mold E to the melting-pot. The auxiliary mold is presented at the same instant with the mold-carrier D and receives a part of the molten metal forced up by the action of the pump. As the mold-carrier D moves away the auxiliary mold is operated in the reverse direction and the justifier is either discharged or retained, as fully described under the heading "4. The auxiliary justifier-mold." As the mold-carrier returns to the magazine it pushes back the mold-operator by means of the frictional arms $f^5$ until the body of the mold-operator strikes the projecting bar G' of the stop mechanism, the point of contact being below the fingers $f^3$, so that they are not affected. The mold-carrier is now abutting the mold-operator, which has, as just described, been automatically brought into position for engagement, and the ends of such of the fingers $f^3$ as have not been pushed back by the feelers $f^4$ are lying in the recesses of the confronting molds. The lever-arm $f^2$ has now encountered another elevation on the cam B, and the bars F' are forced up, carrying the mold-operator, and by the fingers $f^3$ drawing away the molds or stripping them from the type which have just been cast in the type-cavities of the molds. (See dotted line of Fig. 9.) This leaves the types suspended upon the projection $d^{11}$ of the catch-bar $d^{10}$, which served in casting as a shank-block to determine the form of the shanks of the types. As the mold-operator has moved up the angular projections of the arms $f^9$ have ridden past the angular projections $d^{19}$ of the bar $d^{10}$, and the full portions now coinciding the bar $d^{10}$ is pushed back, the types are left unsupported, and fall into the proper channels of the magazine. The lever-arm $f^2$ again falls into a depression of the cam B' and the mold-operator again drops and carries down the molds to their original and normal position. At this instant begins the movement of the mold-carrier toward the melting-pot. There is a provision at $f^{12}$ for a slight lost motion of the hooked ends of the slides $f^5$, so that the mold-carrier may not at once draw with it the mold-operator, which must first have its fingers disengaged from the notches of the molds, and then the lever-arm $f^2$ having reached the lowest depression of the cam B' the mold-operator drops to its position of rest. As the mold-operator comes down to its initial position the cut-away ends of the fingers $f^3$ play against the edge of the projecting bar G' of the stop mechanism, and those that have been pushed out by the previous rising of the feelers $f^4$ are pushed in, carrying down the feelers as they move in, so that all the fingers and the feelers are in their initial and normal position. This completes a cycle of casting and storing the type in a row of channels. The next cycle produces another quarter-turn of the mold-carrier, so that the pressure of the cam-hub $d^{18}$ is removed from the lever $g^3$, which through the action of its spring returns the bar $G^2$ against the heavy end of the lever $G^4$, lifting the reduced end of that lever and bringing the stop $g^7$ into the path of the stop on the bottom of the block $F^2$, so that this cycle shall be with reference to the outer row of channels of the magazine, the position of the mold-operator forward being governed at the time of engagement with the molds and afterward by the body of the stop mechanism and the top of the body pushing in the fingers not in service as the mold-operator drops to its initial position.

II. Composing Elements.

9. *Escapement I*, Figs. 31–36.—In common with several features of this machine, which are well known and essential elements of all typographic machines, the escapement may be of any kind adapted to carry out the purposes I have in view. I prefer, however, to use the escapement herein described, which while peculiar and applicable to my machine, is broadly applicable to all typographic machines and which secures an immediate discharge of an individual unit, while retaining the rest of a column, with the simplest movement possible and without requiring exact measurements and relations of the parts. In many cases the escapement is taken for granted as an obvious feature, and while there are many that are fairly practicable I have found them generally either too complicated in construction or uncertain in action. In the case of a column of units there must be two parts of an escapement, one being in action when the other is withdrawn. After a unit has been released by withdrawing one part—say the lower part—and the column is supported by the other part—say the upper part—the column must fall the length of a unit, and consequently the two parts must move in the opposite direction, the lower one in or under the column and the upper one out or from under the column. These effects must either be accomplished simultaneously or the lower support must move in first before the upper one releases the column and the upper support must move again into the controlling position to support the remainder of the column when the unit now lowermost is released. The movements and the desired result must be achieved by a stroke upon the key corresponding to the unit to be released, and whether the stroke be easy or violent the same effect must be produced. In securing these ends I have produced an escapement which combines the utmost simplicity with the greatest efficiency.

The escapement-detent may be constructed of metal or any suitable material in section or, preferably, in one piece, and it consists, essentially, of a body I and two fingers I' I², these fingers being preferably integral with the body, though they may be attached in any way, as shown, for example, in Fig. 35, where they are shown swiveled in the body. It will be observed that in the form shown in Fig. 33 the back of the body has a curved face $i$ and oblique faces $i^2$, while in the form shown in Fig. 34 the back has three curved faces. The detent rocks upon a pivot $I^3$, projecting from the front into a channel in the magazine or adjacent part of the machine. The detent may be operated by any suitable means, preferably a bar $i^3$, connected to a lever of a keyboard. The bar herein shown has an enlargement $i^4$ at the upper end and is cut away obliquely at the top and bottom of its operating-face $i^5$ upon lines coincident with the oblique lines of the face of the back of the body of the escapement, leaving a vertical face $i^6$, which rides upon the curved face $i$ of the detent. It is obvious, for example, that the escapement may have its upper finger thrown into engagement with the recess of a type by the upward movement of the key-bar, while the lower finger is withdrawn from the recess of the type next below. The type will thereupon fall into the hopper portion of and through the chute $I^4$, taking its place in the line of type assembled in the assembling-channel.

In Fig. 31 the lower type P is shown as escaping and the one next above as being caught and retained by the upper finger of the escapement. The key has been struck by the operator and the key-bar $i^3$ forced upward, removing the lower finger of the escapement from beneath the column of types, the upper oblique cut of the key-bar in its upward movement coming in contact with the upper oblique face of the escapement pushing the upper finger into the recess of the type that is next to the lowermost and supporting it and the imposed types. The relations of the escapement to the magazine are such that the upper finger is passing into the recess of the type it is to support before the lower finger is withdrawn from the lowermost type, thus preventing the escape of more than one type at a time. The principal object of retaining the upper types is attained at the meeting of the oblique faces of the bar and the escapement; but as the bar proceeds upward the engagement is completed by the effect of the coincidence of the vertical faces. When the key-bar has completed its upward drive, it falls back by the action of the key-lever. The operative face of the bar passes down the upper vertical face and over the curved central face of the detent without effect, its next action being upon the lower oblique and vertical faces of the detent to produce the reverse action of the escapement, the lower finger being pushed in to receive and support the type now lowermost, from the recess of which the upper finger is withdrawn at the same time. In this, as in the preceding action, the finger being immediately driven to support precedes the finger being withdrawn, so that no matter how the drive of the bar be rated the column is sure to be caught and supported. It is obvious that no exactly-measured movement of the bar is required. All that is necessary is to have the operative faces in contact, and the key-bar may have an excess of movement in either direction, the result being the same, the fingers being simultaneously moved in opposite directions, and the escapement being locked between the movements. It is also obvious that my device may be attached to or work upon the machine in many ways. The preferred construction I show requires no attachment. There are openings in the wall of the magazine for the passage of the fingers of an escapement into a corresponding channel. The pivots of the escapement rock in channels in the wall of the magazine, and the body of the escapement and the head of the key-bar lie in a channel formed by a plate $i^7$ and the wall of the magazine, the heads of the bars serving to retain in position the several escapements. No difficulty can be experienced in assembling the parts, and there is no attachment to weaken and no delicate connection to be considered.

I have described the escapement as in operation with a recessed form of type; but it is peculiarly applicable to perform the function it has in my machine and system of sustaining the column of upright types by contact with the lowermost and in one movement releasing a single type—the lowermost—and contacting with the succeeding type. This action is made immediate and more sharply efficient by the reduced shank I give to my preferred form of types. Either of the fingers of a detent when projected into a channel of the magazine will engage the upper shoulder of a type-recess, but will permit the reduced shank to pass freely without contact. It is apparent that by this relative arrangement the types are released easily and rapidly, and while the fit of the shoulder of a type in its channel insures the engagement of the detent friction is reduced as much as possible, and no possibility is left for any obstruction once the support is removed from a type. At the same time the margin is such that one type cannot be released until the succeeding one is secured, and the slightest movement into a channel in advance of a type is sufficient to enable the detent to catch the type.

In Fig. 32 I have illustrated the action of the detent where the types P do not have a reduced shank. In this figure the lower finger is shown supporting the column, the base of the lowermost type resting upon the finger. When the key-bar is operated, the upper finger will enter the recess of the succeeding type, and immediately thereafter the lower finger will be withdrawn from the base of the lowermost type, permitting it to fall. On the down movement of the operating-bar the lower finger will be projected into the path of the now lowermost type, and when the upper finger is withdrawn from the detent the type will drop to the lower finger, which will then again support the column. A comparison of the action of this escapement with the several types will demonstrate the advantages of my preferred form of type and will also illustrate what I have hereinbefore stated, that the type not only has a ultimate advantage in the production of a bar, but is at the same time formed to secure rapidity and economy in the operation of the machine.

I have previously stated that my escapement is broadly applicable and I have illustrated in Fig. 36 the escapement applied, for example, to a matrix. It is obvious that the notched types and matrices are peculiarly adapted to be released in any desired sequence by an escapement, it being necessary only to have the fingers a suitable distance apart and the end of the upper finger of a suitable conformation to catch in the notch or recess. My device is applicable to plain types or types presenting smooth sides. In such a case the fingers of the escapement may be made the same distance apart as the length of the type and the entering end of the upper finger made thin or brought to a knife-edge, so as to engage the edge of the bottom of the next to the lowest type and not come in contact with the cameo on the top of the type below, or the escapement may be longer than a type, the end of the upper finger engaging the side of the type and holding it by pressure until it can be dropped upon the lower finger. The ends of the upper finger, as indicated, may have various conformations to suit the peculiar situations. In the form used with my types it is preferable to curve the upper corner of this finger, as at $i^3$, Fig. 33, upon an arc whose center is at the pivot $I^3$, so that the finger upon withdrawing may not slightly raise the column of types. In this description the operation has been defined without reference to the numbers of rows of channels in the magazine.

In Fig. 32 two rows are indicated, and, as a matter of course, the fingers of the escapement 1, which reach to the outer row, are longer than those of escapement 2, which operate in the inner row.

Under the heading "7. Magazine" I have described the peculiar construction which enables the escapement to discharge units of any number of differing measures from a plurality of channels. (See Figs. 27 to 30 of the drawing.)

I have herein stated that my escapement is subject to variations, and I have described some modifications that answer certain evident demands of the typographic art; but I desire to say in conclusion that the size and length of the parts of the escapement, the conformations and curves or angles of the faces and fingers, the mode of attaching and securing, the construction of the key-bar head, and other features of my invention may have obvious mechanical equivalents, my illustrations and descriptions being purposed to present what I regard as the best embodiment of the mechanical principle.

*10. Assembling or composing mechanism J, Figs. 37-43.*—The types as they are discharged from the magazine by the escapement fall into an assembling or composing channel, in which they are sustained and along which they are forced by a type-packer or type-forwarder. This may be an ordinary channel, but I prefer the channel I have shown, having an inclination of about thirty degrees, so that the faces of the type may be turned toward the operator. This enables the line to be read and any mistake to be easily corrected and at the same time leaves the type in a position which will permit justifiers to be placed across the line and retained during the assembling. The channel $j$ is formed, preferably, in a composing-frame or guide-block J, which is substantially L-shaped, the short arm of the L lying upward toward the operator and forming a fence $j'$ to catch the butt-ends of the justifiers and hold them in the proper relation to the line. These justifying-wedges, as hereinafter described under the heading "18. Justifiers," are single wedge-shaped pieces of type metal, preferably cast with a short rectangular portion. This rectangular portion represents the minimum spacing and serves to separate the type and divide the line into words. The rectangular portion by its shape enables the type to be held firmly in place during the composing and transferring of the line along the assembling-channel to the bar-block. The justifiers are released from their magazine by the operation of a space-bar on the keyboard (which may be any of the key-bars indicated on the drawings or one of the usual space-bars familiar in typographic machines) and are shot across the line, their butt-ends first, and striking against the fence J', the width of the block being gaged with relation to the length of the justifier, so that the rectangular portions of the justifiers may lie between the types. The assembling-channel has a rib $j^2$, extending either wholly across the composing-frame or to the point where the chute of the magazine leads into the channel. This rib is adapted to loosely fit the recess on the side of a type and hold and guide each unit of a line. The units must be removed from the mouth of the chute as fast as they are discharged, and this is done by the type-packer, Figs. 38-43.

Fig. 41 is a diagrammatic illustration indicating the relations of the parts and the place of the slide J³ in the composing-frame J. Figs. 39 and 40 illustrate the type-packer as applied and operating in the same direction (indicated in Fig. 38) to forward the line to the left; but Figs. 42 and 43 are views from the rear to show more clearly the relations of the hopper, types, and justifiers.

The type-packer consists, essentially, of a vibrating hopper J' and a compound lever J², secured to a spring-actuated slide J³, playing in the composing-frame J. The lever J² is operated by a friction-pulley $j^3$, journaled in the bracket and vibrating the cam $j^4$ in the head $j^5$ of the main arm $j^6$ of the compound lever. The vibrating hopper is three-sided, being free to vibrate upon and across the stationary face fixed to a bracket and has lips or fingers extending down into the assembling-channel a short distance to grasp the head of the type. The hopper is open to the front and has its inner side preferably inclined to widen the upper mouth of the hopper, so that a type may shoot into the top of the hopper and thence to the composing-channel $j$, being then grasped on three sides by the lower mouth of the hopper. The hopper is attached to an arm $j^7$, pivoted by a knuckle or break joint $j^8$, the arm $j^{11}$ being pivoted to the slide J³ and both the arms $j^7$ and $j^{11}$ normally held up by a spring-latch $j^9$. The arm $j^7$, which carries the hopper, has at the end opposite the hopper an inward projection $j^{12}$, which fits into a recess on the bottom of the arm $j^{11}$ of the compound lever. The spring-latch $j^9$, secured to the slide J³, presses up against the projection on the arm $j^7$, and thus holds together normally as one the arm $j^7$ and the arm $j^{11}$ and holds the hopper up away from the types, even as against the weight of the arm $j^6$, the short end of which lies under the short end of the arm $j^{11}$. The cam-head $j^5$ of the arm $j^6$ offers two faces at right angles to the cam $j^4$. When the cam is thrown in toward the hopper, it strikes first the bottom or horizontal face of the head $j^5$ and presses down the long end of the arm, rocking the arm so that the short end presses strongly up against the short end of the arm $j^{11}$, and thus as the arm $j^{11}$ and the arm $j^7$ are tied together by the spring-latch $j^9$ brings the hopper down, so that it embraces the head of any type which may have just shot through the hopper. As the cam $j^4$ turns it operates upon the vertical face of the head $j^5$, throwing the slide J³ and the arms of the compound lever forward and pushing forward the attached hopper, so that the hopper embracing the last type pushes ahead the whole line. It is desirable to have the hopper on the return movement clear any type which may be passing out into the composing-channel. The form of the cam $j^4$ is such that it does not cease its downward pressure upon the horizontal face of the head $j^5$ until after it has begun the forward pressure upon the vertical face of the head; but before the cam leaves the vertical face it has ceased to act upon the horizontal face and, in fact, as it sweeps off the top of the vertical face the tendency of the friction is to counteract the binding effect of the forward pressure and to lift the long end of the arm $j^6$ and release the upward pressure of the short end upon the short end of the arm $j^{11}$. The spring-latch $j'$ therefore may at once begin to lift the hopper above the line of the heads of the types, so that when the cam $j^4$ passes off the end of the arm $j^6$ the spring-slide J³ may bring back the hopper to its original position. The spring-latch has its extreme end pressing against the projection on the extreme end of the arm $j^7$. If the hopper should meet an obstruction in any of its movements, it can ride up out of the way of injury, the extreme end of its arm $j^7$ sliding off the end of the spring-latch $j^9$, the arm $j^7$ turning on its joint $j^8$, the hopper end going up, the other end down. I have also provided means for insuring the forwarding of the justifiers with the line. Immediately behind and to the rear of the hopper $j'$ is a guide-channel $j^{10}$, carried by a bar J⁴, attached to the head of the slide J³ and reaching across the top of the composing-frame J. When a justifier is discharged it shoots through the channel $j^{10}$ into position behind the type, and in the forward movement of the slide J³ the bar J⁴ presses upon the whole side of the justifier Q and insures its being carried ahead with the line.

III. Bar-Forming Elements.

*11. Cam mechanism K, Figs. 45, 45ᵃ, 46.—* On the driving-shaft A' beyond the cams described under the heading "1. Driving and cam mechanism" is the mechanism for imparting the automatic movements to the bar-forming elements of my compound machine, consisting of the cam-drum K, formed of two pieces, one fitting as a cap within the other, the whole inclosing a train of gearing and a split-ring clutch engaging therewith and a cam K' at the end of a sleeve projecting from the drum, designed to operate the lever N¹² of the bar-block in an obvious manner. The drum K has formed integral with it or attached to it on its inner face a cam $k$, which is intended to operate the pump for forcing molten metal upon the line in the same manner that the companion type-pump is operated. (See heading "12. Melting-pot and pump.") Inclosed within the drum and protected by it is the mechanism, consisting of a train of gearing and a split-ring clutch, which intermittently and at the will of the operator rotates the drum and causes it to operate the pump, as described, and by the inclined cam $k'$ to act upon the means for transferring an assembled line into the bar-block. Keyed upon the shaft A' is the disk $k^2$, carrying near its periphery the double or dumb-bell pinion $k^3$, running on the inner side upon the stationary or rack gear $k^4$, fixed to a support, as indicated, and driving on the outer side the gear-wheel $k^5$, which has upon the outer face an enlarged shell $k^6$, a bearing for the shell projecting from the center of the gear $k^5$ and turning upon the shaft A'. This enlarged shell lies within the cap of the drum, and within the shell lies the split-ring clutch $k^7$, consisting of a casting or skeleton with an integral hub $k^8$ and a portion of its periphery cut out. Lying in the opening is a toggle $k^9$, adapted to be forced out by the lever $k^{10}$, pivoted upon a cut-away portion of the hub of the clutch and drawn by the spring $k^{11}$. The normal effect of the spring is to throw out the lever and bind the clutch to the drum; but this action is prevented, except at the desired instant, by the pin $k^{12}$ on the end of the lever, which projects through the cap of the drum and is engaged by the step $k^{14}$ of the catch $k^{13}$. In Fig. 45$^a$ a simple form of lever is illustrated, consisting of an operating-arm $k^{15}$, (shown also in Figs. 45, 44, and 53,) attached to a rod $k^{16}$, journaled in the bed of the machine, the rod being reduced at the inner end and taking into a recess $k^{18}$ of a spring-pressed rod $k^{17}$, playing in a bore in the bed of the machine. The rod $k^{17}$ is reduced at the top and engages the step $k^{20}$ of the latch $m^7$, pivoted upon the transferring mechanism. When the end of the rod $k^{16}$ is turned, as in Fig. 45$^a$, the pin $k^{17}$ will be held up by its spring. When the arm $k^{15}$ is depressed, the cut-away or reduced end of $k^{16}$ will turn in the recess $k^{18}$ and playing on the lower face will carry down the pin $k^{17}$, releasing the latch $k^{19}$. The catch $k^{13}$ is normally held in to engage the pin $k^{12}$ by the spring $k^{22}$, its movement being limited, however, by the pin $k^{23}$. The transferring mechanism, as described, is spring-drawn and is normally held by the step $k^{20}$ of the latch $m^7$, engaging the rod $k^{17}$, so that when the rod $k^{16}$ is withdrawn from engagement with the step by the movement of the operating-arm $k^{15}$ the transferring mechanism is released and moves back, carrying the latch $m^7$, the step $k^{21}$ thereof engaging the catch $k^{13}$ and throwing it in, so that the pin $k^{12}$ is released, the action of the spring $k^{11}$ engaging the clutch with the embracing-shell of the adjacent element of the train of gearing. The clutch being tied to the drum by the pin $k^{24}$, the moving gear imparts its motion to the drum, which rotates, operating in the course of the rotation the pump L by the cam $k$ and the latter part of its rotation by means of the cam $k'$, carrying back the transferring mechanism against the spring-power and reëngaging the step $k^{20}$ of the latch $m^7$ with the rod $k^7$. The drum continues a sufficient distance to take the cam $k'$ out of the path of the cam-arm of the transferring mechanism, at which point the pin $k^{12}$ again engages the stop $k^{14}$, the clutch is thrown out of contact, and the drum comes to rest ready for another cycle.

*12. Melting-pot and pump L*, Figs. 3, 1, 44, 53.—The melting-pot and the location and function of the pump C' have already been described under the heading "2. Melting-pot and pump," and inasmuch as the piston-rod of the pump L is operated by a spring in the same manner as the type-casting pump C', I have not repeated the illustration of the common elements except to show the relation of the rods in the organized machine. The rods are tied together by a yoke, and the piston-rod of pump L plays in a jacket $c^6$ in the melting-pot, which surrounds also the rod of pump C'. The pump L of course operates in a distinct chamber of the melting-pot and discharges metal through the mouth L', which has a set of nipples $l'$ across the mouth adapted to register with the mold presented by the line of type in the bar-block.

One of the characteristic features of the machine is the plurality of mouths and pumps operating in succession to cast the types for the line to be transformed and then to cast the binder, which ties the types together and transforms the line into a type-bar.

*13. Line-transferring mechanism M*, Figs. 47–52, 44–46.—The mechanism for discharging the units of the line into and upon the guide-block J and for pushing the units out of the way as fast as delivered is supplemented by a mechanism which will keep the line in a correct position, forward it, and finally transfer it to the alining, justifying, and metal-backing mechanism described under the following heading. The transfer-carriage consists, essentially, of a U-shaped bar M', carrying a rod, bearing-fingers to guide the line, and a rack driven by a transfer-lever. The carriage travels in a recess in the bed of the machine below the composing-frame J. The bar M' has upon its bottom the rack $m$, which is engaged by the pinion $m'$, borne by a vertical shaft $m^2$, carrying at the lower end an inverted crown-gear $m^3$, meshing with a bevel-gear driven by the pinion $m^4$, receiving its power from the sector-gear $m^5$ upon the lower end of the transfer-lever M$^2$. This lever is actuated by the spring $m^6$, as shown, is fulcrumed upon the machine, and bears upon its head a roller $m^{20}$, which engages the cam $k'$ of the drum K when the latch $m^7$ on the head of the transfer-lever is released by the operation of the lever $k^{15}$, as described under the heading "11. Cam mechanism." The hollow rod $m^8$ lies within the bar M' and surrounds a part of the spring $m^9$, which is attached at one end to the rod $m^8$. The spring exerts both a direct and a torsional strain upon the bar, the rotation of the bar being limited in each direction by the flange $m^{10}$. Rigidly attached to one end of the bar $m^8$ is the finger M$^3$, which is carried forward by the impulse given the line of type by the type-packer and which has just sufficient strain exerted upon it by the spring $m^9$ to hold together the line of type, but not sufficient to drive back the line into the road of the type-packer, the finger therefore acting as a spring-resistant. The finger M$^4$ is journaled in the bearing $m^{11}$, attached to the forward end of the bar M' upon a spring-torsioned shaft $m^{12}$. Both of the fingers $M^3 M^4$ come up over a cut-away portion (see Fig. 47) of the composing-frame across the channel of the block. During the formation of the line the finger $M^4$ is held away from the channel by a swell $J^5$ upon the full part of the composing-frame, behind which it lies, as shown in Fig. 48ª. The guard $m^{13}$ is pivoted upon the bar $M'$ and carries a shoe $m^{14}$, which normally engages the flange $m^{10}$ to prevent its rotation during the assembling and transferring of the line, and the guard has also a projection $m^{15}$, adapted to engage the projection $m^{16}$ and turn the guard to throw its shoe off the flange $m^{10}$ and out into the recess $m^{17}$. The block N, which is to receive the line of assembled types and justifiers, lies adjacent to the composing-frame and, as hereinafter described under the following heading, has two jaws $N^4 N^5$ to receive and sustain the line of type, the type passing into a space between the jaws which registers with the assembling-channel, while the justifiers pass into a space coinciding with the top of the composing-frame. (Shown in Fig. 51 as opposite the end of the fingers $M^3 M^4$.) These spaces may be closed by a spring-pressed end gate $N^6$; but during the transfer of the line the gate is held open by the fact that the foot of its operating-arm $n^7$ is held back by a step upon the pivoted spring-held arm $m^{18}$.

Fig. 50 illustrates the position of the fingers $M^3 M^4$ at the beginning of work, the finger $M^4$ slightly back, the finger $M^3$ reaching over the assembling-channel. The first type comes down the channel $I^4$ into the composing or assembling channel $j$ in front of the finger $M^4$ and behind the finger $M^3$. The type-packer $J'$ then forwards the line step by step as the types fall successively into place, the justifiers coming down the channel $e^{31}$, shooting across the line, taking position at substantially right angles to the line, and being forwarded with the line, as previously described. When the assembling of type begins, the fingers $M^3 M^4$ bear the relation to the composing-frame illustrated by Figs. 48ª and 50—that is, they lie in their farthermost position from the end of the composing-frame J, which abuts the bar-block N at the right of the cut-away portion of the composing-frame J, the finger $M^3$ projecting across the channel $j$, as previously stated, just in advance of the point at which the first type will be placed by the operation of the escapement I, operating upon the type in the magazine H to discharge the type by the channel $I^4$ into the channel $j$, the finger $M^4$ being held by the swell $J^5$ on the back of the composing-frame J at a point just behind the first type until the transfer-carriage is operated, when the finger $M^4$ is carried off the swell $J^5$ to the cut-away portion of the composing-frame, the spring $m^{12}$ then acting to throw the finger forward across the channel $j$ and behind the last type. This action of the finger $M^4$ of course follows the filling of the line and the pushing forward by the type-packer of the line and the spring-resistant finger $M^3$. The line is now embraced by the two fingers $M^3 M^4$ and ready to be swept along and out of the channel $j$ by the forward movement of the fingers. When the line is complete and lies at the end of the assembling-channel next the bar-block N, the operator releases the latch $m^7$ by striking the lever $k^{15}$, and the spring $m^6$ rocks the transfer-lever and through the gearing and rack-bar transfers the line into the bar-block N, the forward finger $M^3$ riding along the back of and over the top of jaw $N'$, while finger $M^4$ stops immediately in the line of movement of the end gate of the bar-block. When the line is in the bar-block, a pin $m^{19}$ upon the interior of the bar $M'$ strikes the arm $m^{18}$ and throws its step to one side, permitting the end gate to be closed by its spring, the gate in the act of closing forcing back the finger $M^4$ against the torsion of its spring. At the same instant the projection $m^{15}$ has ridden upon the cam $m^{16}$, with the effect of removing the shoe $m^{14}$ from the flange $m^{10}$ and permitting the spring $m^9$ to throw the forward finger $M^3$ out of the line of type and draw it back against the finger $M^4$. The same movement of the lever $k^{15}$ which permitted the spring to throw the transfer-lever released the controlling-pin of the clutch $k^7$ and operatively connected the drum K, as described under the heading "11. Cam mechanism." As the two fingers $M^3 M^4$ meet the cam $K'$ operates upon the head of the transfer-lever and carries it back until it is locked, the transfer-carriage being moved back by the action of the pinion $m'$ and rack $m$ until it is again lying in its normal position ready for another line, the line in the meantime being automatically transformed into a bar.

*14. Alining, justifying, and metal-backing mechanism (bar-block) N, Figs. 53-76.*— The compact mechanism which finally manipulates the line in the operation of transforming it into a bar may for convenience be designated as a whole as the "bar-block." This bar-block N receives the assembled line, holds it lightly between two jaws, reverses the line, alines the line by bringing the type-face down upon a level surface while holding the quads above the surface, pushes in the justifiers, clamps the alined and justified line, carries it up to the mouth of the melting-pot, where the line is transformed into a bar, removes the justifiers, and finally drops the bar into a galley, the several parts automatically resuming their original positions ready for another cycle.

The bar-block is composed, essentially, of a body $N'$, channeled, recessed, and ribbed to receive and support the several elements and journaled on a shaft $N^2$, the body and the shaft of which may be connected by a helical spring $N^3$, lying in a recess in the body; a jaw $N^4$, adapted to receive and sustain the line of type during the alining and previous to the justification; a jaw $N^5$, adapted to finally clamp the line; an end gate $N^6$, adapted to automatically open and close the inlet for the line of type; an alining-plate $N^7$, upon which the line of type is placed face down; a hinged sliding or reciprocating bar $N^8$ for forcing in the justifiers, operated by a spring-pressed lever, a sliding or reciprocating bar $N^{10}$ for removing the justifiers, positively operated by the spring-held lever $N^{11}$, and a lever $N^{12}$ for swinging the bar-block to and from the melting-pot. The end gate $N^6$ is triangular in form and bears a rib $n$ and a pin $n'$, playing, respectively, in slots or guides $n^2$ $n^3$ in a plate upon the side of the bar-block. The gate is operated by a lever $n^4$, fulcrumed at $n^5$ upon the plate, having an arm $n^6$ with a fork engaging the pin $n'$, an arm $n^7$ with an oblique foot, adapted to be engaged by the incline of the arm $m^{18}$ of the line-transferring mechanism, a pin $n^8$, playing against a spring $n^9$, and an extension-arm $n^{10}$, bearing a pin $n^{11}$. As the gate is drawn down against the pressure of the spring $n^9$ the line of types is carried along the channel $n^{12}$ between the jaws, the justifiers lying at right angles to the line passing in by the channel $n^{13}$ and resting above the jaw $N^5$. The jaw $N^4$ bears a removable gage-plate $n^{14}$, which determines the length of the line. This gage-plate provides an exceedingly simple means for regulating the line. All that is necessary is to choose the desired length and secure to the jaw $N^4$ the proper gage-plate. The jaw also carries the two bars $n^{15}$ and $n^{16}$. The bar $n^{15}$ lies in the mouth of the jaw, with a reduced portion at one end beneath the gage-plate $n^{14}$, it being obvious that bars should be supplied to match the different gage-plates. The bar $n^{15}$ has projections $n^{17}$ $n^{18}$, Fig. 56, at opposite ends on the under side, which correspond with depressions $n^{19}$ $n^{20}$ on the upper side of the bar $n^{16}$. The bar $n^{15}$ is subject to a downward spring-pressure by means of the pins $n^{21}$ and the spring $n^{22}$, and when the projections $n^{17}$ $n^{18}$ and the depressions $n^{19}$ $n^{20}$ register the bar $n^{15}$ is drawn down flush with the inclosing sides of the jaw. When, however, the bar $n^{16}$ is pushed in, as shown by full lines, Fig. 56, the bar $n^{15}$ projects from the jaw, so that it may receive the line of type and sustain the line by the central recess of the types, the line hanging upon the bar, as in Figs. 57 and 59. While this disposition of the type provides for the most exact measurements and correct relation, the working of the device does not depend upon the absolute accuracy of the construction, for the recesses in the types are wider than the bar $n^{15}$ and the line is brought up to the bar-block in such a way that it may easily enter. Not only is no attempt at precision of fit made at this stage, but, on the other hand, the subsequent operations are expedited by the latitude of the line in place. The opposite jaw $N^5$ bears within a shell or casing a movable false jaw $n^{23}$, which is pressed inward by the spring $n^{24}$, the inward movement being limited and the false jaw retained by the bolts $n^{25}$, the heads of which play into countersinks in the back of the jaw. For the purposes of illustration this false jaw is shown in full lines in Fig. 56 in its retraction and at the furthest distance from the opposing jaw, its other two positions being indicated by dotted lines, the dotted line furthest from the jaw $N^4$ indicating what may be termed the "normal" position of the false jaw when it acts as a spring-back to the line of type introduced, the line having an easy passage along the intervening space. The false jaw is cut away to fit over two ledges $n^{26}$ and is channeled to receive the bar $n^{27}$, having a hooked end similar to that of the bar $n^{16}$. The bar $n^{27}$ is stepped at each end, as shown at $n^{28}$, the bottom of the bar forming one step, permitting the least exercise of the spring-pressure and holding the false jaw retracted. The next step is formed by an abrupt offset $n^{29}$ in the inclined side of a cut in the bar, while the bottom of the cut supplies the final step, permitting the full exercise of the spring-pressure to clamp the justified line in place. This part, in common with others of my machine, is so arranged that absolute accuracy of construction is not essential to the proper working of the parts and the operation of the machine; but some idea may be had of the nicety of adjustment possible with this bar-block by stating that in use the full step or first step is made to withdraw the jaw the greatest distance (about one-sixteenth of an inch) from the line, the second step leaving about two or three thousandths of an inch clearance, the last being determined by the distance necessary to clamp the line. An additional adjustment on the scale of thousandths of an inch may be had by simply placing cigarette-paper beneath the outer leg of the ledges of the false jaw in the desired number of layers corresponding to the number of thousandths of an inch. The constant tendency of the spring $N^3$ is to rotate the bar-block; but this rotation is normally prevented by the pin $n^{30}$ in the body of the block, which rests in a guideway $n^{31}$, attached to the frame of the machine. The line being in the block, the next step is to alines it, and, as has been indicated, this is done by placing the loosely-held line face down upon the level alining-plate $N^7$, which rests upon supports at opposite sides of the block and extends across it beneath the space between the jaws. This is automatically accomplished by the action of the cam $K'$, carried by the shaft $A'$, which through the lever $N^{12}$ and its arm $n^{32}$ swings the block up to the melting-pot. The relations of the guideway $n^{31}$ and the pin $n^{30}$ are such that as the block swings up the bar-block is rotated by its spring until as the pin leaves the guideway the bar-block completes about one-third of a revolution and assumes substantially the position indicated by dotted lines in Fig. 53, being prevented from further rotation by contact with a stop on the lever, (shown at $n^{33}$, Fig. 44.) As the bar-block is reversed the line drops face down upon the alining-plate $N^7$, the faces of the recesses in the types sliding across the face of the type-sustaining bar $n^{15}$. This bar performs an additional and important function at this stage, because it sustains the quads and prevents them from dropping down upon the alining-plate. The quads being shorter than the types, their faces are held sufficiently above the alining-plate to leave the proper space, assuming, in fact, their usual relative position in the line. The effect of simply resting the perfect faces of the types upon the level alining-plate is to secure an accurate alinement without any special preparation of the types beyond that essential in any typographic art or apparatus. The line is now ready for justification. The justifiers are lying with their rectangular portions between the types laterally and the alining-plate and the jaw $N^4$ longitudinally. This support tends to prevent them from falling out when the bar-block is reversed; but in addition they are supported at the butt-ends by the edge of the justifying-bar $N^8$. This bar, Figs. 57, 58, 60–64, 68–70 as I have illustrated it is composed, essentially, of two parts, one an L-shaped piece $n^{34}$, bearing at the top a bar $n^{35}$, cut away on its inner side to form a half-wedge edge and hinged to the other part $n^{36}$, which is attached to a slide $n^{37}$, playing in ways in another slide $n^{38}$, operating in a channel and grooves in the body of the bar-block. The spring-pressed lever $N^9$ has an arm $n^{39}$, pivoted to the body of the block at $n^{40}$ and connected to the slide $n^{37}$, tending to constantly press the justifying-bar toward the line of type, but being held normally inoperative by means of a catch $n^{42}$ upon a bar $n^{41}$, pivoted in a channel of the body of the bar-block and pressed up against the part $n^{36}$ by a spring, the other part $n^{34}$ having its thinner base sustained in the same horizontal line by a boss or stud $n^{43}$ upon the bottom resting upon another bar $n^{44}$, pivoted in the same channel and beside the bar $n^{41}$. These bars are positively operated or turned on their pivots at desired intervals by a rock-shaft $n^{45}$, having a projection $n^{46}$ upon the end and bearing a hooked cam-arm $n^{47}$ and a cam-arm $n^{48}$, the cam-arm $n^{47}$ taking into a corresponding cut in the side of the bar $n^{41}$, the cam-arm $n^{48}$ normally supporting the bar $n^{44}$. As the bar-block moves up toward the melting-pot the rock-shaft $n^{45}$ is turned by its projection $n^{46}$, contacting at about its center with a pin $n^{49}$, Figs. 53, 71, upon a bracket $n^{50}$, attached to the side of the machine, and the bar $n^{41}$, with its stop $n^{42}$, is drawn down against the pressure of its spring by the hooked cam-arm $n^{47}$, releasing the justifying-bar $N^8$, previously held back by the stop $n^{42}$, and permitting the spring-pressed lever $n^{39}$ to throw forward the bar $N^8$ and bring into action the half-wedge edge of the bar $n^{35}$ to force in the justifiers, which have hitherto been serving as spacers only. The line having been alined and justified, it is now necessary to remove the type-sustaining bar $n^{15}$, so that the recesses of the types may be filled with molten metal and at the same time, the line having lost the support of the sustaining-bar $n^{15}$, must be clamped firmly between the jaws, so as to, in effect, present a mold to the melting-pot.

On the frame of the machine is the block $n^{51}$, Figs. 53, 71, having the two bevels or cuts $n^{52} n^{53}$, which operate, respectively, to draw out the bars $n^{16} n^{27}$, thereby drawing in the type-sustaining bar $n^{15}$ until it is flush with the edge of the jaw $N^4$ and permitting the false jaw $n^{23}$ of the jaw $N^5$ to be simultaneously forced out against the line to clamp it between the two jaws $N^4 N^5$. The bar-block then passes on to the melting-pot and presents the line to the mouth $L'$ of the pot, the pump is operated, and the molten metal flows in between the shanks and the separated types and fills all the recesses and spaces up to the justifiers and out to the surface of the jaws, thereby locking together the units and adding a base to the line and, in another aspect, permanently spacing the line. This action is brief, and the bar-block at once begins its return movement. The first thing to be done on the downward movement is the removal of the justifiers. These are held from an outward movement by the justifying-bar, which is pressing against the butt-ends. At the beginning of the return movement of the bar-block the projection $n^{46}$ of the rock-shaft $n^{45}$ strikes a projection $n^{55}$ upon a bracket $n^{54}$, Figs. 53 and 71, attached to the frame at one end and bent out to avoid interference with the arm of the mold-carrier. The projection $n^{46}$ lies at such an angle that as it passes up to the melting-pot it passes the pin $n^{55}$ without effect, but is caught by the pin on the downward movement. The effect of this contact is to turn backward the cam-arm $n^{48}$ and permit the bar $n^{44}$ to drop to the bottom of its channel, the part $n^{34}$ following it and bringing the half-wedge edge $n^{35}$ below the level of the bottom of the justifiers, Figs. 62–64. The action is expedited and insured by the position of the edge of the justifier-bar upon the ends of the justifier—that is, the spring-pressure tends to draw the edge down and off the faces of the butt-ends after the justifiers are driven home, so that as soon as the part $n^{34}$ begins to drop the half-wedge $n^{35}$ turns on the ends of the justifiers, presenting then a mere point of contact and permitting the spring-pressure to begin drawing forward the justifiers even before the edge $n^{55}$ has quite cleared the butt-ends of the justifiers. The justifying-bar is drawn over by its spring-lever until it meets the bar $N^{10}$, which is just beginning to move in to discharge the justifiers. This bar $N^{10}$, Figs. 57, 58, 68–70, is shown as having a flat top $n^{56}$ with a back $n^{57}$, adapted to secure the bar to the slide $n^{38}$ at the points $n^{58}$. The bar is positively operated by a rocking lever $n^{59}$, pivoted on the top of the bar-block against the pressure of a spring, Fig. 70, which afterward returns the bar. In the downward movement of the bar-block from the melting-pot the pin $n^{60}$ on the end of the rocking bar of the lever contacts with the arm $n^{61}$, Figs. 53 and 71, pivoted to the frame of the machine, and operates the lever, so that the bar $N^{10}$ is forced against the thin ends of the justifiers, removing and discharging the justifiers, which fall into a suitable receptacle and may be finally thrown into the melting-pot. It may be observed that on the movement of the bar-block to the melting-pot the pin $n^{60}$ pushes up the arm $n^{61}$ without effect, the arm being prevented from being thrown beyond the center by a pin projecting from it into an opening in the frame of the machine. As the bar $N^{10}$ moves in it abuts against the support of the justifying-bar at $n^{62}$, Fig. 58, stops the further movement of that bar, and carries it back until the hinged piece $n^{36}$ rides over the catch $n^{42}$ and is caught and retained against the spring-pressure until released in the succeeding cycle, the bar $n^{44}$ at the same time being carried up by the action of the cam-arm $n^{48}$ wiping upon its bottom, so that the stud or boss $n^{43}$ again holds up the part $n^{34}$. At the same time the pin $n^{60}$ rides past the arm $n^{61}$ and the rocking lever is returned by its spring, (shown in Fig. 70,) the bar $N^{10}$ resuming its original position. As the bar-block nears the end of its return or downward movement the pin $n^{30}$ registers again with the guideway $n^{31}$ and the bar-block is given a retrograde rotation, which finally brings it back to its original position. Just before it settles into that position the composite bar is discharged. To do this, a spring-drawn piece $n^{63}$, Figs. 53 and 71, is pivoted to the frame, the piece having a bevel or incline $n^{64}$, on which ride the hooked ends of the bars $n^{16}$ $n^{27}$, the effect of which is to force in the bars and to suddenly withdraw the false jaw $n^{23}$ of the jaw $N^5$ and at the same time strike the composite bar upon the side by the bar $n^{15}$, which is pushed out beyond the surface of the jaw $N^4$. The composite bar is thereby fully released and drops through the space between the jaws into the bar-galley O. While it is probable that the bar would drop with the end gate in its closed position, I prefer to insure its being entirely free to drop by releasing it from the pressure of the end gate, and this is done by action of the pin $n^{11}$ of the end gate $N^6$ as it passes over the forward curve $n^{65}$ of the piece $n^{63}$, the end gate springing back into position as soon as the pin has passed the piece. The type-sustaining bar is now ready to receive a new line of type, but the false jaw $n^{23}$ must first be forced out to its midway position to form the spring-back for the easy passage of the line of type, and this is accomplished at the finish of the return movement of the bar-block by drawing out the arm $n^{27}$ by its hooked end, which rides under the beveled cut $n^{66}$ on the piece $n^{63}$. The piece $n^{63}$ is pushed up out of the way by the projecting arms $n^{16}$ $n^{27}$ as the bar-block starts up toward the melting-pot, the projections then passing through the clear central space of the piece and the piece being returned by the action of its spring until it rests against a pin on the frame of the machine. As the bar-block drops into its place in the bed of the machine the oblique foot $n^7$, Fig. 51, of the end gate meets the incline $n^{18}$ of the arm $m^{18}$ and the end gate is held open ready for the succeeding line.

The bar-block has been described as subject to rotation by a spring and as clamping the line in place by spring-pressure. I have found, however, that while the springs offer a simple means of producing the desired effect it is advantageous to substitute positively-operating devices, and these are illustrated in detail in Figs. 72-76. Figs. 72-74 illustrate a modified form of the guideway $n^{31}$ for positively rotating the bar-block. A similar passage for the pin $n^{30}$ is shown; but an additional bearing-surface or fence $n^{67}$ is supplied, so that the pin $n^{30}$ is positively guided along the way to the point $n^{68}$, where it meets the swinging hooked arm $n^{69}$, pivoted at $n^{70}$ between projecting leaves of the guideway-frame and limited in its outward movement by the stop $n^{71}$ on the guide-block. The pin rides up the way until it meets the hooked end of the arm $n^{69}$, projecting over the way. The curve of this arm corresponds to the requisite degree of rotation of the bar-block, and as it swings back on its pivot to the limit of the stop it provides a path which is a compound of the combined upward movement and inward rotation of the bar-block, so that when the block has made its one-third revolution the pin $n^{30}$ is at the face $n^{72}$ and continues its upward movement along the said face. Having dispensed with the spring, it is necessary to lock the bar-block in its assumed position, and this is done by means of the gravity catch and latch illustrated in Fig. 72. It will be observed that Figs. 72 and 73 are arranged in about the relative position they occupy in the machine, so as to indicate the operation of the parts. The gravity-catch $n^{73}$ is pivoted upon the inner end of the bar-block, has a step at $n^{74}$, is curved to lie over the pin $n^{30}$, and has a straight end face $n^{75}$, which from its position has the effect of an inclined face when it plays upon the pin $n^{76}$, Figs. 73 and 74, on the guide-block $n^{31}$. The shaft of the bar-block bears a fixed latch $n^{77}$, with an outer curved end, which rides over the curved approach to the steps of the latch until just as the pin $n^{30}$ is leaving the face $n^{72}$ of the hooked arm $n^{69}$ the latch is caught by the step and holds the bar-block in the assumed reversed position. Upon the return of the bar-block from the melting-pot the face $n^{75}$ of the gravity-latch strikes the pin $n^{76}$, the latch is lifted, the block is released, and as it leaves the face $n^{72}$ of the hooked arm its weight throws it over in a retrograde rotation, the pin $n^{30}$ carrying with it the hooked arm $n^{69}$ until it again assumes the position shown in dotted lines, ready to assist the next rotation of the bar-block.

Figs. 75, 76 illustrate my device for positively clamping the line in the block. This device is attached to the back of the false jaw $n^{23}$, and consists, essentially, of a rod $n^{78}$, eccentrically journaled in bearings $n^{79}$, carrying at each end a roller $n^{80}$ and at its center a tappet $n^{81}$, having an inclined end adapted to contact with an angular spring-arm $n^{82}$, projecting over the top of the bar-galley. When the tappet $n^{81}$ strikes the arm $n^{82}$, the rod $n^{78}$ turns in its eccentric bearings and produces a downward throw of the rollers $n^{80}$, which press upon the retaining-bolts $n^{25}$ and force in the false jaw against the line of type. The incline or the end of the tappet $n^{81}$ permits it to pass under the arm $n^{82}$. On the return the reverse effect is produced and the bolts $n^{25}$ are free from the pressure of the rollers.

*15. Bar-galley O, Figs. 77–79.*—In the preceding heading the manner of releasing the composite bar and discharging it into a bar-galley has been described. This bar-galley consists, essentially, of a receptacle or frame for the bars, one of the sides being adjustable, as shown at $o$, a free platform $O'$, on which the bars are dropped, pins $o'$ supporting the platforms and adapted to be reciprocated by a lever-arm $o^2$, fulcrumed upon a bracket $o^3$, and actuated by a pin $o^4$ on the block-cam $K'$ or in any other manner. The pins $o'$ may be adjustable sidewise to accommodate the adjustment of the side of the receptacle. Hanging in the sides of the receptacle just above the platform are the spring-catches $o^5$, which when the platform is reciprocated receive the bar therefrom and retain the bars in order, with the face to the operator. The top of the receptacle has a projecting cover $o^6$, attached to a bracket, to catch any metal drippings, and the bar-galley as a whole is adapted to keep the bars in exact order and always so that each may be read.

*16. Operation.*—It is the purpose of my apparatus as a whole to cast the units of a line—that is, to cast all the types which may be required for the composition of any line of type—then to assemble these units into a line, which step might immediately follow the casting, but which in practice as a rule involves the preliminary storing of the units in receptacles and the releasing of the units in the proper sequence. The line is then transferred into a receptacle or line-holder, in which the line is reversed, placed face down upon a level surface to aline it, then justified and clamped and carried by the line-holder up to a melting-pot, from which molten type-metal is forced into the mold formed by the walls of the line-holder and the shanks of the types to transform the line into a bar, the justifiers being then discharged to fall into a scrap-pile or to return by a channel to their magazine, and the bar being discharged into a receptacle or galley, which forwards each bar in order, face out and ready for use. A polygonal mold-carrier D is reciprocated between a melting-pot C and a magazine H. The mold-carrier bears upon each face a series of molds for casting a series of types bearing different characters, and as the type-cavities of the molds are presented to the melting-pot molten type-metal is forced in by the automatic action of a pump in the pot. At the beginning of each reciprocation of the mold-carrier it is automatically rotated a quarter-turn, so that when it returns again from the melting-pot the molds in which the previous cast has been made are standing vertically and at the end of the reciprocation are holding the types over the mouths of the channels of the magazine. This magazine is composed of a series of channels, preferably in successive rows, there being a separate receptacle or channel for each of the several characters or units. It is purposed to release the types as opposed to ejecting them, so that they may fall by gravity into the channels, and this is done by removing the molds from the types. Two distinct elements enter into the formation of the types in the molds. The type-cavity proper forms the face or character and the body of the shanks of the types; but the form of the shanks is determined by a bar which projects from the mold-carrier into all the molds upon a given face of the carrier and has a face cut to produce a type-shank reduced and having a central recess. Both the mold and the bar must be removed from contact with a type before it can fall into its receptacle. This is done by a device F, termed in the description a "mold-operator," consisting of a frame adapted to be reciprocated vertically, carrying guides in which a block $F^2$ is reciprocated to and from the magazine by the movements of the mold-carrier, to which it is connected by frictional slides. This mold-operator has also a preliminary or additional function, that of determining or regulating the supply of types to the magazine. The reciprocating block $F^2$ carries a series of fingers, one for every mold of any series, and each of these may be retracted by the upward movement of a corresponding set of elements or instruments, which I have termed "selecting-pins or feelers" and which are in operative relation with the fingers and which, as the alterative term indicates, have a complex function. The mold-operator is brought over and down to the magazine. In the channels which are not filled to the desired limit with types the feelers enter without effect; but if any channel be filled the feeler or selecting-pin for that channel will be pushed up and will draw back the finger corresponding to the mold from which the channel has received its supply. The mold-operator is then lifted, and the mold-carrier returning from the metal-pot pushes back the block $F^2$ until it is against the frame of the machine or a stop mechanism G. The mold-operator then rises, so that when the mold-carrier stops over the magazine all the fingers not retracted by the selecting-pins are registered with the upper ends of the corresponding molds. The mold-operator rises again and as it rises draws the molds engaged by fingers away from the types. It will be remembered that the face of a bar projecting into the type-cavities has caused a central recess to be formed in the shank of each type. As the mold draws away from the types each type is freed from contact with any part of the mechanism except a slight contact at the head and is retained or left depending by the upper shoulder of the recess upon the face of the bar, which has prevented its following the mold. After the molds have been drawn away a pair of arms upon the mold-operator engage this retaining-bar and force it back, so that the type is released and falls by gravity into its receptacle. The mold-operator now drops, carrying back the molds to their normal position, and the mold-carrier starts again for the melting-pot, not drawing the mold-operator with it at once, because of a lost motion given the frictional connecting-slide, which permits the mold-operator as soon as its fingers are freed to drop finally to its resting position and to force in the retracted fingers by drawing their beveled ends down the frame or stop mechanism. This stop mechanism is a special feature, which does not alter the general operation and which is adapted to regulate the position of the mold-operator and through it of the mold-carrier when a duplex or multiple magazine is used. Its construction and operation are specifically described under the heading "6. Stop mechanism." The types stand upright in vertical columns in the magazine, are released by an escapement I, and fall in any desired sequence to an assembling mechanism J. The compact construction of my machine and the relations of the magazine to the succeeding parts is such that with the most rapid operation the types will fall in the proper order. An assembling-channel receives the types and presents them at such an angle to the eye that the line may at any time be easily read. A type-packer or type-forwarder J' pushes the types along the channel against the pressure of a spring-finger step by step as they fall and is so constructed that it may yield in case of an obstruction in the line or discharge. When the line is complete, it is grasped by two spring-actuated fingers $M^3$ $M^4$, carried by a transfer-carriage M, which is reciprocated in a composing-frame J by a spring-actuated transfer-lever $M^2$. Adjacent to the composing-frame is a receptacle N, which I term for convenience the "bar-block," having a channel in line with the assembling-channel. The bar-block has also a channel at right angles to the first-named channel for the reception of the justifiers of the line, which are shot across the line at the desired intervals during the composition. The line passes into these channels, and when placed within the block the fingers $M^3$ $M^4$ at the opposite ends of the line are automatically thrown out of the line and back to their original adjacent position, traveling back upon the composing-frame with the transfer-carriage M by the action of the cam mechanism K upon the transfer-lever $M^2$, the cam mechanism having been started by the movement of a hand-lever by the operator. The end of the channel through which the line passes is controlled by a gate $N^6$, which during the transfer of the line is held open against spring-pressure by an oblique foot resting upon an incline of a spring-lever, which upon the return of the transfer-carriage is removed from the foot, permitting the end gate to close. The bar-block N, in which the line now lies, is borne by a lever and through the action of a cam upon the shaft of the machine is swung up to a second mouth of the metal pot soon after the introduction of the line. The line is hanging between two jaws $N^4$ $N^5$ by the recesses in the types, which take over a sustaining-bar in the jaw $N^4$, the justifiers lying with their rectangular apexes between the types and their butt-ends resting against the half-wedge of a justifier-bar $N^8$. As the bar-block swings up toward the melting-pot a pin upon the end of the block plays in a guideway on the frame of the machine and when the block is spring-torsioned governs and limits the rotation of the block upon its axis, so that it will make about one-third of a revolution and be held by a stop on the operating-lever. I prefer, however, to positively rotate the block, and I do this by a swinging hooked arm placed in the guideway and serving to rotate the block until it is caught and held by a gravity-catch, the block being then held at one end by a stop on the operating-lever and at the other end by the said catch. In this position of the bar-block the line is reversed, and it drops upon the sustaining-bar between the jaws, so that the character-bearing types rest with their faces upon an alining-plate $N^7$, the quads being too short to reach the plate. Immediately afterward a spring-pressed lever $N^9$, which actuates a justifier-bar $N^8$, is released, and the justifiers are driven in between the types, so that the line is pressed out laterally between the end of a gage-bar lying between the jaws and the end gate at the inner side of the bar-block. The line is now accurately alined and justified, and the next automatic action is the releasing of the false jaw of jaw $N^5$, so that it may be pressed out to clamp the line. With a strong spring it would be sufficient to merely release the false jaw; but I prefer to add a a positive eccentric clamp, which forces in the false jaw and securely holds the line, the sustaining-bar of the jaw $N^4$ at the same time being drawn into the body of its jaw, so that the recesses of the types are clear and the line is held between the now flat sides of the jaws, the block abuts the mouth of the melting-pot, the second pump is operated, and the molten metal flows in upon the bases of the types between the shanks and into all the recesses, binding and locking together the units of the line and transforming the line into a type-bar. The bar-block now begins its return movement and the justifier-bar drops off the butt-ends of the justifiers, and their opposite ends are struck by the spring-pressed bar $N^{10}$, automatically released at this point. The justifiers either fall into a scrap-pile to be recast or into a hopper, which returns them to their magazine. As the bar-block continues its downward movement the false jaw which is clamping the type-bar is released, the end gate is thrown back from contact with the end of the type-bar, and the sustaining-bar of the jaw $N^4$ is pushed out by its spring against the side of the type-bar, these movements being in such rapid sequence as to be nearly simultaneous, so that the type-bar is released and permitted to fall into a receptacle which I term a "bar-galley" and which holds the type-bar with its face out, so that it may easily be read, and lifts each type-bar in succession, so that they are kept in order for use. The end gate springs back to place, but immediately thereafter drops upon an incline of a lever and is forced back to leave the channel open, the false jaw at about the same time moving to its intermediate position, the bar-block being now ready to receive the succeeding line.

With the view of making this narrative of the operation of my machine as clear and connected as possible I have not included the casting of the justifiers, which may or may not be auxiliary to the casting of the other units of a line, as described under the heading "4. Auxiliary justifier-mold," nor the acts of the operator in setting the machine in motion and determining the transfer of the line, nor the action of the driving and cam mechanism, which are described under the headings "1. Driving and cam mechanism" and "11. Cam mechanism." I have also in several cases omitted the minor details of mechanical movement.

*17. Modifications and equivalents.*—I have in several instances described modifications and in other instances have stated that the mechanisms of the machine have many mechanical equivalents which are under a familiar principle of law included by the terms of my claims. This principle is peculiarly applicable to my invention, which I believe to be a radical departure in the typographic art and of a broad and primary character, presenting new ideas of casting, storing, and assembling types and being the first to transform a line of type units into a justified type-bar, the first to join a bar-forming mechanism with a type-setting mechanism, the first to produce and fix in place by one act the permanent spaces required for a justified line, and the first to produce methods and apparatus for thus justifying and for transforming a line of type into a type-bar. I desire also to call attention to what has been hereinbefore suggested, that while every element of the machine has been carefully designed the evidence of a new principle in typography is found in the relations of the several parts of the apparatus, and especially in the relations of the final products of the method and machine to the carrying out of the method and the operation of the machine.

IV. Products of the Machine.

*18. Type P, Figs. 75, 76, 77, 82-84.*—My machine is adapted to cast, store, and compose any form of type; but the type P, I show is especially adapted to be stored and assembled as described. This type is shorter than regulation foundry-type, has the full shoulders of foundry-type, has a recess at about the center of the shank, and has a reduced lower portion. (See heading "3. Mold-carrier and molds.") The recess is peculiarly advantageous, the shoulders of the recess enabling the type to be sustained upon the several parts arranged for that purpose in the various operations of producing a composite type-bar. In no step of my method and in no part of my mechanism, however, is there anything that renders necessary any especial care in the production of the type beyond the obtaining of the one universal typographic essential—viz., a perfect face. It is these faces and not the irregular and untrue feet or shanks which govern the alinement to attain which the types are inverted with their perfect faces resting on a level surface, whereby the truest line possible in typography is attained. I also purposely produce a short type, thereby economizing space throughout the whole casting, storing, composing, and assembling apparatus and attaining a final advantage, for the rough shanks and recesses slightly fuse when the molten metal is cast into the mold formed by the shanks of the units of a line and a portion is added as a base, which, with the metal which sets in the recesses and between the shanks, forms a firm lock for the several units. This convenient form of type for practically carrying out the formation of the composite bar is illustrated in Figs. 83 84, showing the additions made by casting. In the form there shown the type is at the center or recessed point about one-half and at the foot about two-thirds the width of the cameo end, and the type is short-shanked or somewhat less than type high, so that the molten metal may readily flow through the spaces from the bottom, fill the recesses, and add a base to the whole line. The feet may be even more reduced, as indicated, to admit of a ready flow; but the perpendicular cuts are best adapted to my system, as the types have definite relations to one another in the magazine and other parts of the apparatus. The striking advantages of a type constructed as described, or in an equivalent form, lies in its ready capacity for use in the alining, spacing, and backing process of locking together the units, enabling not only the most perfect line to be attained, but also reducing the care in casting the type to a minimum and resulting in great economy.

I desire to call attention to the fact that I do not cast a type of a certain form to secure a final advantage alone, but that the form of type I show and use in my apparatus is peculiarly adapted to permit the readiest handling throughout the apparatus and to secure a marked economy of time and space.

19. *Justifiers Q*, Figs. 85, 37.—My new method and machine permit a radical departure in the art—viz., the casting of the justifiers. Hitherto the justifier has been a distinct tool or element, requiring especial care in its construction. I regard the casting of my justifiers so that in common with all the elements of a line they may go back to the melting-pot as a distinct feature of invention, and I believe I am the first to produce a cast justifier in the same machine in which the character-types are produced, as well as the first to invent methods and produce means in which such a justifier may be most effectively used. The justifier shown at Q, Fig. 85, is substantially wedge-shaped—that is, in the form of a truncated right-triangular prism in its major base portion and has a rectangular apex portion $q$ with parallel sides, and its peculiar applicability to my method and apparatus has been suggested in the opening of the specification and also under heading "14. Alining, justifying, and metal-backing mechanism" set forth. Its rectangular portion enables it to be used as a spacer first, and then as a justifier it may be driven home, having the action of a wedge upon the line. Minor advantages may be noted in that in removing the justifiers the bar $N^{10}$ has a securer purchase by reason of the rectangular portion and can positively drive out the justifiers in a right line to the bar and in the fact that the tapering form of the justifier enables it to readily traverse the sinuous channel of its magazine.

The justifiers I use in practice are somewhat larger than the character-types.

While, as I have said, the casting of justifiers is a feature of my invention, I am enabled to use a permanent—as, for example, a steel—justifier of the same form with marked effect and in some instances with added economy, because the justifiers may be so readily distributed in my apparatus. The justifiers are carried up with the line and when they are discharged are above the magazine, so that they may at once drop into channel and slide into the magazine. Such a channel is shown in Fig. 80, Q', and it is obvious that the justifiers will always fall butt end first into the channels, however they may strike its sides, and that they naturally reach the proper position in the channel.

20. *Composite type-bar R*, Fig. 81.—The product which I obtain by my improved methods which my apparatus is constructed to carry out I have termed a "composite" bar to distinguish it from the common linotype or cast line of type and the common indented type-bar of type produced by matrix-machines. It is composed of a series of separate units of types bearing carefully and separately formed characters, and these types may be formed in any manner, though for rapid and continuous work it is of course preferable to cast them in the same machine. These units are locked together by molten metal which forms a part of the bar. In the best form of type-bar, which I have illustrated, the units are short types having reduced shanks with central recesses, so that the molten metal flows between and upon the shanks and into the recesses and produces a bar type-high and practically solid. The molten metal in running fuses the surface of the shanks of the types and tends to bind them together; but this binding is not relied upon, the locking of the metal in the recesses with the added base giving absolute security.

In my preferred form the types are fused over as much surface as possible, the metal passes from between the shanks into the recesses at right angles across the type-line, the bases of the types rest against a solid backing or base, and the several types are also by reason of the reduced shanks strengthened by the metal along the sides of the shanks, so that the added metal and the types are oppositely locked together in the best manner to successfully resist any strain.

Fig. 81 is intended to illustrate the character of both sides of my type-bar. On the recess side the recess is defined by two lines, where the cast metal has turned in over the shoulders of the recess. Above these lines, between the words, projects for a short distance that part of the cast metal which represents the usual space in a line of type, while below the lines the metal is smooth to the base of the bar. On the other side, which may be termed the "back" of the bar, the point where the metal has turned in under the short type is defined by a line, (dotted in the view,) and from this line upward the alternating types and portions of metal representing spaces may be clearly distinguished—that is to say, the front of the bar when the casting is completed presents a smooth finish, marked by fine transverse lines defining the place of the recess and by fine vertical lines defining the place of the intervening spaces, while the back of the bar has the bottom addition defined by a transverse line and the several types and spaces defined by vertical lines.

My completed bar is distinguishable at a glance from any bar heretofore made in any way and is peculiarly marked as an advance in the typographic art by the fine type effect, all the types having the full sharp shoulders so evident in a line of foundry-type and wanting in a cast line of type or a line produced by indentation.

The bar is smooth and practically without projection or unevenness, while at the same time the eye can select the component parts of the bars, as indicated by the previous description of the bar, as illustrated by Fig. 81.

I claim—

1. The combination of a line-holder, with means for transforming a line of type into a type-bar.

2. The combination of a line-holder, with means for transforming a line of type into a justified type-bar.

3. The combination with means for holding a line of type, of means for presenting a line thereto, and means for transforming the line into a type-bar.

4. In a typographic machine, the combination with a type-setting mechanism, of a line-transforming mechanism, and means for transferring a line from the type-setting mechanism to the line-transforming mechanism.

5. In a typographic machine, the combination of type-casting means, type-storing means, type-setting means, bar-forming means, and connecting and actuating mechanism.

6. In an organized typographic machine, the combination of mechanism for assembling the separate units of a line, and means for transforming the line into a type-bar.

7. In an organized typographic machine, the combination of means for casting the units of a line, means for assembling the units into a line, and means for transforming the line into a type-bar.

8. In an organized typographic machine, the combination of means for casting the units of a line, means for assembling the units into a line, means for alining the line, means for justifying the line, and means for transforming the line into a type-bar.

9. In a typographic machine, the combination of means for casting the units of a line, means for storing the separate units in separate receptacles, means for releasing the units in any desired sequence, means for assembling them into a line, means for alining the line, means for justifying the line, and means for transforming the line into a type-bar.

10. In a typographic machine, the combination of means for casting the units of a line, means for assembling the units into a line, means for alining the line, means for justifying the line, and means for casting additional metal about the line to transform it into a type-bar.

11. In a typographic machine, the combination of means for casting a series of types bearing different characters, means for selecting or assembling the units of a line, a receptacle for the line, means within the receptacle for alining and justifying the line, and means for introducing type-metal into the line.

12. The combination with type-casting and type-setting mechanism, of means for justifying an assembled line, means for transforming the line into a type-bar, and means for removing and discharging the justifiers.

13. In a typographic machine, the combination of a receptacle for a line of types, means for justifying and transforming the line into a type-bar, and means for discharging the type-bar.

14. In a typographic machine, the combination of a composing-block having channels for containing and guiding the units of a line of type during composition, a line-holder or bar-block having channels registering with those of the composing-block, means for transferring a line from the composing-block to the line-holder or bar-block, and means for actuating the line-holder or bar-block to form a justified line of type.

15. In a typographic machine, comprising type-casting, type-setting and bar-forming mechanisms, means for continuously operating the type-casting mechanism, and means governed by the operator for intermittently applying the power to the actuating means of the bar-forming mechanism.

16. The combination of a type-setting mechanism with a bar-block to receive a line of type from the type-setting mechanism, means for moving the bar-block, an intermediate line-transfer mechanism, means for applying power to the line-transfer mechanism and to the actuating mechanism of the bar-block, and means for reversing the action of the line-transfer mechanism before the movement of the bar-block.

17. In a typographic machine, the combination of a receptacle for a composed line of types, means for transforming the line into a justified type-bar, means for discharging the bar, and a receptacle or bar-galley adapted to receive and forward each bar in succession.

18. The combination with the composing-block of a type-setting mechanism having channels to sustain and guide the units of a line of type, of a line-holder having channels to receive the line of type, an end gate guarding the channels of the line-holder, and means for transferring the line from the composing-block to the line-holder and operating the end gate to close it.

19. In a typographic machine, the combination with a melting-pot and a holder for receiving and retaining a line of type, of means for swinging the holder to and from the melting-pot, and means for discharging metal into the line of type to space it and transform it into a type-bar.

20. In a typographic machine, the combination with a melting-pot, of a journaled holder for receiving and retaining a line of type, means for swinging the holder to and from the melting-pot, and means for rocking it during its movements, substantially as described.

21. In a typographic machine, the combination of a melting-pot, a receptacle or holder for an assembled line of type, means for moving the receptacle or holder to and from the melting-pot, means for alining, and means for justifying the line during the transit of the receptacle or holder, substantially as described.

22. In a typographic machine, the combination of a melting-pot, means for assembling the units of a line, a receptacle for the line of type, means within the receptacle for alining and justifying the line of type, and means for moving the receptacle to and from the melting-pot, substantially as described.

23. In a typographic machine, the combination of a melting-pot, a receptacle for a line of type, means for clamping the line of type in the receptacle, means for swinging the receptacle to and from the melting-pot, means for discharging metal into the line of type to space it and transform it into a type-bar, and means for releasing the clamp on the returning movement, substantially as described.

24. In a typographic machine, the combination of a melting-pot, a receptacle or holder for an assembled line of type, means for moving the receptacle or holder to and from the pot, means for alining, and means for justifying the line operating during the movement to the pot, and means for removing and discharging the justifiers operating on the movement from the pot, substantially as described.

25. The combination of a melting-pot, a receptacle adapted to receive a line of type, means for swinging the receptacle through an arc to and from the melting-pot, and means for partially rotating the receptacle at the beginning of its movement and upon its return, substantially as described.

26. The combination of means for assembling a line of type, means for introducing justifiers, means for forcing in the justifiers, and means for introducing metal about the shanks of the types to create permanent spaces and bind the types together.

27. The combination of means for placing justifiers in a line of type, means for forcing in the justifiers, and means for simultaneously replacing all the justifiers by spaces.

28. The combination of means for placing justifiers in a line of type, means for forcing in the justifiers, and means for applying all the required spaces to the line simultaneously.

29. In a typographic machine, the combination of means for justifying the line, and means for applying all the required spaces to the line simultaneously.

30. The combination of a line of type and justifiers, means for forcing the justifiers into the line, and means for applying spaces to the line while the justifiers remain in position.

31. The combination of means for forcing justifiers into a line of type to occupy a portion of each division or space, and means for fixing spaces in the line without removing the justifiers.

32. The combination of means for placing justifiers across a line of type, means for forcing in the justifiers, and means for placing spaces beneath the justifiers.

33. A mechanism for justifying composed lines of types, comprising means for parting the lines between words and means for casting justifying-spaces into the molds so formed.

34. A mechanism for justifying lines of type composed with temporary spaces, comprising means for removing the temporary spaces, and means for simultaneously producing and placing in their stead permanent spaces.

35. The combination of means for assembling types and justifiers, and means for simultaneously producing and placing the required spaces.

36. A mechanism for justifying composed lines of type comprising means for forming justifying-spaces in the line.

37. The combination of means for casting types, means for casting a binder for the types, and operating means.

38. The combination in an organized typographic machine, of means for casting the units of a line, separate receptacles for the several units, means for separately storing and accumulating the several units in the receptacles, and means for assembling the units into a line.

39. The combination in an organized typographic machine, of type-casting molds, means for introducing type-metal into the molds, means for releasing the types from the molds, receptacles for the types, means for releasing the types from the receptacles, and means for assembling the types into line.

40. In a typographic or type-casting machine, the combination of molds, means for introducing type-metal into the molds, receptacles for the type, and means for releasing the types from the molds so that they fall by gravity into the receptacles.

41. The combination with molds for casting type, of receptacles for the types, means for bringing each mold over the mouth of a receptacle, and means for releasing or freeing the types, so that they are discharged by gravity into the receptacles.

42. The combination of a mold-carrier bearing movable molds for casting types, receptacles for the types, and a mold-operator for releasing the types from the molds having means for engaging the molds and moving them away from the types, so that the types may fall into the receptacles, substantially as described.

43. The combination with a mold-carrier bearing movable molds for casting types, of a series of fingers for moving the molds to release the types.

44. The combination of a mold-carrier bearing molds for casting types movable on the carrier, receptacles for the types, and a mold-operator for releasing the types from the molds having fingers adapted to engage the ends of the several molds to move them away from the type to permit the type to fall into the receptacles, substantially as described.

45. The combination with mechanism for casting type, of a mold-operator bearing a series of fingers adapted to engage and move the molds of the casting mechanism, and means to engage and adjust the fingers.

46. The combination with a series of movable molds for casting a series of types, of means for moving the molds away from the types, and separate receptacles for the several types.

47. The combination with a series of movable molds for casting a series of types, of a series of fingers for moving the molds away from the types after the casting, and separate receptacles for the several types.

48. The combination with a series of movable molds for casting a series of types, of a series of fingers for moving the molds away from the types after the casting, separate receptacles for the several types, means for releasing the types from the receptacles, and means for assembling them into line.

49. The combination of a series of movable type-molds, a melting-pot and operating means, and means for moving each mold separately or independently away from the cast type.

50. In a typographic machine, the combination with molds, of a mold-operator having fingers for operating the molds, and means for controlling the action of the fingers.

51. The combination of a mold-carrier bearing molds for casting types, a series of fingers for releasing the types from the molds, and means for selecting and throwing out of engagement any of the fingers.

52. In a typograph, the combination of a mold-carrier bearing molds for casting types, a series of fingers for releasing the types from the molds, and means controlled by the operation of the machine for selecting and throwing out of engagement any of the fingers.

53. In a typographic machine, the combination with molds, of a mold-operator, fingers loosely supported by the mold-operator, and means for controlling the action of the fingers.

54. In a typographic machine, the combination with a series of molds, of a series of fingers for operating the molds, means for controlling the action of the fingers, and means for throwing all the fingers simultaneously out of engagement with the molds.

55. In a typographic machine, a reciprocating mold-operator having a body bearing a series of fingers, and a series of unattached or loosely-supported selecting-pins coacting with the fingers to control their action.

56. In a typographic machine, a mold-operator having a channeled body, fingers and selecting-pins in the channels, the fingers having operating means and the selecting-pins serving normally to limit the inward movement of the fingers.

57. In a typographic machine, the combination with molds and a vertical magazine of a vertically-reciprocating mold-operator having a series of fingers, and a series of selecting-pins or feelers playing into the magazine and controlling the action of the fingers.

58. In a typographic machine, the combination of a horizontally-reciprocating mold-carrier, bearing a series of molds, a vertical magazine and a vertically-reciprocating mold-operator bearing a series of fingers and a series of selecting-pins or feelers.

59. The combination with mechanism for casting type, of a mold-operator for releasing the types, having a series of fingers to engage the molds of the casting mechanism, and a series of elements each adapted to engage and render inoperative a corresponding finger.

60. The combination with mechanism for casting type, of a mold-operator for releasing the types having a series of fingers for engaging the molds of the casting mechanism lying in and guided by a channel in the body of the mold-operator, a series of elements lying in another channel in the body of the mold-operator, guided by the channel and adapted to engage and render inoperative the fingers, substantially as described.

61. In a typographic or type-casting machine, the combination of a mold-carrier having a series of molds, type-receptacles, a mold-operator having fingers for engaging the molds, a series of feelers each adapted to enter a type-receptacle, and also adapted to engage a corresponding finger, and means for operating the mold-operator, substantially as described.

62. In a typographic machine, the combination of a magazine, a mold-carrier having molds adapted to discharge into the magazine, a mold-operator having a series of fingers and a series of feelers adapted to engage the fingers and to enter the magazine, means for moving the mold-operator to cause the feelers to enter and leave the channels of the magazine, and subsequently to cause the operative fingers to free the types, substantially as described.

63. The combination with a mold bearing means for releasing the cast unit, of a receiving-channel and means adapted to operate the releasing elements of the mold and to be thrown out of engagement by the contents of the channel.

64. The combination of means for casting a series of types, a series of receptacles for the types, and means for automatically regulating the supply of types to each receptacle, substantially as described.

65. The combination of means for casting a series of types, a series of receptacles for the types, and means for automatically and independently regulating the supply of types to each receptacle, substantially as described.

66. The combination of means for casting a series of types, a series of receptacles for the types, means for automatically and independently regulating the supply of types to each of the receptacles, and means for releasing the types from the receptacles, substantially as described.

67. The combination of means for casting a series of type bearing different characters, receptacles for the types, means for separately storing the several types in the receptacles, and means for automatically and independently regulating the supply of type to any receptacle, substantially as described.

68. In a typographic machine, the combination of means for casting types, receptacles for the types, and means adapted to be operated by the type in any receptacle to render inoperative the casting mechanism for that receptacle.

69. The combination with a series of independently-movable molds for casting a series of types, of a series of fingers for moving the molds away from the types and movable out of operative connection with the molds to govern the operation of the casting mechanism.

70. The combination with a series of molds for casting a series of types, of a series of fingers adapted to engage and move the molds to strip them from the type and movable out of operative connection with the molds to govern the operation of the casting mechanism.

71. The combination with a plurality of molds for casting a series of types, of a series of reciprocating fingers adapted to move the molds away from the types and movable out of operative connection with the molds to render the casting mechanism inoperative, cells or magazines arranged to receive the types and in which the types are accumulated, and mechanism for individually removing the desired types from the cells or magazines, substantially as described.

72. In a typographic or type-casting machine, the combination of a mold-carrier having a series of faces, molds on each face for casting a series of type bearing different characters, and a series of receptacles having channels corresponding in arrangement to the unit arrangement of the molds, substantially as described.

73. In a mold-carrier for typographic or type-casting machines, the combination of a movable mold with the walls of a channel, a shank-block in one of the walls for determining the form of the shank of a type, and means for freeing the type from the shank-block.

74. In a typographic or type-casting machine, the combination of molds having type-cavities, and auxiliary devices for determining the form of the shanks of the type, and means for successively moving the molds and the auxiliary devices away from the types, so that the types may fall by gravity.

75. In a typographic or type-casting machine, the combination of molds, means for introducing type-metal into the molds, receptacles for the types, means for removing the molds from the types, means for retaining the types during the movement of the molds away from the types and sustaining them thereafter, and means for finally releasing the types, so that they may fall by gravity into the receptacles.

76. The combination of a melting-pot, and receptacles for types, of a mold-carrier, means for reciprocating the mold-carrier to and from the melting-pot and the receptacles, means for introducing type-metal into the molds, means for rotating the mold-carrier to bring the molds into line with the receptacles, and means for releasing the type from the molds so that they may fall into the receptacles, substantially as described.

77. The combination of a movable mold-carrier bearing molds for casting types, receptacles for the types, a movable mold-operator for releasing the types from the molds and mechanism operated by the movements of the mold-carrier to locate the mold-operator with reference to the receptacles.

78. The combination of a melting-pot, a mold-carrier for casting types, a series of receptacles for the types, means for moving the mold-carrier between the pot and the receptacles, and a movable device for releasing the types from the molds connected to the mold-carrier so that the movement of the mold-carrier moves the type-releasing device to and from the receptacles.

79. The combination of a mold-carrier bearing a series of molds for casting types, a series of receptacles for the types, and a mold-operator for releasing the types from the molds, the mold-carrier and the mold-operator being adapted to be reciprocated to and from the receptacles to throw them into and out of engagement, substantially as described.

80. The combination with a mold-carrier having movable molds for casting type, and movable bars projecting into the type-cavities of the molds, of a mold-operator or type-releasing device having a series of fingers adapted to engage the molds and arms adapted to engage the bars, and means for operating the mold-operator or type-releasing device, so that the types are released and permitted to fall, substantially as described.

81. In a typographic machine, the combination of a mold-carrier having a series of molds, type-receptacles, and a mold-operator F, having a block $F^2$, bearing a series of fingers $f^3$, projecting at each end beyond the body, and adapted at one end to engage the molds and at the other end to engage a bar or frame to return the fingers, and a series of selecting-pins or feelers each adapted to engage a finger, and projecting below the body and adapted to enter the type-receptacles, and means for operating the mold-operator, substantially as described.

82. In a typographic machine, the combination of a polygonal mold-carrier having channels in each face adapted to receive and guide a series of movable molds, and a mold-operator bearing a series of fingers, and formed to fit into the face of the mold-carrier and engage the movable molds, and means for operating the mold-operator, substantially as described.

83. The combination of a mold-carrier bearing a series of molds for casting type, a series of receptacles for the types, a mold-operator for releasing the types from the molds, means for operating the mold-operator, and stop mechanism for registering the mold-operator and the mold-carrier with any of the series of receptacles, substantially as described.

84. In a typographic machine, the combination of a magazine having a plurality of rows of channels, a mold-carrier, bearing corresponding series of molds, and means for registering the molds with the several rows of channels in succession, substantially as described.

85. In a typographic machine, the combination of a magazine having a plurality of rows of channels, a mold-carrier bearing corresponding series of molds, a mold-operator, and means for registering the molds and the mold-operator with the several rows of channels in succession, substantially as described.

86. In a typographic machine, the combination of a magazine, a mold-carrier having molds adapted to discharge into the magazine, a mold-operator having a series of fingers and a series of selecting-pins or feelers adapted to engage the fingers and to enter the magazine, means for moving the mold-operator to cause the selecting-pins or feelers to enter and leave the channels of the magazine, and subsequently to cause the operative fingers to free the types, substantially as described.

87. In a typographic machine, the combination of a magazine, a mold-carrier having molds adapted to discharge into the magazine, a mold-operator having a series of fingers and a series of selecting-pins or feelers adapted to engage the fingers and to enter the channel of the magazine, means for moving the mold-operator to and from the magazine, means for moving the mold-operator to cause the selecting-pins or feelers to enter the channels of the magazine, and subsequently to cause the fingers to free the type, and means for putting all the fingers and selecting-pins or feelers out of engagement upon the backward movement of the mold-operator, substantially as described.

88. The combination of a mold-carrier having molds journaled on a shaft bearing a cam-face, a device for releasing the types from the molds, and means for regulating the position of the type-releasing device operated by the cam of the mold-carrier shaft.

89. In a typographic machine, the combination of a magazine and a melting-pot, and ways connecting the two, bearing-guides adjacent the magazine and the melting-pot, with a reciprocating mold-carrier adapted to be laterally adjusted by the guides, substantially as described.

90. The combination with the magazine and melting-pot of a typographic machine, of ways $d$, having projecting guides $d^{21}$, and a reciprocating polygonal mold-carrier cut away at opposite corners on each end so that the mold-carrier may alternately engage opposite guides, substantially as described.

91. A polygonal mold-carrier having a plurality of distinct faces each face bearing a series of molds for casting type, said molds bearing matrices representing different characters.

92. A polygonal mold-carrier for casting types having a series of movable molds, and means for guiding the molds upon the mold-carrier.

93. In a typographic or type-casting machine, a polygonal mold-carrier having a body carrying in each corner a spring-pressed bar, a plate attached to each face and forming with the body and the faces of the bars channels for a series of molds, substantially as described.

94. In a typographic machine, a polygonal mold-carrier bearing a series of molds on each face, plates inclosing the molds, channels in each face of the carrier, and movable bars lying in each channel and projecting into the type-cavities of the molds, substantially as described.

95. A polygonal mold-carrier for casting types having plates attached to each face, so that channels are formed between the plates and the body of the carrier and movable molds, and spring-pressed guides for the molds lying in the channels, substantially as described.

96. In a typographic machine, the combination of a mold-carrier having bars $d^{10}$, arms $f^9$ adapted to engage the bars, and means for operating the arms $f^9$, substantially as described.

97. The combination of a melting-pot and a reciprocating and rotatable mold-carrier having a plurality of mold-bearing faces.

98. The combination of a melting-pot, a magazine, a mold-carrier having a plurality of mold-bearing faces, means for reciprocating the mold-carrier to and from the melting-pot and the magazine, and means for partially rotating the mold-carrier during each reciprocation.

99. The combination of a melting-pot, type-receptacles, a mold-carrier, means for presenting the molds horizontally to the melting-pot, means for turning the molds to a vertical position after each casting, and means for releasing the types.

100. The combination of a mold-carrier having four faces, each face bearing a series of molds for casting different characters, means for introducing type-metal into the molds, means for giving a quarter-revolution to the mold-carrier after each casting, and means for releasing the types from the molds.

101. In a typographic or type-casting machine, the combination of a mold-carrier bearing a notched disk having pins projecting from it, a detent adapted to engage the notches of the disk, a hooked arm bearing a latch, the arm adapted to engage the pin, and the latch adapted to engage the detent, and means for operating the hooked arm, substantially as described.

102. A type-mold having a yielding side to permit its ready removal from the type.

103. A mold E, having a part E', an end gate carried by the part E', and a part E², and elements carried by the part E² to regulate the discharge of the cast unit, substantially as described.

104. The combination of a reciprocating mold-carrier D, a bracket $e^5$, carried by the mold-carrier D, a rock-shaft E³, operated by the bracket $e^5$, carrying one part E' of the mold E, and a sleeve $e^3$ carrying the other part E² of the mold, substantially as described.

105. The combination of a mold, a spring-pressed loosening-pin extending into the mold-cavity, an arm, and means for automatically operating the arm to vibrate the pin.

106. The combination of a mold, a spring-pressed loosening-pin extending into the mold-cavity, an arm, means for operating the arm to vibrate the pin, and means for governing the operation of the arm to regulate the supply.

107. The combination of a mold, a receptacle, a spring-pressed loosening-pin extending into the mold-cavity, an arm, means for operating the arm to vibrate the pin, and means controlled by the types in the receptacles for governing the operation of the arm to regulate the supply.

108. A mold-operator F, having in combination a block F², carrying fingers $f^3$ to engage and move the type-molds, and reciprocating bars F' bearing the block F², and having arms $f^9$ for finally releasing the types, substantially as described.

109. A mold-operator having a channel in its body to receive and guide a series of fingers adapted to engage and move a series of molds, and a second channel intersecting the first channel, and adapted to receive and guide a series of elements to engage the fingers, substantially as described.

110. The combination of a mold-operator, a reciprocating mold-carrier, and frictional slides connecting the mold-carrier and the mold-operator, substantially as described.

111. The combination of a mold-operator, a reciprocating mold-carrier having recesses and frictional slides connecting the mold-operator and the mold-carrier, having hooked ends adapted to play in the recesses, substantially as described.

112. The combination of a reciprocating mold-operator and a rocking bar, and means for intermittently operating the rocking bar to limit the reciprocations of the mold-operator, substantially as described.

113. A mold-operator having alternating stops $g^7$, $g^8$, and a reciprocating block F², bearing a stop adapted to engage one of the stops $g^7$, $g^8$, substantially as described.

114. A stop mechanism G for a typographic machine, having a rocking bar, G², a swinging lever G⁴, a stop $g^7$, and an operating-arm $g^3$, substantially as described.

115. In a typographic machine, a type-magazine consisting essentially of a series of grooved plates separated by plain plates, substantially as described.

116. In a typographic machine, a type-magazine comprising two grooved or channeled plates closed at the sides and placed with open sides of the channels facing, and an intervening plain plate forming the fourth side for the channels.

117. In a typographic machine, a type-magazine having a series of rows of channels arranged in opposing order at the receiving end, and in alternating order at the discharge end, substantially as described.

118. A block H⁴ adapted to form the bottom of a type-magazine H, having two rows of channels with intervening perforations in the walls of the outer channels to permit the passage of escapement-detents to the inner row, substantially as described.

119. The combination of a type-magazine having a plurality of rows of channels arranged in opposing order at the receiving end and in alternating order at the discharge end, and a series of alternating long and short escapement-detents operating at the discharge end, substantially as described.

120. The combination of a magazine, a free escapement-detent rocking upon the magazine, but not attached thereto, and a free bar operating upon the detents.

121. The combination of an escapement-detent and a bar not attached thereto, but sustaining and operating the detent.

122. The combination with a pivoted escapement-detent having fingers for engaging and releasing types and having projecting faces opposite the base of each finger, of a bar having a face adapted to reciprocate upon and successively engage the projecting faces, substantially as described.

123. The combination with a magazine for types, and a magazine for justifiers, of escapement devices for releasing the types and justifiers, and means for guiding the justifiers in falling, so that they are placed in and across the line at substantially right angles to the types.

124. In a typographic machine, the combination with free or separate justifiers capable of being assembled in substantially the same manner as types, of means for assembling the type into a line, and means for discharging the justifiers into and across the line during composition, so that they lie at substantially right angles to the line of type.

125. An escapement-detent having upon the finger side an intermediate pivot projection and on the other side projecting faces equidistant from the pivot, substantially as described.

126. The combination with an escapement-detent having projecting faces upon its back opposite the base of each finger, of an operating-bar having an enlargement on the end adapted to lie between and move across the projecting faces, substantially as described.

127. The combination in a type-escapement detent, of fingers I', I², a pivot I³, a central face $i$, projecting faces $i'$, and means for sustaining and operating the detent, substantially as described.

128. The combination of a magazine, an escapement-detent rocking upon but not attached to the magazine, a plate carried by the magazine and forming therewith a channel, and a bar serving to retain the escapement-detent, and adapted to reciprocate between the plate and the detent to operate the detent, substantially as described.

129. An escapement-detent having a pivot $i^3$ and fingers $I'$, $I^2$, the upper finger $I'$ being curved at the top of the inner end upon an arc having the pivot for a center, substantially as described.

130. A type-packer for typographic machines, consisting essentially of a vibrating hopper for guiding and packing the types, and means for operating the hopper.

131. A type-packer, having in combination means for receiving and grasping the types, and a system of automatically-operating levers adapted to yield in case of an obstruction.

132. In a typographic machine, a cam-drum surrounding a shaft and inclosing a train of gearing and a split-ring clutch, and means for engaging the clutch with the gear, and thereby rotating the drum.

133. A cam mechanism consisting of a train of gearing, having an enlarged shell on one element of the gear embracing a split-ring clutch, and means for engaging and disengaging the clutch and the gear.

134. A composing-frame for a typographic machine, consisting of a block having a channel or raceway for the character-bearing types, a face adapted to hold free justifiers across the line, and a ledge at the front of the block to hold the justifiers in their proper relation to the line, substantially as described.

135. In a typographic machine, the combination with a composing-block having a type-channel, of a transfer-carriage movable laterally in a channel in the composing-block, two fingers journaled in the transfer-carriage, embracing the composing-block and extending across the type-channel.

136. In a typographic machine, the combination with a composing-block having a type-channel, of type-transferring fingers operating across the type-channel and movable horizontally and laterally.

137. In a typographic machine, the combination with a composing-block having a type-channel, of type-transferring fingers embracing the composing-block and operating across the type-channel and movable horizontally and laterally.

138. In a typographic machine, an alining device having a level surface, means for holding a line of character-bearing types, and means for placing the line face down upon the level surface, substantially as described.

139. In a typographic machine, an alining and justifying device having in combination a level surface, means for holding a line of type and justifiers, means for placing the line face down upon the level surface, and means for forcing in the justifiers.

140. The combination of opposing jaws carrying means for alternately clamping and releasing a line of type, and a bar confronting the intervening space between the jaws, adapted to catch and aline a line of type.

141. In a typographic machine, a bar-block having jaws carrying mechanism for sustaining, clamping and discharging a line or bar of type, substantially as described.

142. The combination of type-sustaining jaws, a bar confronting the jaws and forming with them a space for the admission of justifiers between the heads of the types, and a justifying-bar adapted to either force in the justifiers or enter and fill the space between the jaws and the bar, substantially as described.

143. A rocking bar-block having channels at substantially right angles to receive a line of types and justifiers, and means for sustaining all the units in any position of the block.

144. The combination of opposing type-sustaining jaws, a clamping device carried by and movable in one of the jaws, and means for advancing and retracting the clamping device, substantially as described.

145. The combination of opposing jaws, a gage-bar lying at one end of the space between the jaws, a type-sustaining bar carried by one of the jaws and reduced at one end to fit the gage-bar, and means for reciprocating the sustaining-bar, substantially as described.

146. The combination of type-sustaining jaws, a false jaw lying in one of the jaws, and means for operating the false jaw, substantially as described.

147. The combination of opposing jaws, a false jaw lying in one of the jaws and having recesses fitting over ledges, a stepped bar, and means for operating the bar to actuate the false jaw, substantially as described.

148. The combination of jaws $N^4$, $N^5$, the jaws $N^4$ carrying a type-sustaining spring-pressed bar $n^{15}$, having projections $n^{19}$, and an operating-bar $n$ having depressions $n^{20}$ adapted to receive the projections $n^{19}$, substantially as described.

149. The combination with a block for manipulating a line of type and justifiers, of a spring-pressed rocking-lever attached to a bar, and means for automatically operating the lever to force the bar to discharge the justifiers, substantially as described.

150. The combination in a type-manipulating block, of telescoping slides carrying respectively a bar for forcing in the justifiers and a bar for discharging the justifiers, and operating means, substantially as described.

151. In a typographic machine, the combination of a rocking block, a grooved guide-plate, a pin projecting from the block and adapted to play in the groove of the guide-plate, and means for swinging the block up and down, substantially as described.

152. The combination of a receptacle adapted to receive a line of type, means for swinging the receptacle through an arc, and means for partially rotating the receptacle at the beginning of its movement and upon its return, substantially as described.

153. An end gate for a line-holder, having a slide, in combination with a spring-pressed operative lever having a projecting foot, adapted to be engaged by actuating means, substantially as described.

154. A justifier-bar having in combination two hinged parts, means for varying the elevation of one of the parts, and means for retaining, releasing and operating the bar, substantially as described.

155. The combination of a holder for carrying type, means for swinging the holder up and down, means for rocking the holder, and means for locking and unlocking the holder, substantially as described.

156. The combination with a holder N for carrying a line of type, of a latch $n^{77}$, a catch $n^{73}$ adapted to engage the latch, means for swinging the block up and down, means for rocking the block, and means for disengaging the catch and latch, substantially as described.

157. The combination of opposing jaws $N^4$, $N^5$, the jaw $N^5$ carrying a false jaw $n^{23}$, a rocking bar $n^{73}$, and eccentric roller $n^{80}$, pins $n^{25}$, and means for operating the rocking bar, substantially as described.

158. A justifying or spacing type, having its major or base portion substantially wedge-shaped, that is, in the form of a truncated right, triangular prism, and a rectangular apex portion having parallel faces.

159. The combination of a series of molds for casting types with recessed shanks, with means for assembling the types into a line, comprising a channel having a rib to take into the recesses to sustain and guide the types.

160. The combination of a series of molds for casting types with recessed shanks, a magazine, means for storing the types in the magazine, an escapement having a detent, a composing-channel having a rib, and a line-holder having a jaw or rib, all adapted to engage the recesses in the shanks of the types.

161. The combination of a series of molds to cast types with short or incomplete and recessed shanks, means for assembling the types into a line, a receptacle to receive the line, having means to engage the recesses in the shanks to sustain the types, and means for casting metal upon the base of the types and into their recesses to complete them.

162. The combination with a type-casting mechanism, comprising a series of movable molds for casting types with recessed shanks, means for moving the molds away from the types, means for holding the types by the recesses as the molds are moved away, of assembling and line-transforming mechanism, comprising elements to engage the recesses of the shanks in the successive stages of the operation.

163. The combination with a holder for a line of incomplete or short types, of means for transforming the line into a type-high bar.

164. In a typographic machine, a melting-pot having a plurality of mouths and pumps, and means for operating the pumps in succession to cast types, and a binder for the types.

In testimony whereof I affix my signature in presence of two witnesses.

LUCIEN A. BROTT.

Witnesses:
GEORGE A. KAY,
CALEB H. JACKSON.